(12) United States Patent
Yoon et al.

(10) Patent No.: US 12,022,571 B2
(45) Date of Patent: Jun. 25, 2024

(54) PROFILE BETWEEN DEVICES IN WIRELESS COMMUNICATION SYSTEM

(71) Applicant: Samsung Electronics Co., Ltd., Suwon-si (KR)

(72) Inventors: Kangjin Yoon, Seoul (KR); Jonghan Park, Bucheon-si (KR); Duckey Lee, Seoul (KR); Sangsoo Lee, Suwon-si (KR); Hyewon Lee, Seoul (KR); Jinkyu Han, Yongin-si (KR); Sujung Kang, Suwon-si (KR); Youngsun Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/543,576

(22) Filed: Dec. 6, 2021

(65) Prior Publication Data

US 2022/0095098 A1  Mar. 24, 2022

Related U.S. Application Data

(63) Continuation of application No. 16/125,586, filed on Sep. 7, 2018, now Pat. No. 11,197,150.

(30) Foreign Application Priority Data

Sep. 7, 2017 (KR) .................. 10-2017-0114311

(51) Int. Cl.
*H04W 4/50* (2018.01)
*H04W 8/24* (2009.01)
(Continued)

(52) U.S. Cl.
CPC ............. *H04W 8/245* (2013.01); *H04W 4/50* (2018.02); *H04L 67/303* (2013.01); *H04W 4/70* (2018.02); *H04W 88/02* (2013.01)

(58) Field of Classification Search
CPC ..... H04W 12/35; H04W 8/205; H04W 12/04; H04W 4/50; H04W 4/60; H04W 8/18;
(Continued)

(56) References Cited

U.S. PATENT DOCUMENTS 9,154,957 B2  10/2015  Khan et al.
9,477,459 B2  10/2016  Rauma
(Continued)

FOREIGN PATENT DOCUMENTS

CN  103747104 A  4/2014
CN  105792179 A  7/2016
(Continued)

OTHER PUBLICATIONS

ISA/KR, "International Search Report," International Application No. PCT/KR2018-010485, dated Dec. 19, 2018, 4 pages.
(Continued)

*Primary Examiner* — Joseph Arevalo

(57) ABSTRACT

The present disclosure relates to a communication scheme and system for the convergence of a 5G communication system for supporting a higher data transfer rate after the 4G system and the IoT technology. The present disclosure may be applied to intelligent services (e.g., a smart home, a smart building, a smart city, a smart car or connected car, healthcare, digital education, retain business, security and safety-related service) based on the 5G communication technology and IoT-related technology. The present disclosure provides methods and apparatus for supporting a profile transfer between terminals and methods and apparatus for supporting easy use of a communication product.

8 Claims, 31 Drawing Sheets

(51) Int. Cl.
 *H04L 67/303* (2022.01)
 *H04W 4/70* (2018.01)
 *H04W 88/02* (2009.01)

(58) Field of Classification Search
 CPC ... H04W 12/02; H04W 12/069; H04W 12/40;
  H04W 12/45; H04W 16/14; H04W 4/021;
  H04W 8/183; H04W 8/20; H04W 12/06;
  H04W 4/70; H04W 8/245; H04W 88/02
 USPC ......... 455/419, 414.1, 435.1, 558, 407, 418,
  455/205, 566, 411, 456.1, 432.3, 420,
  455/445, 3.01, 466
 See application file for complete search history.

(56) References Cited

U.S. PATENT DOCUMENTS

| | | | |
|---|---|---|---|
| 9,536,247 | B2 | 1/2017 | Sim et al. |
| 9,794,368 | B2 | 10/2017 | Kweon et al. |
| 10,003,909 | B2 | 6/2018 | Altay et al. |
| 10,187,206 | B2 | 1/2019 | Nix |
| 10,187,784 | B1 | 1/2019 | Chen et al. |
| 10,609,022 | B2* | 3/2020 | Park .................. H04W 12/06 |
| 11,516,676 | B1* | 11/2022 | Holmes ............... H04W 12/02 |
| 2009/0227282 | A1 | 9/2009 | Miyabayashi et al. |
| 2012/0260090 | A1 | 10/2012 | Hauck et al. |
| 2014/0073292 | A1 | 3/2014 | Kim et al. |
| 2014/0357229 | A1 | 12/2014 | Lee et al. |
| 2015/0004934 | A1 | 1/2015 | Qian et al. |
| 2015/0147962 | A1 | 5/2015 | Park et al. |
| 2015/0237496 | A1* | 8/2015 | Gao .................. H04B 1/3816 455/414.1 |
| 2016/0006728 | A1 | 1/2016 | Park et al. |
| 2016/0020802 | A1 | 1/2016 | Lee et al. |
| 2016/0021484 | A1 | 1/2016 | Park et al. |
| 2016/0049975 | A1 | 2/2016 | Uy et al. |
| 2016/0105540 | A1 | 4/2016 | Kwon et al. |
| 2016/0112386 | A1 | 4/2016 | Park et al. |
| 2016/0117683 | A1 | 4/2016 | Jung et al. |
| 2016/0119780 | A1 | 4/2016 | Jung et al. |
| 2016/0127132 | A1 | 5/2016 | Lee et al. |
| 2016/0134991 | A1 | 5/2016 | Lee et al. |
| 2016/0135048 | A1 | 5/2016 | Huxham et al. |
| 2016/0142906 | A1 | 5/2016 | Park et al. |
| 2016/0150400 | A1 | 5/2016 | Cha et al. |
| 2016/0212617 | A1 | 7/2016 | Koshimizu et al. |
| 2016/0241537 | A1 | 8/2016 | Cha et al. |
| 2016/0301529 | A1 | 10/2016 | Park et al. |
| 2016/0350547 | A1* | 12/2016 | Loughlin-McHugh ..................... H04L 67/306 |
| 2016/0350861 | A1* | 12/2016 | Loughlin-McHugh ..................... H04L 9/3242 |
| 2017/0070346 | A1 | 3/2017 | Lombardi et al. |
| 2017/0156051 | A1 | 6/2017 | Park et al. |
| 2017/0359718 | A1 | 12/2017 | Denny |
| 2018/0166176 | A1* | 6/2018 | Flippen .................... A61B 5/01 |
| 2018/0253092 | A1 | 9/2018 | Trapero Esteban et al. |
| 2019/0020997 | A1 | 1/2019 | Park |
| 2019/0037335 | A1 | 1/2019 | Steck |
| 2019/0053043 | A1 | 2/2019 | Cha et al. |
| 2019/0104401 | A1 | 4/2019 | Park et al. |
| 2019/0174299 | A1* | 6/2019 | Ullah ...................... H04W 8/24 |
| 2019/0335319 | A1* | 10/2019 | Li ........................... H04W 8/18 |
| 2020/0059778 | A1* | 2/2020 | Li .......................... H04W 8/205 |
| 2020/0084610 | A1 | 3/2020 | Salmela et al. |
| 2020/0092711 | A1* | 3/2020 | Chen ..................... H04W 8/205 |
| 2020/0267236 | A1 | 8/2020 | Lefebvre et al. |
| 2021/0289344 | A1* | 9/2021 | Fan ....................... H04W 8/183 |
| 2021/0385645 | A1* | 12/2021 | Cha ....................... G06F 1/1637 |

FOREIGN PATENT DOCUMENTS

| | | | | |
|---|---|---|---|---|
| CN | 106664544 | A | 5/2017 | |
| CN | 107005837 | A | 8/2017 | |
| CN | 107079286 | A | 8/2017 | |
| WO | 2014/193181 | A1 | 12/2014 | |
| WO | 2014193188 | A1 | 12/2014 | |
| WO | 2015029945 | A1 | 3/2015 | |
| WO | 2016/091414 | A1 | 6/2016 | |
| WO | WO2016/133369 | * | 8/2016 | ............ H04W 88/02 |

OTHER PUBLICATIONS

Supplementary European Search Report dated Jul. 9, 2020 in connection with European Patent Application No. 18 85 3203, 7 pages.
Intellectual Property India, "Examination report under sections 12 & 13 of the Patents Act," dated Mar. 15, 2022, in connection with Indian Patent Application No. 202037003007, 8 pages.
China National Intellectual Property Administration, "The First Office Action," dated Aug. 24, 2022, in connection with Chinese Patent Application No. 201880058279.5, 20 pages.
China National Intellectual Property Administration, "Office Action," dated May 11, 2023, in connection with Chinese Patent Application No. 201880058279.5, 18 pages.
Korean Intellectual Property Office, "Office Action," dated Jun. 26, 2023, in connection with Korean Patent Application No. 119981042713, 10 pages.
Fang et al., "The Development of eSIM Technology and Its Opportunities and Challenges to Operators," Post and Telecommunications Design Technology, No. 08, Aug. 2016, 5 pages.
Huang et al., "Analysis on Key Problems of Embedded SIM Card Technology in Internet of Things Application," Telecommunications Engineering Technology and Standardization, No. 02, Feb. 2016, 4 pages.
Hearing Notice issued Feb. 9, 2024, in connection with Indian Patent Application No. 202037003007, 3 pages.

* cited by examiner

FIG. 16

| ICCID (19-20 digits) | IMSI (max 15 digits) | K (128bits) | Enabling key | Re-install key |
|---|---|---|---|---|
| 8944 XXXX XXXX XXXX 0001 | 450 05 1111111111 | KEY1111111111 | NONE | PASS11111111 |
| 8944 XXXX XXXX XXXX 0001 | 450 05 1111111111 | KEY1111111111 | PASS11111111 | PASS22222222 |
| 8944 XXXX XXXX XXXX 0001 | 450 05 1111111111 | KEY1111111111 | PASS22222222 | PASS33333333 |
| 8944 XXXX XXXX XXXX 0001 | 450 05 1111111111 | KEY1111111111 | PASS33333333 | NONE |

1601, 1603, 1605, 1607

| ICCID (19-20 digits) | IMSI (max 15 digits) | K (128bits) | Enabling key | Re-install key |
|---|---|---|---|---|
| 8944 XXXX XXXX XXXX 0001 | 450 05 1111111111 | KEY1111111111 | NONE | PASS111 |
| 8944 XXXX XXXX XXXX 0001 | 450 05 1111111111 | KEY1111111111 | PASS11111111 | PASS222 |
| 8944 XXXX XXXX XXXX 0001 | 450 05 1111111111 | KEY1111111111 | PASS22222222 | PASS333 |
| 8944 XXXX XXXX XXXX 0001 | 450 05 1111111111 | KEY1111111111 | PASS33333333 | NONE |

1611, 1613, 1615, 1617

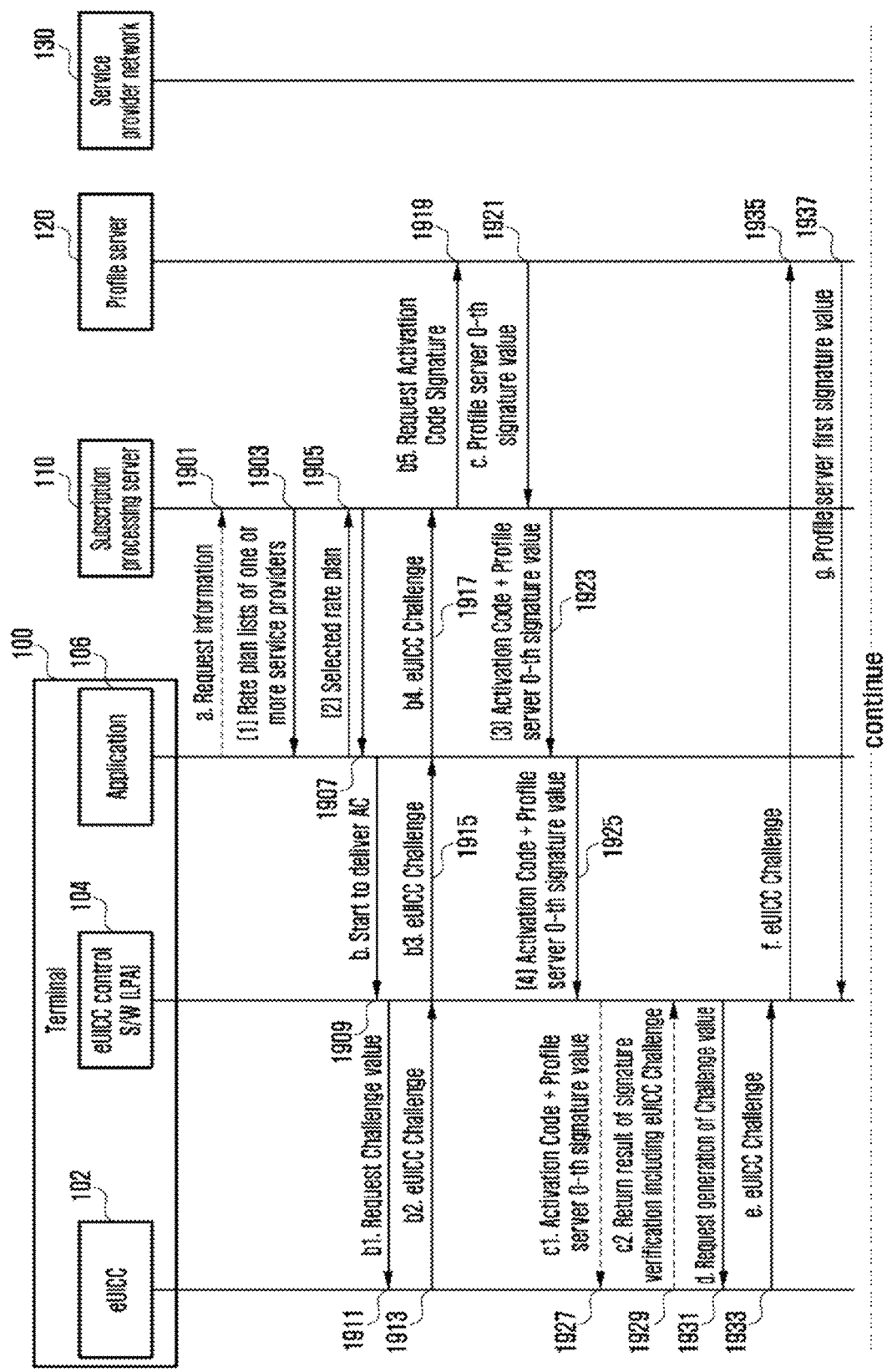

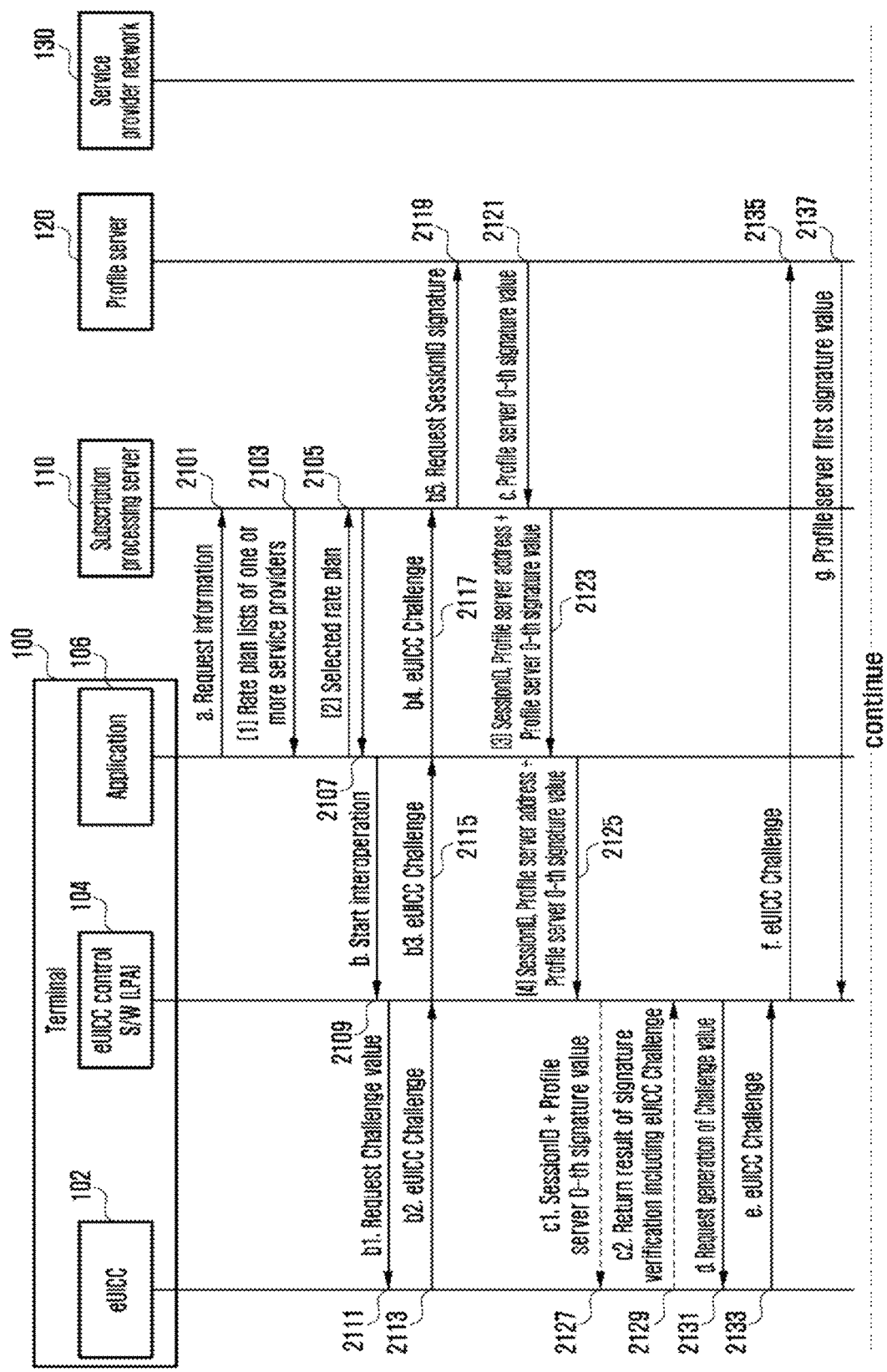

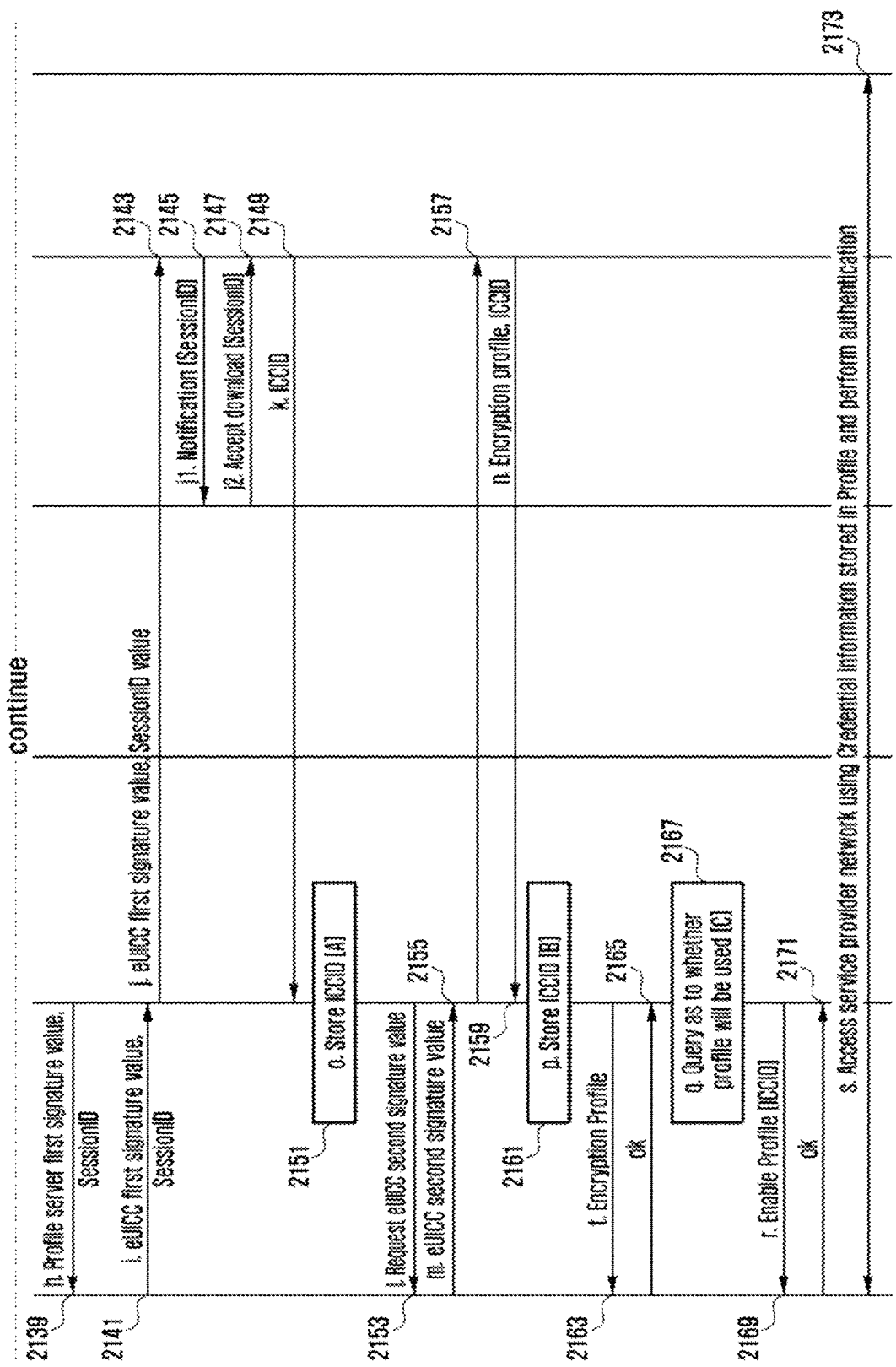

PROFILE BETWEEN DEVICES IN WIRELESS COMMUNICATION SYSTEM

CROSS-REFERENCE TO RELATED APPLICATIONS

This application is a continuation of U.S. patent application Ser. No. 16/125,586 filed on Sep. 7, 2018, which is based on and claims priority under 35 U.S.C. § 119 to Korean Patent Application No. 10-2017-0114311 filed on Sep. 7, 2017, in the Korean Intellectual Property Office, the disclosures of which are herein incorporated by reference in their entirety.

BACKGROUND

1. Field

The present disclosure relates to a wireless communication system, and more specifically, to a method and apparatus for downloading and installing communication service on a terminal and performing a communication connection in a communication system. Furthermore, the present disclosure relates to a method and apparatus for downloading and installing a profile online, transferring a profile between a plurality of terminals, and managing the profile in a communication system.

2. Description of Related Art

In order to satisfy a wireless data traffic demand that tends to increase after the 4G communication system commercialization, efforts to develop an improved 5G communication system or pre-5G communication system is being made. For this reason, the 5G communication system or pre-5G communication system is called a beyond 4G network communication system or a post LTE system.

In order to achieve a high data transfer rate, the 5G communication system is considered to be implemented in an mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system.

In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

A universal integrated circuit card (UICC) is a smart card inserted into a mobile communication terminal and is also called a UICC card. The UICC may include an access control module for accessing the network of a mobile communication service provider. Examples of the access control module include a universal subscriber identity module (USIM), a subscriber identity module (SIM) and an IP multimedia service identity module (ISIM). A UICC including the USIM is commonly called a USIM card. Likewise, in general, a UICC including the SIM module is also called a SIM card. In the subsequent description of the present disclosure, the SIM card is used as a common meaning including a UICC card, a USIM card and a UICC including ISIM. That is, the technical application of the SIM card may be identically applied to a USIM card or an ISIM card or a common UICC card.

The SIM card stores personal information of a mobile communication subscriber and generates subscriber authentication and traffic security key when a mobile communication network is accessed, enabling safe mobile communication use.

The SIM card is fabricated as a dedicated card for a given mobile communication service provider in response to a request from the corresponding communication service provider at a point of time at which the present disclosure is proposed, in general, when the card is fabricated. Authentication information for accessing the network of a corresponding service provider, for example, a universal subscriber identity module (USIM) application, an international mobile subscriber identity (IMSI), a K value, and an OPc value are previously mounted on the SIM card. Accordingly, the fabricated SIM card is delivered to a corresponding mobile communication service provider and provided to a subscriber. Thereafter, if necessary, management, such as the installation, modification and deletion of an application within the UICC, may be performed using a technology, such as over the air (OTA). A subscriber may insert the UICC card into his or her mobile communication terminal and use the network of a corresponding mobile communication service provider and application services. When the terminal is to be replaced with another one, the subscriber transfers the UICC card from the old terminal to a new terminal. Accordingly, authentication information, mobile communication telephone numbers and a personal telephone directory stored in the UICC card can be used in the new terminal without any change.

However, the SIM card is inconvenient when the user of a mobile communication terminal is provided with services of another mobile communication company. The user of a mobile communication terminal has inconvenience because the user has to physically obtain an SIM card in order to receive services from a mobile communication service provider. For example, when a user travels to a different country, the user has to purchase a local SIM card in order to receive local mobile communication services. Roaming service may solve such inconvenience to some extent, but has problems in that a communication fee is high and services cannot be provided if a contract between communication companies is not made.

If the SIM module is remotely downloaded and installed on the UICC card, most of such inconvenience can be solved. That is, a user may download the SIM module of a mobile communication service to be used onto his or her UICC card when the user wants. Furthermore, such a UICC card may download and install a plurality of SIM modules, and may select and use only one of the SIM modules. Such UICC card may be fixed or may not be fixed to a terminal.

A standardization organization called European Telecommunications Standards Institute (ETSI) has defined the physical shape and logical function of the UICC card in order to maintain international compatibility. From the viewpoint of a form factor to define the physical phenomenon, the size of the UICC card is gradually reduced from the Mini SIM that is most widely used to the micro SIM and the recent Nano SIM. This contributes much to a reduction in the size of a mobile communication terminal. However, it is expected that a UICC card having a smaller size than the recent Nano SIM may not be standardized due to the risk of losing the card. It is also expected that a further reduction in the size will be difficult because the space for mounting an attachable/detachable slot is necessary in a terminal from the nature of a detachable UICC card.

In order to solve the problem, there has emerged a requirement for substituting the UICC by embedding a security module performing a similar function as the UICC in a mobile communication terminal when the terminal is fabricated. Due to such a need, there was proposed an embedded universal integrated circuit card (eUICC) structure, that is, a not-detachable UICC. In general, the eUICC is a single chip form mounted on the circuit board of a terminal, but was also proposed as an integrated smart secure platform (iSSP) or integrated UICC (iUICC) structure in which the security module is mounted on the communication processor or application processor of a terminal or a system-on-chip (SoC) including a single processor structure having the two processors integrated therein.

In general, in the structure, a SIM module may be remotely downloaded and selected. In one embodiment of the present disclosure, a security module capable of remotely downloading a SIM module, selecting the SIM module and performing the role of a UICC card is collectively called an eUICC. That is, regarding the security module capable of remotely downloading a SIM module and selecting the SIM module, a UICC card fixed to a terminal, a UICC card not fixed to a terminal, and a UICC form integrated with an SoC are collectively used as an eUICC. Furthermore, downloaded SIM module information will be collectively used as a term "eUICC profile." In this case, the profile may be an applet form that operates in an operating system mounted on an eUICC or a firmware form that includes an independent operating system and data of a corresponding profile operating in an eUICC.

When a terminal is replaced, a subscriber may transfer the SIM card from the old terminal to a new terminal and insert the SIM card into the new terminal. Accordingly, the user can use authentication information, mobile communication telephone numbers and the personal telephone directory, stored in the UICC card, in the new terminal without any change. However, an eUICC profile downloaded onto the eUICC cannot be extracted to the outside of the eUICC, and the direct transfer of an eUICC profile between devices is prohibited. In order to access the network of a mobile communication service provider used in an old terminal after the old terminal is replaced, there is a need for a method of remotely downloading and installing an eUICC profile corresponding to the eUICC profile of the old terminal onto the eUICC of a new terminal and managing the eUICC profile.

The number resource (i.e., an international mobile subscriber identity (IMSI) value or an integrated circuit card identifier (ICCID) value) of an eUICC profile that is downloaded once cannot be reused in order to prevent the duplication of the corresponding profile. However, number resources may run short as the communication system continues to be developed and used. Furthermore, a new eUICC profile is downloaded when a terminal is replaced. Accordingly, there is a need for a task for updating old eUICC profile information (IMSI, K, etc.) connected to old subscriber information with information (i.e., IMSI value or ICCID value) of a new eUICC profile in the system of a mobile communication service provider. Accordingly, there is a need for a scheme capable of efficiently reusing a number resource allocated to an eUICC and making efficient the update of the system of a service provider in a communication system.

SUMMARY

The disclosure may provide a method and apparatus for a new terminal to download, install and manage a new eUICC profile corresponding to a profile stored in the eUICC of the existing terminal online in order to connect to communication service used in the existing terminal when the existing terminal is replaced with a new one in a communication system.

The disclosure may provide an apparatus and method for providing the same eUICC profile number resource (i.e., IMSI value or ICCID value) between multiple terminals in a communication system.

The disclosure may provide an apparatus and method for enabling the user of a terminal to be supplied with services of a mobile communication service provider in a wireless communication system.

In accordance with an aspect of this disclosure, a method of a first terminal includes transmitting a message requesting the network entity to transmit, to a second terminal, a second profile corresponding to a first profile to be transferred from the first terminal to a second terminal to a network entity when an input to transfer the first profile installed on the first terminal to the second terminal is received and outputting information for enabling the second profile in the second terminal to the second terminal.

In accordance with an aspect of this disclosure, a method of a second terminal includes providing the universal integrated circuit card (UICC) identifier of the second terminal to a first terminal on which a first profile is installed, downloading a second profile corresponding to the first profile from a network entity, and enabling the downloaded second profile when information for enabling the second profile is received.

In accordance with an aspect of this disclosure, a method of a network entity includes receiving a message requesting a profile corresponding to a first profile to be transmitted from a first terminal on which the first profile is installed to a second terminal, selecting a second profile corresponding to the first profile and to be transmitted to the second terminal, and transmitting the selected second profile to the second terminal.

In accordance with an aspect of this disclosure, a first terminal includes a transceiver configured to transmit and receive signals and a controller configured to transmit a message requesting a second profile corresponding to a first profile to be transferred to a second terminal to a network entity when an input to transfer the first profile installed on the first terminal is received and to output information for enabling the second profile in the second terminal.

In accordance with an aspect of this disclosure, a second terminal a transceiver configured to transmit and receive signals and a controller configured to provide the universal integrated circuit card (UICC) identifier of the second terminal to a first terminal on which a first profile is installed, download a second profile corresponding to the first profile from a network entity, and enable the downloaded second profile when information for enabling the second profile is received.

In accordance with an aspect of this disclosure, a network entity a transceiver configured to transmit and receive signals and a controller configured to receive a message requesting a profile corresponding to a first profile to be transmitted from a first terminal on which the first profile is installed to a second terminal, select a second profile corresponding to the first profile and to be transmitted to the second terminal, and transmit the selected second profile to the second terminal.

Technical objects to be achieved in the present disclosure are not limited to the aforementioned technical objects, and other technical objects not described above may be evidently understood by a person having ordinary skill in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 is a diagram showing profiles having the same ICCID, IMSI and K values prepared in the profile server 230;

FIGS. 19A and 19B are diagrams showing an embodiment of a method using communication service by only a simple manipulation even without mounting a separate SIM card after the communication service is conveniently purchased through a terminal in a wireless communication system;

FIGS. 21A and 21B are diagrams showing an embodiment of a method using communication service by only a simple manipulation even without mounting a separate SIM card after the communication service is conveniently purchased through a terminal in a wireless communication system;

DETAILED DESCRIPTION

Figure 1:
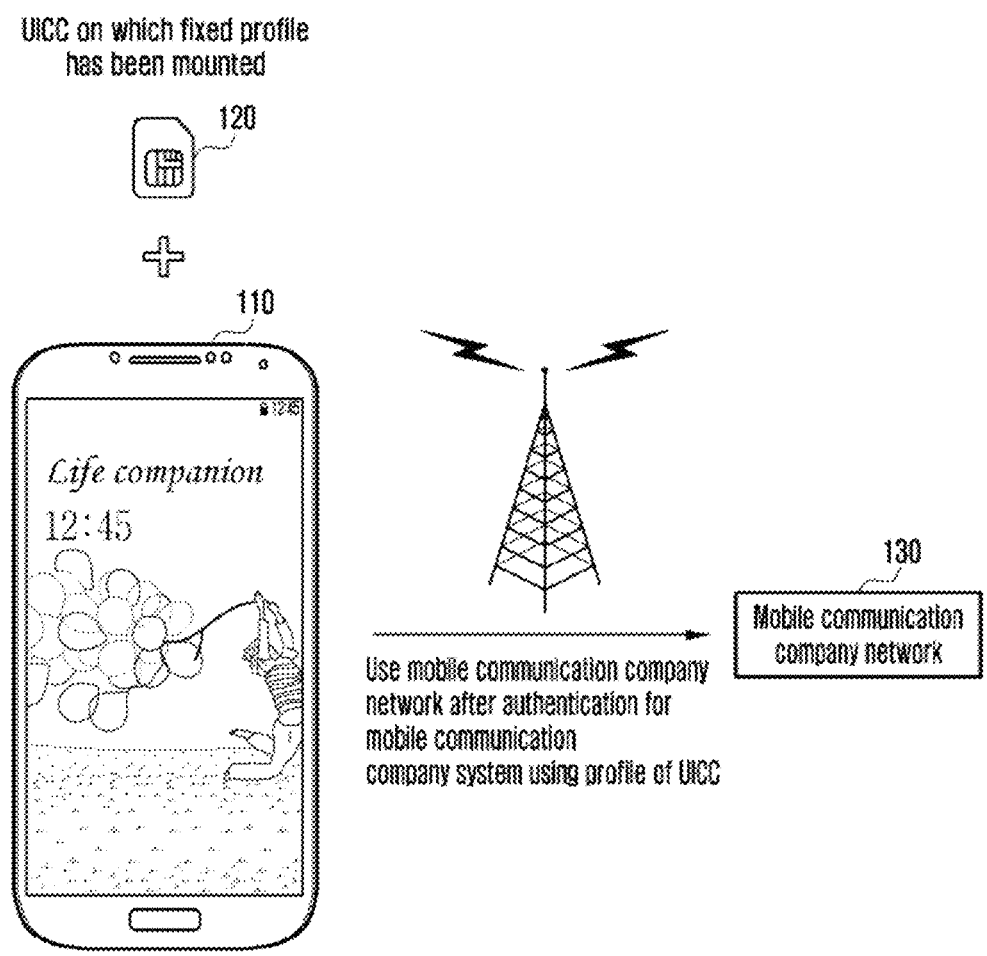
FIG. 1 is a diagram showing a method for a terminal to connect to a mobile communication network using a UICC on which a fixed profile has been installed.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are described in detail with reference to the accompanying drawings. It is to be noted that the same reference numerals are used throughout the drawings to refer to the same elements. Furthermore, a detailed description of the known functions or elements that may make the gist of the present disclosure vague is omitted.

In this specification, in describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. The same reference numerals will be used to refer to the same or similar elements throughout the drawings.

In the present disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more CPUs within a device or a security multimedia card.

First, terms used in this specification are defined.

In this specification, a UICC is a smart card inserted into a mobile communication terminal. The UICC means a chip which stores personal information, such as network access authentication information of a mobile communication subscriber, a telephone directory and SMS, and enables the use of safe mobile communication by performing subscriber authentication and traffic security key generation when it accesses a mobile communication network, such as GSM, WCDMA or LTE. A communication application, such as a SIM, a USIM or an ISIM, is installed on the UICC depending on the type of mobile communication network accessed by a subscriber. Furthermore, the UICC may provide a security function of a higher level for the installation of various applications, such as e-wallet, ticketing and a biometric password.

In this specification, an embedded UICC (eUICC) is a security module of a chip form embedded in a terminal other than a detachable type in which a card can be inserted into and detached from a terminal. The eUICC may download a profile using the OTA technology and install it. The eUICC may be called a UICC capable of profile download and installation.

In this specification, a method of downloading a profile using the OTA technology and installing the profile on the eUICC may be applied to a detachable UICC capable of being inserted into and detached from a terminal. That is, an embodiment of the present disclosure may be applied to a UICC capable of downloading a profile using the OTA technology and installing the profile.

In this specification, the term "UICC" may be interchangeable with a SIM. The term "eUICC" may be interchangeable with an eSIM.

In this specification, a profile may mean that an application, a file system, an authentication key value, etc. stored in a UICC have been packaged in a software form.

In this specification, a USIM profile may have the same meaning as a profile and may mean that information included in a USIM application within a profile has been packaged in a software form.

In this specification, a profile server has a function for generating a profile, encrypting the generated profile, generating a profile remote management command or encrypting the generated profile remote management command. The profile server may be expressed as subscription manager data preparation (SM-DP), subscription manager data preparation plus (SM-DP+), off-card entity of profile domain, a profile encryption server, a profile generation server, a profile provisioner (PP), a profile provider or a profile provisioning credentials holder (PPC holder).

In this specification, a profile management server may be expressed as subscription manager secure routing (SM-SR), subscription manager secure routing plus (SM-SR+), off-card entity of the eUICC profile manager, a profile management credentials holder (PMC holder) or an eUICC Manager (EM).

In this specification, the profile server may denote a set of the functions of the profile management server when it is called. Accordingly, in various embodiments of the present disclosure, that is, in the following description, an operation of the profile server may also be performed in the profile management server. Likewise, an operation described with respect to the profile management server or the SM-SR may also be performed in the profile server. If the profile server collectively denotes a set of the functions of the profile management server, it may be simply called a profile server.

In this specification, a term used herein "terminal" may be called a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile or other terminals. Various embodiments of the terminal include a cellular telephone, a smart phone having a wireless communication function, a personal digital assistant (PDA) having a wireless communication function, a wireless modem, a mobile computer having a wireless communication function, a photographing device such as a digital camera having a wireless communication function, a gaming device having a wireless communication function, music storage and playback home appliances having a wireless communication function, and Internet home appliances capable of wireless Internet access and browsing, and may further include portable units or terminals in which combinations of such functions have been integrated. Furthermore, the terminal may include an M2M terminal and an MTC terminal/device, but is not limited thereto. In this specification, the terminal may be called an electronic device or may be simply called a device.

In this specification, a UICC capable of downloading and installing a profile may be embedded in an electronic device. If the UICC is not embedded in the electronic device, the UICC physically separated from the electronic device may be inserted into the electronic device and connected to the electronic device. For example, the UICC may be inserted into the electronic device in a card form. The electronic device may include the terminal. In this case, the terminal may include a UICC capable of downloading and installing a profile. The UICC may be embedded in the terminal, and may be inserted into the terminal if the terminal and the UICC are separated. The UICC may be inserted into the terminal and connected thereto. The UICC capable of downloading and installing a profile may be called an eUICC, for example.

In this specification, the terminal or electronic device may include software or an application installed on the terminal or the electronic device to control a UICC or eUICC. The software or application may be called a local profile assistant (LPA), for example.

In this specification, a profile delimiter may denote a factor matched with a profile ID, an integrated circuit card ID (ICCID), a matching ID, an event ID, activation code, an Activation Code Token, ISD-P or a profile domain (PD). The profile ID may indicate the unique ID of each profile. The profile delimiter may include the address of a profile server (SM-DP+) which can index a profile.

In this specification, an eUICC identifier (eUICC ID) may be the unique ID of an eUICC embedded in a terminal, and may be called an EID. Furthermore, if a provisioning profile has already been installed on an eUICC, an eUICC identifier may be the profile ID of a corresponding provisioning profile. Furthermore, as in an embodiment of the present disclosure, if a terminal and an eUICC chip are not separated, an eUICC identifier may be a terminal ID. Furthermore, an eUICC identifier may denote a given security domain of an eUICC chip.

In this specification, a profile container may be named a profile domain. The profile container may be a security domain.

In this specification, an application protocol data unit (APDU) may be a message for enabling a terminal to operate in conjunction with an eUICC. Furthermore, the APDU may be a message for enabling the PP or PM to operate in conjunction with an eUICC.

In this specification, profile provisioning credentials (PPC) may be means used for a profile server and an eUICC to perform mutual authentication, profile encryption and signature. The PPC may include one or more of a symmetry key, a Rivest Shamir Adleman (RSA) certificate and private key, an elliptic curved cryptography (ECC) certificate and private key, a root certification authority (CA), and a certificate chain. Furthermore, if a plurality of profile servers is present, a different PPC may be stored or used in an eUICC in each of the plurality of profile servers.

In this specification, profile management credentials (PMC) may be means used for a profile management server and an eUICC to perform mutual authentication, transmission data encryption and signature. The PMC may include one or more of a symmetry key, an RSA certificate and private key, an ECC certificate and private key, root CA and a certificate chain. Furthermore, if a plurality of profile management servers is present, a different PMC may be stored or used in an eUICC in each of the plurality of profile management servers.

In this specification, AID may be an application identifier. This value may be a delimiter to classify different applications within an eUICC.

In this specification, an event may be a term collectively calling profile download, remote profile management or a management/processing command of other profiles or an eUICC. The profile download may be interchangeable with profile installation. Furthermore, an event type may be used as a term indicating whether a given event is profile download, remote profile management, or other profile or eUICC management/processing command, and may be referred to as an event request type, event class or event request class.

In this specification, a profile package may be interchangeable with a profile or used as a term to indicate the data object of a given profile, and may be referred to as a profile tag, length, value (TLV) or a profile package TLV. If a profile package has been encrypted using an encryption parameter, it may be called a protected profile package (PPP) or protected profile package TLV (PPP TLV). If a profile package has been encrypted using an encryption parameter that may be decoded by a given eUICC only, it may be called a bound profile package (BPP) or bound profile package TLV (BPP TLV). A profile package TLV may be a data set that expresses information forming a profile in a TLV format.

In this specification, remote profile management (RPM) may be called profile remote management, remote management, remote management command, a remote command, an RPM package, a profile remote management package, a remote management package, a remote management command package or a remote command package. The RPM may be used to change (or update) the state (e.g., enabled, disabled or deleted) of a given profile, the contents (e.g., a profile nickname of a profile) of a given profile or profile summary information (e.g., profile metadata).

In this specification, AKA may indicate authentication and key agreement, and may indicate an authentication algorithm for accessing a 3GPP and 3GPP2 network.

In this specification, K is an encryption key value stored in an eUICC used for an AKA authentication algorithm.

In this specification, OPc is a parameter value which may be stored in an eUICC used for an AKA authentication algorithm.

In this specification, NAA is a network access application app program, and may be an app program, such as a USIM or ISIM stored in a UICC to access a network. NAA may be a network access module.

Furthermore, in describing the present disclosure, a detailed description of the related known function or element will be omitted if it is deemed to make the gist of the present disclosure unnecessarily vague.

Hereinafter, proposed embodiments are described with reference to the drawings.

FIG. 1 is a diagram showing a method for a terminal to connect to a mobile communication network using a UICC on which a fixed profile has been installed.

Referring to FIG. 1, a UICC 120 may be inserted into a terminal 110. In this case, the UICC may be a detachable type, and may have been previously embedded in the terminal. The fixed profile of the UICC on which the fixed profile has been installed means that "access information" capable of accessing a given communication company has been fixed. The access information may be a K or Ki value necessary for network authentication along with an IMSI, that is, a so-called subscriber delimiter, and a subscriber delimiter.

The terminal 110 into which UICC 120 having the fixed profile installed thereon has been inserted may perform authentication along with an authentication processing system (e.g., a home location register (HLR) or AuC) of a mobile communication company using the UICC 120. The authentication process may be an AKA process. When the authentication is successful, the terminal 110 may use mobile communication service, such as a phone call or mobile data, using the mobile communication network 130 of the mobile communication system.

Figure 2:
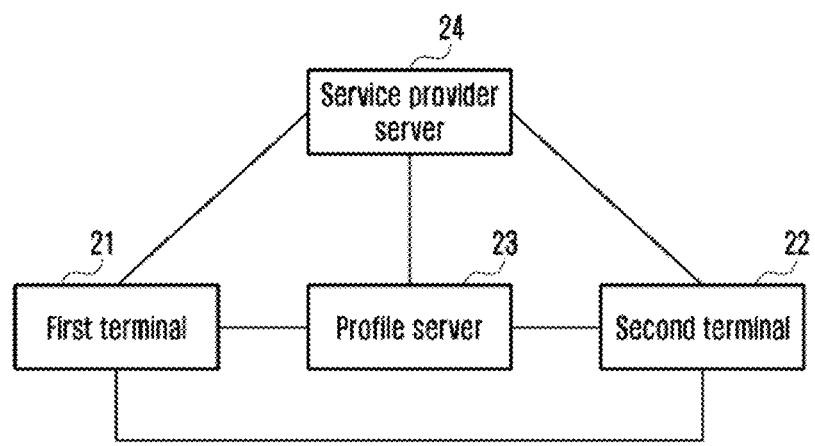
FIG. 2 is a diagram showing an example of the configuration of a communication system to which an embodiment of the present disclosure is applied.

FIG. 2 is a diagram showing an example of the configuration of a communication system to which an embodiment of the present disclosure is applied.

Referring to FIG. 2, the communication system to which an embodiment of the present disclosure is applied includes a service provider server 24, a profile server 23 and a plurality of terminals (e.g., a first terminal 21 and a second terminal 22). The service provider server 24 provides communication service to a subscriber, and may manage and update subscriber information connected to a selected profile within the first terminal 21. The profile server 23 (e.g., SM-DP+) generates a profile corresponding to the selected profile of the first terminal 21 for providing communication service to the second terminal 22 in response to a request from the service provider server 24, and supports the remote installation of the generated profile. The remote installation may mean that the generated profile is installed on the second terminal 22. The profile server 23 may transmit a message, including the eUICC identifier (e.g., EID2) of the second terminal 22 onto which the generated profile will be downloaded and information indicative of the execution of the download of the generated profile, to a subscription manager discovery service (SM-DS) (not shown).

Profile download may be started in such a manner that the SM-DS or SM-DP+ notifies the second terminal 22 of the profile download, may be selected when a user manipulates the second terminal 22, or may be initiated based on information received by the second terminal 22 by first requesting the information from the SM-DS or SM-DP+. In this case, the information received by the second terminal 22 by first requesting the information from the SM-DS may include a delimiter capable of identifying an SM-DP+ address and the start of profile download.

In FIG. 2, each of the first terminal 21 and the second terminal 22 receives a message for the download of the profile from the profile server 23 or SM-DS, downloads the profile from the profile server 23 using the received message, and installs the downloaded on an internal eUICC. The profile includes number resources (i.e., IMSI value and ICCID value) of an eUICC profile and an encryption key (K) for authentication, and may further include a variety of types of information for communication service provided by a corresponding communication service provider.

Furthermore, each of the first terminal 21 and the second terminal 22 according to an embodiment of the present disclosure deletes a profile when a profile delete request event that requests the deletion of the profile through the input unit (or user interface unit) of software or an application (e.g., LPA) installed on the terminal or electronic device to control a UICC or eUICC, and transmits a message indicating that the profile has been deleted to the profile server 23. The profile server may manage a profile generated to provide communication service in the first terminal 21 so that it can be reused in the second terminal 22 based on the message.

In embodiments disclosed hereafter, it is assumed that one or more eUICC profiles have already been downloaded and installed on the eUICC of the first terminal 21. Furthermore, a profile downloaded and installed on the eUICC of the second terminal 22 is an eUICC profile (e.g., Profile2) corresponding to one or more (e.g., Profile1) of profiles downloaded and installed on the first terminal 21. The profile (Profile2) includes four types below.

Profile2_1: eUICC profile having ICCID, IMSI and K values different from those of Profile1

Profile2_2: eUICC profile having the same ICCID value as Profile1 and having IMSI and K values different from those of Profile1

Profile2_3: eUICC profile having the same ICCID and IMSI values as Profile1 and having a K value different from that of Profile1

Profile2_4: eUICC profile having the same ICCID, IMSI and K values as Profile1

In the following disclosed embodiment, the service provider server 24 and the profile server 23 may selected at least one of the four types of Profile_2_x (x=1, 2, 3, 4) and enable the selected profile to be downloaded onto the second terminal 22.

Figure 3:
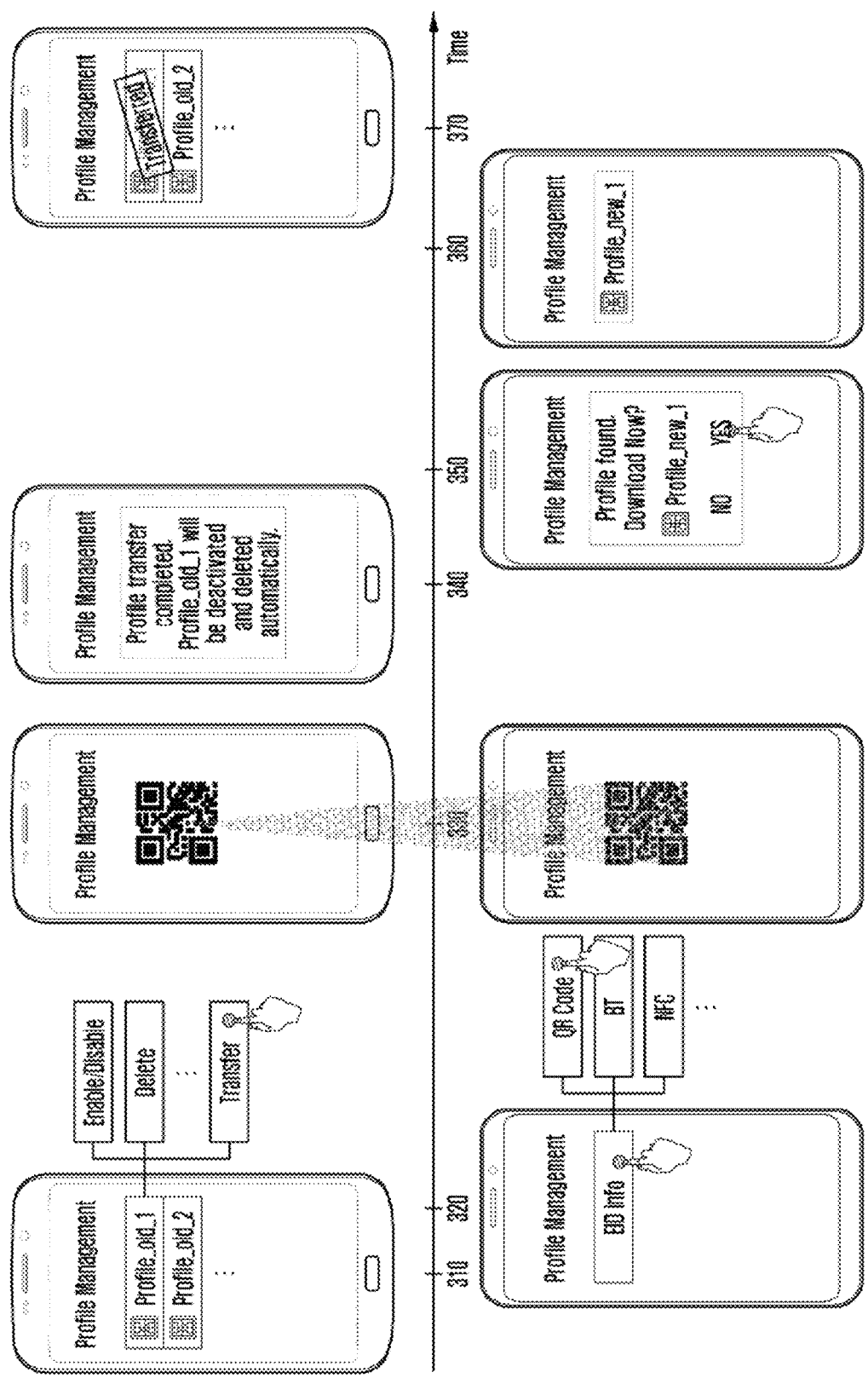
FIG. 3 is a diagram showing a UI operation of a first terminal and a second terminal when the first terminal requests that a profile corresponding to one or more selected profiles of eUICC profiles be downloaded and installed on the eUICC of the first terminal is downloaded onto the second terminal.

FIG. 3 is a diagram showing a UI operation of a first terminal and a second terminal when the first terminal requests that a profile corresponding to one or more selected profiles of eUICC profiles be downloaded and installed on the eUICC of the first terminal is downloaded onto the second terminal. In FIG. 3, a traverse axis shows a flow of time. Terminals shown on the upper side of FIG. 3 correspond to the first terminal on which a profile has been previously installed. Terminals shown on the lower side of FIG. 3 correspond to the second terminal on which a profile will be newly downloaded. The operational sequence of the first terminal and second terminal shown in FIG. 3 is for convenience of description. Operations and events performed by the two terminals may be performed in a different sequence. In FIG. 3, when available profiles are displayed in the UI of the LPA of the first terminal and an event to select a first profile (Profile_1) is received, the LPA may display (e.g., enable, disable, delete or move) selectable operations related to the first profile in the UI. The UI of the first terminal is shown in 310 of FIG. 3 by way of example. When an event to request a profile transfer (e.g., a touch input to an area in which a transfer event is displayed) from among the selectable operations is received, the first terminal may display selectable operations (e.g., manual input, QR code scan, Bluetooth®, NFC and a WLAN) of receiving the eUICC identifier (EID2) of the second terminal in the UI, and may receive an event to select one of the selectable operations (not shown). For example, when an event to select QR code scan is received, the second terminal may enable a camera for receiving QR code including eUICC identifier information of the second terminal (330 of FIG. 3).

At the same point of time, the second terminal may have been connected to a cellular network (e.g., 3G or 4G LTE), a WLAN or a communication network through tethering using the first terminal. The LPA of the second terminal may receive an event to display an operation of receiving a profile being used in another terminal in a UI and to select the UI (not shown). Furthermore, when selectable operations (e.g., indication by text, QR code, Bluetooth®, NFC and a WLAN) of delivering the eUICC identifier (EID2) to another terminal is displayed in the UI of the LPA of the second terminal, the second terminal may receive an event to select one of the displayed selectable operations (320 of FIG. 3). FIG. 3 shows an example in which an event to select QR code has been received. The second terminal may display the eUICC identifier of the second terminal in the UI of the LPA in a QR code form (330 of FIG. 3).

After receiving the eUICC identifier (EID2) of the second terminal (e.g., by photographing the QR code displayed in the second terminal using an enabled camera), the first terminal may transmit a request for the transfer of the first profile (Profile_1) to the second terminal to the profile server or the service provider server, and may display that the transmission has been completed in the UI of the LPA (340 of FIG. 3). Furthermore, the LPA of the first terminal may display a message for allowing a user to confirm the profile transfer in the UI before the transfer request is transmitted to the profile server or the service provider server. The LPA of the first terminal may output the first profile as a transferred profile (transfer icon indication, transfer text indication, etc.) as in 370 of FIG. 3. Unlike in the illustrated embodiment, the LPA of the first terminal may delete the corresponding profile from a profile list and may not output the corresponding profile.

The SM-DS or SM-DP+ may notify the second terminal of the download of a profile (Profile_2) corresponding to the profile (Profile_1) onto the second terminal. Alternatively, the download of the profile (Profile_2) may be selected when a user manipulates the second terminal or may be initiated based on information received by the second terminal by first requesting the information from the SM-DS or SM-DP+. Furthermore, the download may be initiated through remote profile management (RPM) received from the SM-DP+. The second terminal may display an initialization event for the download of the profile in the UI, may receive the confirmation event of a user (350 of FIG. 3), and may display the results (e.g., a success or failure) of the profile download and information about the downloaded profile in the UI (360 of FIG. 3).

Then operational sequence shown in FIG. 3 as described above is only a simple example. That is, operations 340, 350, 360 and 370 of FIG. 3 may be performed in a different sequence.

Figure 4:
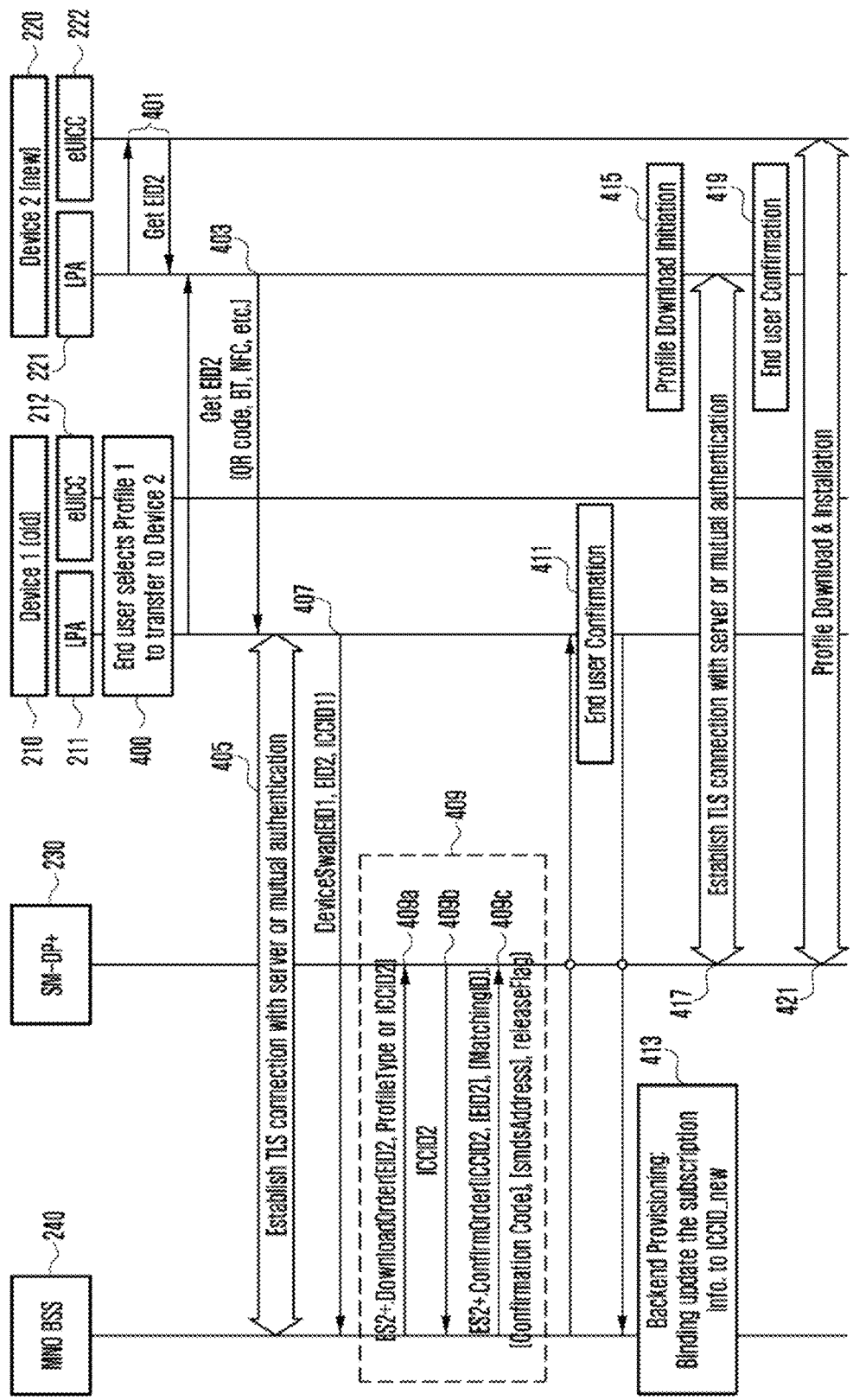
FIG. 4 is a diagram showing a message exchange procedure between terminals, a profile server and a service provider server when a first terminal transmits, to the profile server, a request to download a profile corresponding to one or more selected profiles within the first terminal from the profile server to the second terminal and the downloaded profile is installed on the second terminal.

FIG. 4 is a diagram showing a message exchange procedure between terminals (e.g., a first terminal 210 and a second terminal 220), a profile server 230 and a service provider server 240 when the first terminal 210 transmits, to the profile server 230, a request to download a profile corresponding to one or more selected profiles within the first terminal 210 from the profile server 230 to the second terminal 220 and the downloaded profile is installed on the second terminal 220.

Referring to FIG. 4, at operation 400, the LPA 211 of the first terminal 210 that has received an event to request the transfer of a first profile (Profile1) that has already been installed may request the identifier of an eUICC 212 and the identifier (ICCID1) of Profile 1 from the eUICC 212, and may receive them. At operation 401, the LPA 221 of the second terminal 220 requests an eUICC identifier (EID2) from the eUICC 222 and receives the eUICC identifier (EID2). At operation 403, the LPA 211 of the first terminal may receive the eUICC identifier (EID2) of the second terminal from the LPA 221 of the second terminal. In this case, the LPA 221 of the second terminal that has obtained EID2 at operation 401 may display EID2 in a UI in a QR code form. The LPA 211 of the first terminal may photograph the QR code displayed on a screen using a camera, and may obtain and receive EID2 using a method of extracting EID2 from the photographed QR code (403). Furthermore, at operation 403, the first terminal and the second terminal set up a connection therebetween using a communication method, such as Bluetooth®, NFC, a WLAN or cellular, in addition to a method using the QR code. The LPA 211 of the first terminal may receive EID2 from the LPA 221 of the second terminal through the corresponding connection. Furthermore, at operation 403, the LPA 211 of the first terminal may receive EID2 in response to a user input through a UI.

At operation 405, the first terminal 210 or the LPA 211 of the first terminal may establish a TLS connection with the service provider server 240 and perform server authentication or mutual authentication. At operation 407, the LPA 211 of the first terminal may transmit a message to request the download of a profile corresponding to Profile1 onto the second terminal to the service provider server 240. In this case, the message transmitted from the LPA 211 of the first terminal to the service provider server 240 at operation 407 may be a DeviceSwap message. The message may include at least one of the eUICC identifier (EID1) of the first terminal, the eUICC identifier (EID2) of the second terminal, and the identifier (ICCID1) of Profile 1.

At operation 409, the service provider server 240 and the profile server 230 prepare the profile (Profile2) corresponding to the profile (Profile1). At operation 409a, the service provider server 240 may request at least one of the eUICC identifier (EID2) of the second terminal and the type (ProfileType) of profile whose preparation is requested or the identifier (ICCID2) of a given profile whose download needs to be prepared from the profile server 230. At operation 409b, the profile server 230 may select one of not-used profiles belonging to the type of requested profile within the corresponding server, and may deliver the identifier (ICCID2) of the corresponding profile to the service provider server 240. At operation 409b, if a profile indicated by the requested profile identifier within the corresponding server is available (if the profile has been generated, but is not used), the profile server 230 may deliver the identifier (ICCID2) of the corresponding profile to the service provider server 240. At operation 409c, the service provider server 240 may transmit a message to confirm the preparation of the profile indicated by the profile identifier (ICCID2) received from the profile server 230 (i.e., message asking whether the preparation of the profile has been completed) to the profile server 230. At operation 409c, the service provider server 240 may include at least one of the identifier (ICCID2) of the profile, the eUICC identifier (EID2) of the second terminal, a matching ID, confirmation code, an SM-DS address and a release flag in a message, and may transmit the message. After operation 409, the profile server 230 may transmit a message, including the eUICC identifier (EID2) of the second terminal on which the prepared profile will be downloaded and information indicating that the download of the generated profile should be executed, to an SM-DS (not posted).

After operation 409, the service provider server 240 or the profile server 230 notifies the LPAs of the first terminal 210 and second terminal 220 that the profile (Profile2) corresponding to the first profile (Profile1) has been prepared. At operation 411, the LPA 211 of the first terminal 210 may display a message that allows a user to confirm the transfer of the first profile to the second terminal (i.e., the disabling and deletion of the first profile and the download of the second profile onto the second terminal) in the UI. At operation 413, the service provider server 240 may perform backend provisioning that connects subscriber information (e.g., a telephone number, quality information such as network speed, and payment information) connected to the old first profile to the second profile (e.g., ICCID_new). When the connection with the subscriber information of the old first profile is released and the first profile is disabled in a system through the backend provisioning process at operation 413, the communication service connection of the first terminal may be disabled. Alternatively, if the connection with the subscriber information of the old first profile is maintained and the second profile is additionally connected (one person multi-device (OPMD) scenario), the communication service connection of the first terminal is maintained. When the download and installation of the second profile are completed in the second terminal, the second terminal may also be connected to the communication service.

At operation 415, the profile download of the second terminal may be started when the SM-DS or SM-DP+ notifies the second terminal 220 or the LPA 221 of the second terminal of the download, may be selected when a user manipulates the terminal, or may be initiated based on information received by the terminal by first requesting the information from the SM-DS or SM-DP+. In this case, the information received by the terminal by first requesting the information from the SM-DS may include an SM-DP+ address and a delimiter capable of identifying the start of the profile download. Furthermore, the download may be initiated through RPM received from the SM-DP+. At operation 413, the LPA 221 of the second terminal initiates the download of the new profile based on at least one of the aforementioned examples.

At operation 417, the second terminal 220 or the LPA 221 of the second terminal may establish a TLS connection with the profile server 240 and perform server authentication or mutual authentication. At operation 419, the LPA 221 of the second terminal may display an initialization event for the download of the profile in the UI and receive a confirmation event from the user. At operation 421, the second terminal may perform the download of the second profile (Profile2) from the profile server 230.

Figure 5:
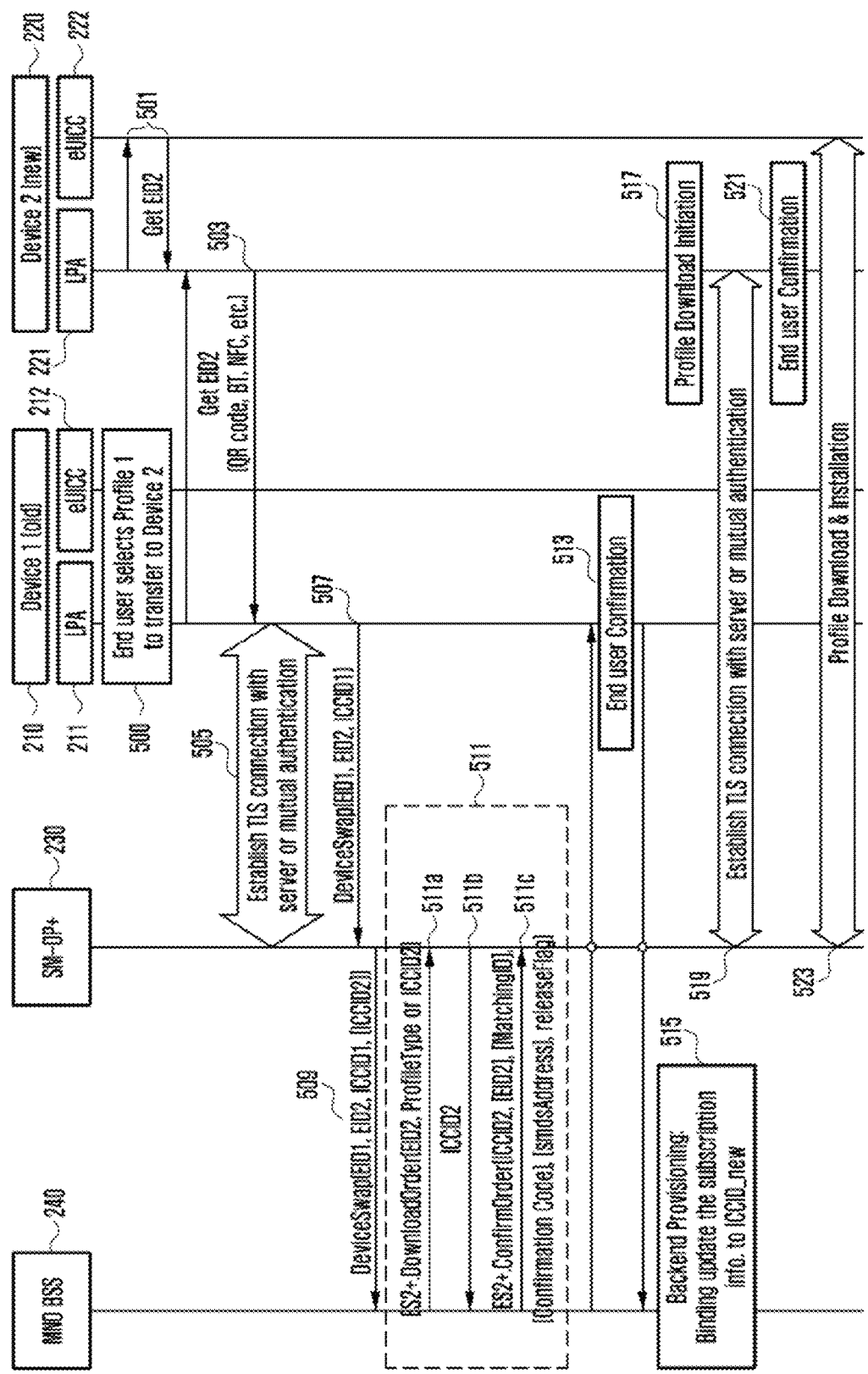
FIG. 5 is a diagram showing an operation through a user interface (UI) in a first terminal and a second terminal when the first terminal transmits, to the profile server, a request to download a profile, corresponding to one or more selected profiles within the first terminal, from the profile server to the second terminal and the downloaded profile is installed on the second terminal.

FIG. 5 is a diagram showing a message exchange procedure between terminals (e.g., the first terminal 210 and the second terminal 220), the profile server 230 and the service provider server 240 when the first terminal 210 makes a terminal substitution request that downloads a profile corresponding to one or more selected profiles of eUICC profiles downloaded and installed on the eUICC of the first terminal 210 onto the second terminal 220 to the profile server 230. That is, FIG. 5 is different from FIG. 4 in that the terminal substitution request (or profile transfer request) is transmitted to the profile server 230.

Referring to FIG. 5, at operation 500, the LPA 211 of the first terminal 210 that has received an event to request the transfer of the first profile (Profile1) that has already been installed may request the identifier of the eUICC 212 and the identifier (ICCID1) of Profile 1 from the eUICC 212, and may receive them. At operation 501, the LPA 221 of the second terminal may receive the eUICC identifier (EID2) by requesting it from the eUICC 222. At operation 503, the LPA 211 of the first terminal may receive the eUICC identifier (EID2) of the second terminal from the LPA 221 of the second terminal. In this case, the LPA 221 of the second terminal that has received EID2 at operation 501 may display EID2 in the UI in a QR code form. The LPA 211 of the first terminal may photograph the QR code displayed on a screen using the camera, and may obtain or receive EID2 using a method of extracting EID2 from the photographed QR code (503). Furthermore, at operation 503, the first terminal and the second terminal may establish a connection therebetween using a communication method, such as Bluetooth®, NFC, a WLAN or cellular, in addition to a method using the QR code. The LPA 211 of the first terminal may receive EID2 from the LPA 221 of the second terminal through the corresponding connection. Furthermore, at operation 503, the LPA 211 of the first terminal may receive EID2 in response to a user input through a UI.

At operation 505, the first terminal 210 or the LPA 211 of the first terminal may establish a TLS connection with the profile server 230 and perform server authentication or mutual authentication. At operation 507, the LPA 211 of the first terminal may transmit a message that requests a profile corresponding to Profile1 to be downloaded onto the second terminal to the profile server 230. In this case, at operation 507, the message transmitted from the LPA 211 of the first terminal to the profile server 230 may be a DeviceSwap message. The message may include at least one of the eUICC identifier (EID1) of the first terminal, the eUICC identifier (EID2) of the second terminal and the identifier (ICCID1) of Profile 1.

At operation 509, the profile server 230 may deliver the message that has received from the first terminal 210 at operation 507 and that requests the profile corresponding to Profile1 to be downloaded onto the second terminal to the service provider server 240. In this case, the message at operation 509 may include a profile identifier (ICCID2) that has been selected by the profile server 230 and that may be used as a profile corresponding to Profile1.

At operation 511, the service provider server 240 and the profile server 230 prepare the profile (Profile2) corresponding to the profile (Profile1). At operation 511a, the service provider server 240 may request at least one of the eUICC identifier (EID2) of the second terminal and the type (ProfileType) of a profile whose preparation is requested or the identifier (ICCID2) of a given profile whose download needs to be prepared from the profile server 230. At operation 511b, the profile server 230 may select one of not-used profiles belonging to the type of requested profile within the corresponding server, and may transmit the identifier (ICCID2) of the corresponding profile to the service provider server 240. At operation 511b, if a profile indicated by the requested profile identifier (ICCID2) within the corresponding server is available (if the profile has been generated, but is not used), the profile server 230 may deliver the identifier (ICCID2) of the corresponding profile to the service provider server 240. At operation 511c, the service provider server 240 may transmit a message that confirms the preparation of the profile indicated by the profile identifier (IC-CID2) received from the profile server 230 to the profile server 230. At operation 511c, the service provider server 240 may include the identifier (ICCID2) of the profile, the eUICC identifier (EID2) of the second terminal, a matching ID, confirmation code, an SM-DS address and a release flag in a message, and may transmit the message. After operation 511, the profile server 230 may transmit a message, including the eUICC identifier (EID2) of the second terminal on which the prepared profile will be downloaded and information to indicate the execution of the download of the generated profile, to an SM-DS (not posted).

After operation 511, the service provider server 240 or the profile server 230 notifies the LPAs of the first terminal 210 and the second terminal 220 that the profile (Profile2) corresponding to the first profile (Profile1) has been prepared. At operation 513, the LPA 211 of the first terminal 210 may display a message that allows a user to confirm the transfer of the first profile to the second terminal (i.e., the disabling and deletion of the first profile and the download of the second profile onto the second terminal) in the UI. At operation 515, the service provider server 240 may perform backend provisioning that connects subscriber information (e.g., a telephone number, quality information such as network speed, and payment information) connected to the old first profile to the second profile (e.g., ICCID_new). When the connection with the subscriber information of the old first profile is released and the first profile is disabled in a system through the backend provisioning process at operation 515, the communication service connection of the first terminal may be disabled. Alternatively, if the connection with the subscriber information of the old first profile is maintained and the second profile is additionally connected (one number multi-device (OPMD) scenario), the communication service connection of the first terminal is maintained. When the download and installation of the second profile are completed in the second terminal, the second terminal may also be connected to the communication service.

At operation 517, the profile download may be started when the SM-DS or SM-DP+ notifies the second terminal 220 or the LPA 221 of the second terminal of the download, may be selected when a user manipulates the terminal, or may be initiated based on information received by the terminal by first requesting the information from the SM-DS or SM-DP+. In this case, the information received by the terminal by first requesting the information from the SM-DS may include an SM-DP+ address and a delimiter capable of identifying the start of the profile download. At operation 517, the LPA 221 of the second terminal initiates the download of the new profile based on at least one of the aforementioned examples.

At operation 519, the second terminal 220 or the LPA 221 of the second terminal may establish a TLS connection with the profile server 230 and perform server authentication or mutual authentication. At operation 521, the LPA of the second terminal may display an initialization event for the download of the profile in the UI, and may receive a confirmation event from the user. At operation 523, the second terminal may perform the download of the second profile (Profile2) from the profile server 230.

Figure 6:
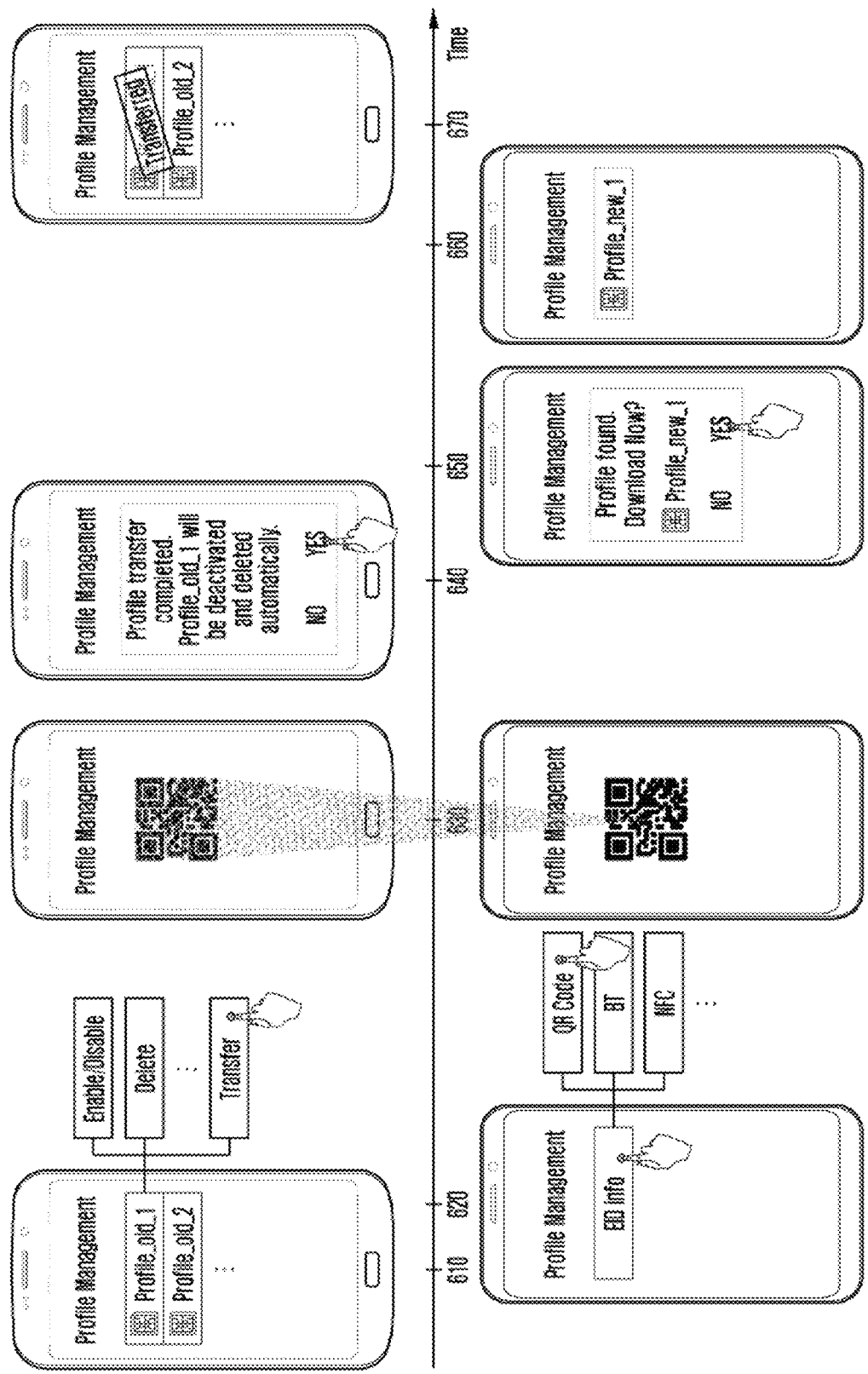
FIG. 6 is a diagram showing a UI operation of a first terminal and a second terminal when the second terminal requests that a profile corresponding to one or more selected profiles of eUICC profiles downloaded and installed on the eUICC of the first terminal be downloaded onto the second terminal.

FIG. 6 is a diagram showing a UI operation of a first terminal and a first terminal when the first terminal requests that a profile corresponding to one or more selected profiles of eUICC profiles downloaded and installed on the eUICC of the first terminal be downloaded onto the first terminal. In FIG. 6, a traverse axis shows a flow of time. Terminals shown on the upper side of FIG. 6 correspond to the first terminal on which a profile has been previously installed. Terminals shown on the lower side of FIG. 6 correspond to the second terminal on which a profile will be newly downloaded. The operational sequence of the first terminal and the second terminal shown in FIG. 6 is for convenience of description. Operations and events performed by the two terminals may be performed in a different sequence.

Referring to FIG. 6, when available profiles are displayed in the UI of the LPA of the first terminal and an event to select a first profile (Profile_1) is received, the LPA may display (e.g., enable, disable, delete or move) selectable operations related to the first profile in the UI (610). When an event to request the transfer of a profile from among the selected operations is received (e.g., a touch input to an area in which a transfer event is displayed), the first terminal may display a selectable operation of transferring the eUICC identifier (EID1) of the first terminal and a first profile identifier (ICCID1) to the second terminal in the UI (e.g., indication by text, indication by QR code, Bluetooth®, NFC or a WLAN), and may receive an event to select one of the selectable operations (not shown). For example, when an event to select indication by QR code is received, the first terminal may generate at least one of the eUICC identifier (EID1) of the first terminal and the first profile identifier (ICCID1) in a QR code form, and may display it in a UI (630).

Furthermore, the first terminal may deliver one of the eUICC identifier (EID1) of the first terminal and the first profile identifier (ICCID1) to the second terminal using a first transfer method (e.g., one of indication by text, indication by QR code, Bluetooth®, NFC and a WLAN), and may deliver the other of the eUICC identifier (EID1) of the first terminal and the first profile identifier (ICCID1) to the second terminal using a second transfer method (e.g., the other of indication by text, indication by QR code, Bluetooth®, NFC and a WLAN) different from the first transfer method.

At the same point of time, the second terminal may have been connected to a cellular network (e.g., 3G or 4G LTE), a WLAN or a communication network through tethering using the first terminal. The LPA of the second terminal may display an operation of receiving a profile being used in another terminal in a UI, and may receive an event to select the operation (not shown). Furthermore, when selectable operations (e.g., manual input, QR code, Bluetooth®, NFC and a WLAN) of receiving the eUICC identifier (EID1) of the first terminal and the identifier (ICCID1) of the first profile from the first terminal are displayed in the UI of the LPA of the second terminal, the second terminal may receive an event to select one of the displayed selectable operations (620). FIG. 6 shows an example in which an event to select QR code has been received. A camera for receiving the QR code of the second terminal may be enabled (630).

After receiving at least one of the eUICC identifier (EID1) of the first terminal and the first profile identifier (ICCID1) (e.g., by photographing the QR code of the first terminal using the enabled camera of the second terminal), the second terminal may transmit a request for the transfer of the first profile (Profile_1) to the second terminal to a profile server or a service provider server, and may display that the transmission has been completed in the UI of the LPA. Furthermore, the LPA of the first terminal may display a message that allows a user to confirm the profile transfer in a UI before the transfer request is transferred to the server as in 640 of FIG. 6. The LPA of the first terminal may display (e.g., transfer icon indication or transfer text indication) the first profile as a transferred profile as in 670 of FIG. 6. Unlike the illustrated embodiment, the corresponding profile may be deleted and not displayed.

An SM-DS or SM-DP+ may notify the second terminal of the download of a profile Profile_2 corresponding to the profile Profile_1 onto the second terminal, or the download may be selected when a user manipulates the second terminal or may be initiated based on information received by the second terminal by first requesting the information from the SM-DS or SM-DP+. Furthermore, the download may be initiated through RPM received from the SM-DP+. The second terminal may display an initialization event for the download of the profile in a UI, may receive a confirmation event from the user (650), and may display a result (e.g., a success or failure) of the profile download and information about the downloaded profile in the UI (660).

The operational sequence shown in FIG. 6 as described above is only a simple example. That is, operations 610, 620, 640, 650, 660 and 670 of FIG. 3 may be performed in a different sequence.

Figure 7:
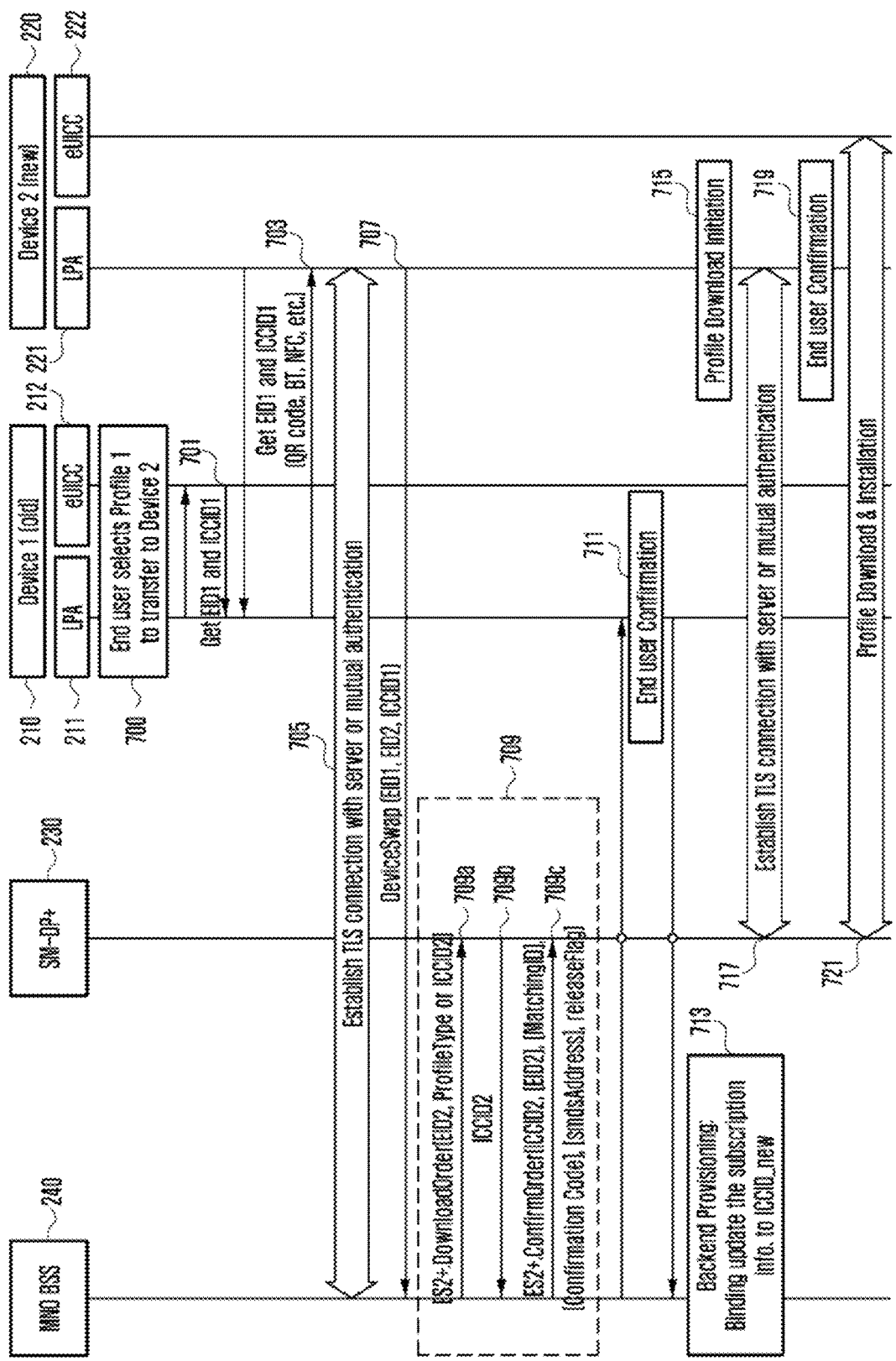
FIG. 7 is a diagram showing a message exchange procedure between terminals, the profile server and the service provider server when a second terminal transmits, to the service provider server, a request to download a profile corresponding to one or more selected profiles within a first terminal from the profile server to the second terminal and the downloaded profile is installed on the second terminal.

FIG. 7 is a diagram showing a message exchange procedure between terminals (e.g., the first terminal 210 and the second terminal 220), the profile server 230 and the service provider server 240 when the second terminal 220 makes a terminal substitution request (or profile transfer request) that downloads a profile corresponding to one or more selected profiles of eUICC profiles downloaded and installed on the eUICC of the first terminal 210 onto the second terminal 220 to the service provider server 240.

Referring to FIG. 7, the LPA 211 of the first terminal that has received an event to request the transfer of a first profile (Profile1) that has already been installed at operation 700 may receive the identifier (EID1) of the eUICC 212 and the identifier (ICCID1) of Profile 1 by requesting them from the eUICC 212 at operation 701. Furthermore, at operation 703, the LPA 211 of the first terminal may display at least one of EID1 and ICCID1 in a UI in a QR code form. At operation 703, the LPA 221 of the second terminal may receive at least one of the eUICC identifier (EID1) of the first terminal and Profile1 from the LPA of the first terminal 221. For example, at operation 703, the LPA 221 of the second terminal may obtain or receive at least one of EID1 and Profile 1 in such a way as to photograph the QR code displayed on a screen using the camera and to extract at least one of EID2 and ICCID2 from the photographed QR code. Furthermore, at operation 703, the first terminal and the second terminal may establish a connection therebetween using a communication method, such as Bluetooth®, NFC, a WLAN or cellular, in addition to a method using the aforementioned QR code. The LPA 221 of the second terminal may receive at least one of EID2 and ICCID1 from the LPA of the first terminal 221 through the corresponding connection. Furthermore, at operation 703, the LPA 221 of the second terminal may receive at least one of EID2 and ICCID1 in response to a user input through a UI.

At operation 705, the second terminal 220 or the LPA 221 of the second terminal may establish a TLS connection with the service provider server 240 and perform server authentication or mutual authentication. At operation 707, the LPA 221 of the second terminal may transmit a message to request the download of a profile corresponding to Profile1 onto the second terminal to the service provider server 240. In this case, at operation 707, the message transmitted from the LPA 221 of the second terminal to the service provider server 240 may be a DeviceSwap message. The message may include at least one of the eUICC identifier (EID1) of the first terminal, the eUICC identifier (EID2) of the second terminal, and the identifier (ICCID1) of Profile 1.

Operations 709 (709a, 709b, 709c), 711, 713, 715, 717, 719 and 721 are the same as those 409 (409a, 409b and 409c), 411, 413, 415, 417, 419 and 421 (including the operation illustrated as having not been shown in FIG. 3), and thus a detailed description thereof is omitted.

Figure 8:
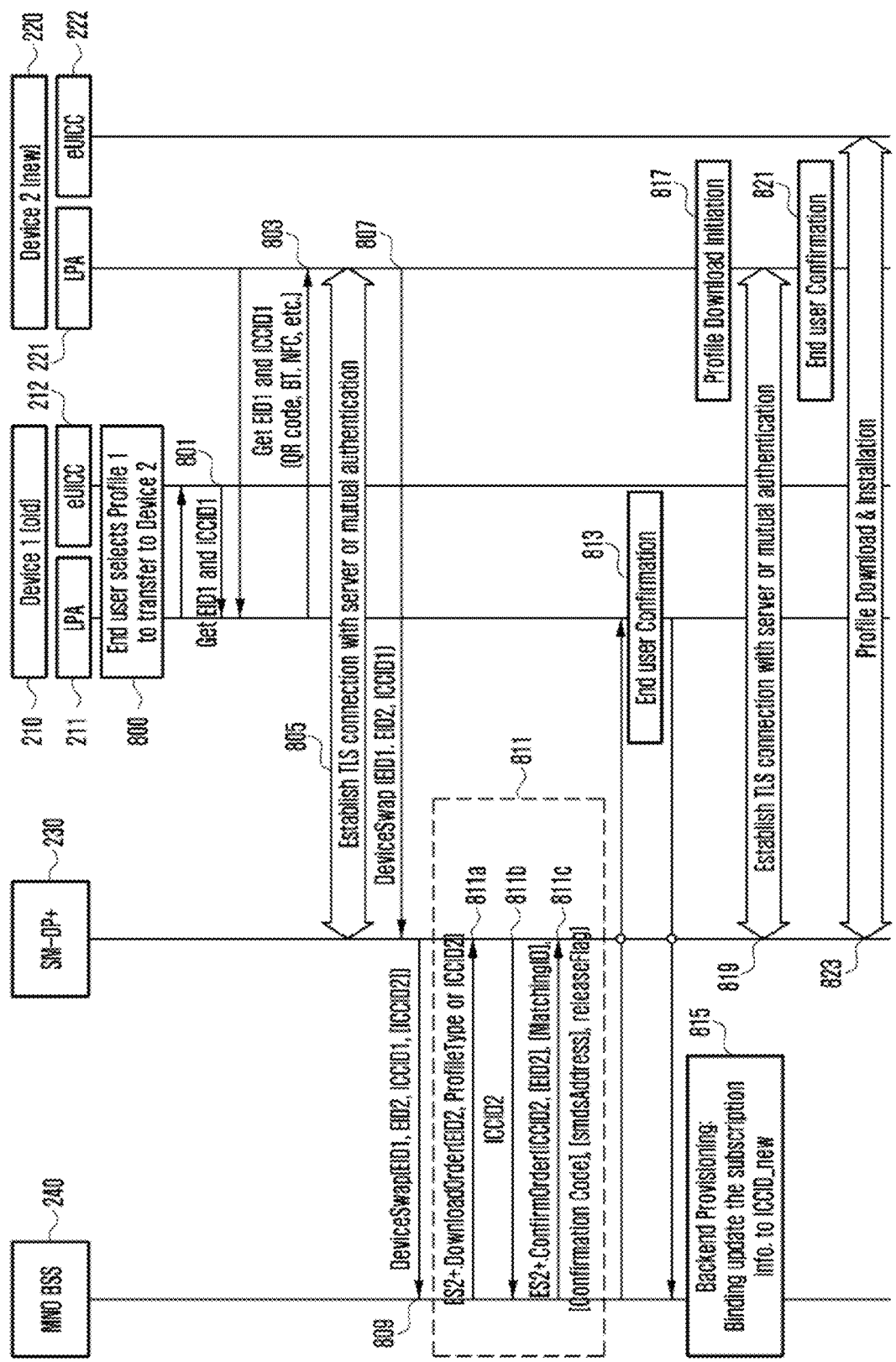
FIG. 8 is a diagram showing a message exchange procedure between terminals, the profile server and the service provider server when a second terminal transmits, to the profile server, a request to download a profile corresponding to one or more selected profiles within a first terminal from the profile server to the second terminal and the downloaded profile is installed on the second terminal.

FIG. 8 is a diagram showing a message exchange procedure between terminals (e.g., the first terminal 210 and the second terminal 220), the profile server 230 and the service provider server 240 when the second terminal 220 makes a terminal substitution request (or profile transfer request) that downloads a profile corresponding to one or more selected profiles of eUICC profiles downloaded and installed on the eUICC of the first terminal 210 onto the second terminal 220 to the profile server 230.

Operations 800, 801 and 803 of FIG. 8 are the same as operations 700, 701 and 703 of FIG. 7, and a detailed description thereof is omitted. At operation 805, the second terminal 220 or the LPA 221 of the second terminal may establish a TLS connection with the profile server 230 and perform server authentication or mutual authentication. At operation 807, the LPA 221 of the second terminal may transmit a message to request the download of a profile corresponding to Profile1 onto the second terminal to the profile server 230. In this case, at operation 807, the message transmitted from the LPA 221 of the second terminal to the profile server 230 may be a DeviceSwap message. The message may include at least one of the eUICC identifier (EID1) of the first terminal, the eUICC identifier (EID2) of the second terminal, and the identifier (ICCID1) of Profile 1.

At operation 809, the profile server 230 may transmit a message that requests the download of the profile corresponding to Profile1, received from the second terminal 220 at operation 807, onto the second terminal 220 to the service provider server 240. In this case, the message at operation 809 may include a profile identifier (ICCID2) available as the profile corresponding to Profile1 selected by the profile server 230.

Operations 811 (811a, 811b and 811c), 813, 815, 817, 819, 821 and 823 of FIG. 8 are the same as those 511 (511a, 511b and 511c), 513, 515, 517, 519, 521 and 523 shown in FIG. 5 (including the operation illustrated as having not been shown in FIG. 5), and thus a detailed description thereof is omitted.

Figure 9:
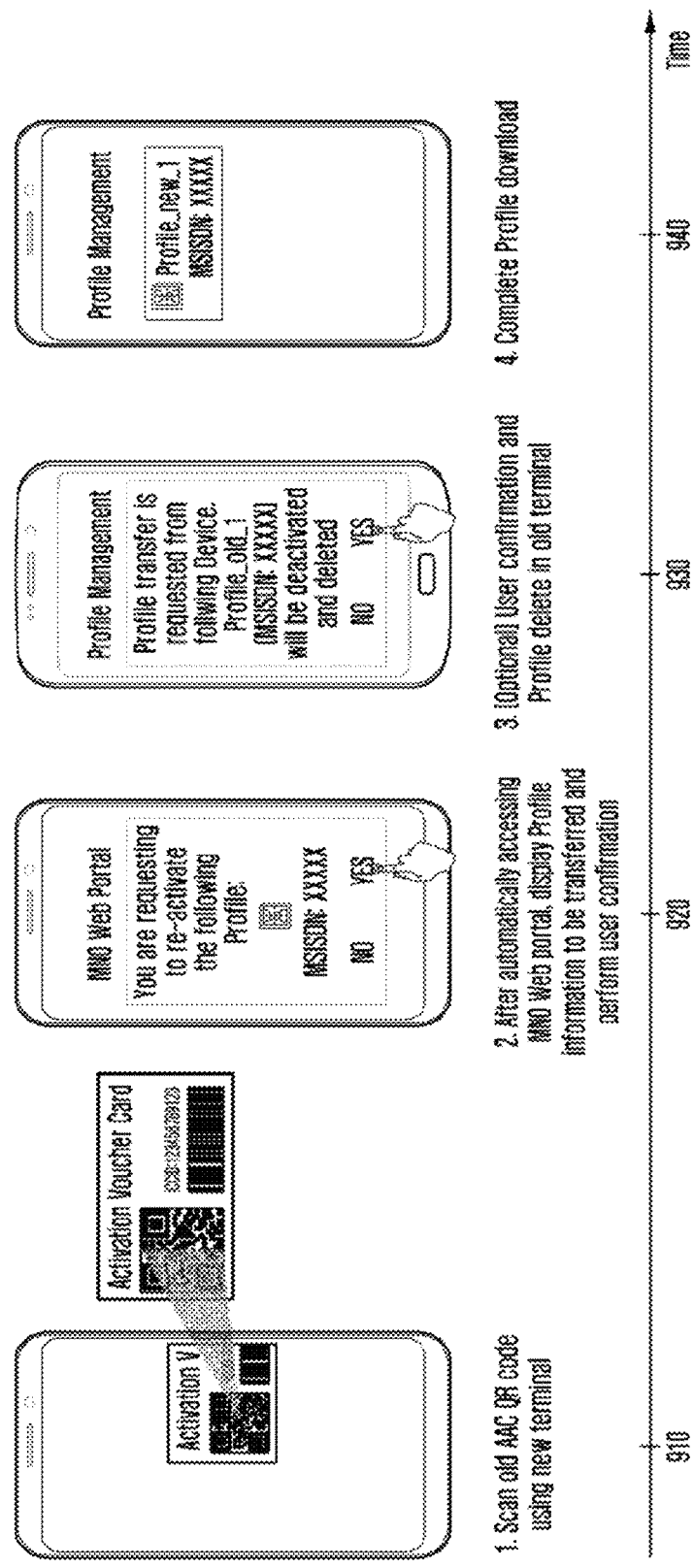
FIG. 9 is a diagram showing an operation through a user interface (UI) in a first terminal and a second terminal when the second terminal photographs advanced activation code (AAC) QR code used when a first profile was installed on the first terminal and installs a profile corresponding to the first profile.
Figure 10:
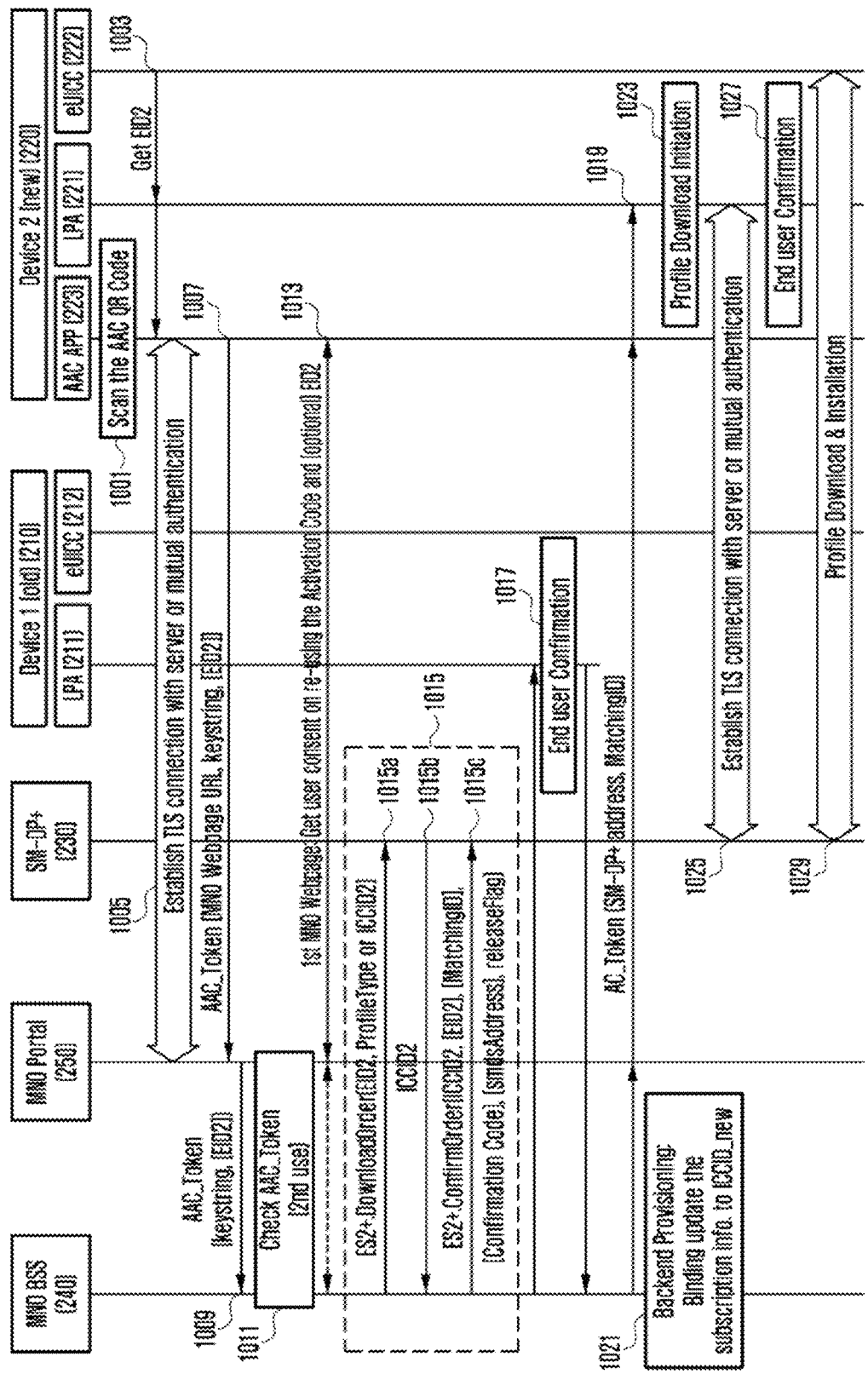
FIG. 10 is a diagram showing a message exchange procedure between a first terminal 210, a second terminal 220, a profile server 230, a service provider server 240 and a service provider web portal server 240 when a second terminal photographs AAC QR code used when a first profile was installed on the first terminal and transmits a request to install a profile corresponding to the first profile on the second terminal through the service provider web portal or the service provider server.
Figure 11:
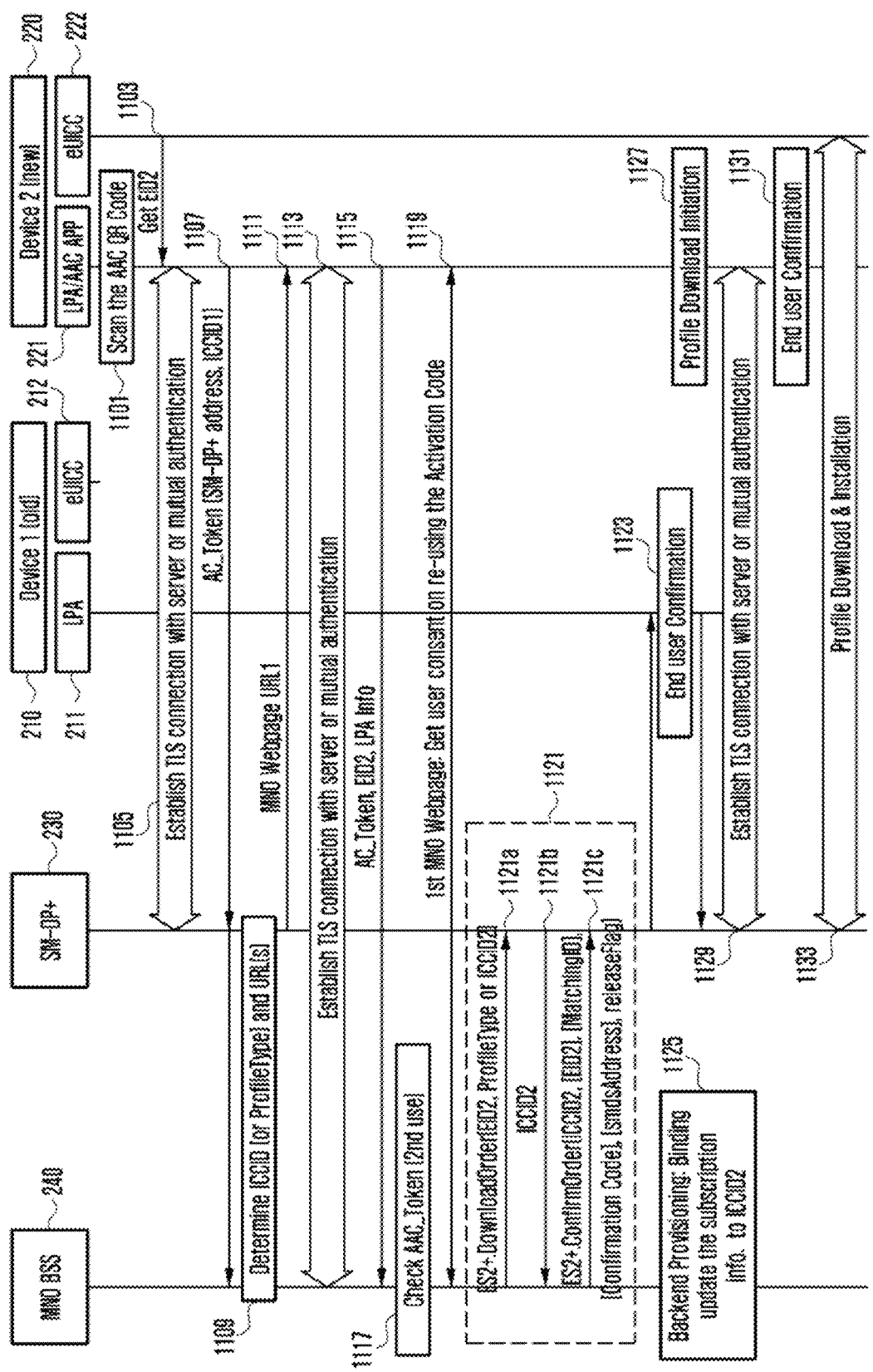
FIG. 11 is a diagram showing a message exchange procedure between the first terminal 210, the second terminal 220, the profile server 230, the service provider server 240 and the service provider web portal server 240 when the second terminal photographs AAC QR code used when the first profile was installed on the first terminal and transmits a request to install a profile corresponding to the first profile on the second terminal through the profile server.

FIGS. 9, 10 and 11 show embodiments in which a second terminal photographs AAC QR code used when a first profile was installed on a first terminal and installs a profile corresponding to the first profile. In FIG. 9, a traverse axis indicates a flow of time. A terminal shown in a process 930 of FIG. 9 is the first terminal on which a profile has been previously installed. Terminals shown in processes 910, 920 and 940 of FIG. 9 correspond to the second terminal on which a profile will be newly downloaded. The operational sequence of the first terminal and the second terminal shown in FIG. 9 is for convenience of description. Operations and events performed by the two terminals may be performed in a different sequence.

An AAC application (AAC APP) performs an overall operation for profile download of receiving an AAC value, connecting to a service provider portal through an embedded web browser or a web browser installed on the same terminal. The AAC APP may be an app separated from an LPA. The AAC APP may deliver information for profile download to an LPA through the application programmable interface (API) of the LPA. Furthermore, in this specification, the LPA may collectively mean that the LPA has merged the function of the AAC APP, that is, an embedded module. Accordingly, in various embodiments of the present disclosure, an operation to describe an operation of the AAC APP may also be performed in the LPA.

A service provider web portal server is a web server which may be accessed by a terminal using an AAC value. The web portal server may deliver a service provider web page to a web browser of the terminal, and may deliver an AAC value and terminal information to a service provider server for subscription processing. In various embodiments of the present disclosure, the service provider server may include a service provider web portal server. An operation of the service provider web portal server may also be performed in the service provider server.

FIG. 9 is a diagram showing an operation through a user interface (UI) in the first terminal and second terminal when the second terminal photographs AAC QR code used when a first profile was installed on the first terminal and installs a profile corresponding to the first profile.

Referring to FIG. 9, at operation 910, the AAC APP of the second terminal may receive an event to input an AAC value used for the installation of the first profile in the first terminal through a UI. The AAC value may be input to the second terminal through several methods, such as QR code scan through the camera and a user's manual input, based on the method of FIG. 9, and a method of inputting the AAC value is not limited. The AAC value includes a service provider web portal server address (MNS portal URL), and may further include keystring uniquely indicative of the AAC value.

At operation 920, the AAC APP of the second terminal that has received the AAC value may access a service provider web portal through a web browser embedded in the AAC APP or an external web browser outside the AAC APP installed on the second terminal, and may display a web page, corresponding to an AAC value received from the service provider web portal, and selectable operations in the web browser. Furthermore, the AAC APP of the second terminal may also display a telephone number (MSISDN) value connected to the first profile installed on the first terminal based on the input AAC value. In this case, the selectable operations may be any one operation of the download of a second profile corresponding to the first profile already installed on the first terminal based on the AAC value, and the download of the new second profile. Furthermore, the selectable operations may be the download of the second profile for data sharing, for example, one person multi-device (OPMD) service, in subscriber information connected the old first profile. The AAC APP may receive an event that one of the selectable operations has been selected from a user, and may additionally receive an event to confirm the corresponding input.

At operation 930, the LPA of the first terminal may display an event to request a user's confirmation regarding the execution of an operation associated with the first profile installed on the first terminal using the AAC value input in the second terminal, and may receive a confirmation event. In this case, the first profile of the first terminal may be disabled or deleted through the event at operation 930. At operation 940, the LPA of the second terminal may display a result (e.g., a success or failure) of profile download and information about the downloaded profile in a UI.

FIG. 10 is a diagram showing a message exchange procedure between the first terminal 210, the second terminal 220, the profile server 230, the service provider server 240 and a service provider web portal 240 when the second terminal 220 photographs AAC QR code used when a first profile was installed on the first terminal 210 and transmits a request to install a profile corresponding to the first profile on the second terminal 220 through the service provider web portal 250 or the service provider server 240.

Referring to FIG. 10, at operation 1001, the AAC APP 223 of the second terminal or the LPA 221 of the second terminal including the function of the AAC APP may obtain an AAC value by photographing the AAC QR code used when the first profile was installed. As described above, the AAC value may be transmitted to the second terminal after a mutual connection is established using a user input, a short-distance communication method, such as Bluetooth® or NFC from the first terminal, and a communication method, such as a WLAN or a cellular, in addition to the method using QR code. At operation 1001, the AAC value input to the AAC APP 223 may include a service provider web portal server address and a unique keystring different from another AAC value, and may further include a combination of the two values. Furthermore, the AAC APP 223 may call a service provider web portal server address stored in the AAC APP using the AAC value or generate a service provider web portal server address.

At operation 1003, the LPA 221 of the second terminal may obtain an eUICC identifier (EID2) from the eUICC 222 of the second terminal and deliver EID2 to ACC APP 223. At operation 1005, the AAC APP 223 of the second terminal may establish a TLS connection with the service provider web portal server 250 of the service provider web portal server address and perform server authentication or mutual authentication. At operation 1007, the AAC APP 223 may transmit an AAC token to the service provider web portal server 250. The AAC token may include at least one value of the service provider web portal server address and the unique keystring, and may include a combination of the two values. Furthermore, the AAC token may additionally include the EID2 value obtained at operation 1003.

At operation 1009, the service provider web portal server 250 may deliver the AAC token to the service provider server 240. At operation 1011, the service provider server 240 determines whether the AAC token value has a history of having been used in another eUICC. That is, the service provider server 240 determines whether the AAC token is to be reused. Operation 1011 may also be performed in the service provider web portal server 250. If the AAC token value has a history of having been used in another eUICC (i.e., if the AAC token value is second used), at operation 1013, the service provider web portal server 250 transmits a telephone number (MSISDN) value connected to the first profile installed on the first terminal based on the input AAC value and a selectable operation for profile download (at least one of the download of a second profile corresponding to the first profile already installed on the first terminal based on the AAC value, the download of the new second profile, and the download of the second profile for data sharing with subscriber information connected to the first profile, for example, an OPMD service) to the AAC APP 223. The AAC APP 223 displays the received information in a web page of a web browser. Furthermore, at operation 1013, the AAC APP 223 transmits a profile download event selected by a user and an eUICC identifier (EID2) (optional) to the service provider web portal server 250. The service provider web portal server 250 may deliver the event and EID2 to the service provider server 240.

At operation 1015, the service provider server 240 and the profile server 230 prepare a profile (Profile2) corresponding to the profile (Profile1). At operation 1015a, the service provider server 240 may request at least one of the eUICC identifier (EID2) of the second terminal and the type (ProfileType) of a profile whose preparation is requested or the identifier (ICCID2) of a given profile whose download needs to be prepared. At operation 1015*b*, the profile server 230 may select one of not-used profiles belonging to the type of a requested profile within the corresponding server and transmit the identifier (ICCID2) of the corresponding profile to the service provider server 240. At operation 1015*b*, if a profile indicated by the requested profile identifier within the corresponding server is available (if the profile has been generated, but is not used), the profile server 230 may deliver the identifier (ICCID2) of the corresponding profile to the service provider server 240. At operation 1015*c*, the service provider server 240 may transmit a message to confirm the preparation of the profile, indicated by the profile identifier (ICCID2) received from the profile server 230, to the profile server 230. The message transmitted by the service provider server 240 at operation 1015*c* may include at least one of the identifier (ICCID2) of the profile, the eUICC identifier (EID2) of the second terminal, a matching ID, confirmation code, an SM-DS address and a release flag. After operation 1015, the profile server 230 may transmit a message, including the eUICC identifier (EID2) of the second terminal on which the prepared profile will be downloaded and information indicating that the download of the generated profile should be executed, to an SM-DS (not posted) (not shown).

At operation 1017, the service provider server 240 or the profile server 230 may notify the LPAs of the first terminal 210 and the second terminal 220 that the second profile (Profile2) corresponding to the first profile (Profile1) has been prepared, and may display a message that allows a user to confirm the installation of the second profile on the second terminal, in a UI (operation 1017 may be omitted). At operation 1017, the first profile of the first terminal may be disabled or deleted through a confirmation event from the user. At operation 1019, the service provider server 240 may deliver an activation code (AC) token to the AAC APP 223 through the service provider web portal server 250. The AAC APP 223 may deliver the AC token to the LPA 221. The AC token may include at least one of the address of the profile server 230 that has prepared the second profile and MatchingID for downloading the second profile. At operation 1021, the service provider server 240 may perform backend provisioning that connects subscriber information (e.g., a telephone number, quality information such as network speed, and payment information) connected to the old first profile to the second profile. When the connection with the subscriber information of the old first profile is released and the first profile is disabled in a system through the backend provisioning process at operation 1021, the communication service connection of the first terminal may be disabled. Alternatively, if the connection with the subscriber information of the old first profile is maintained and the second profile is additionally connected (OPMD scenario), the communication service connection of the first terminal may be maintained. When the download and installation of the second profile are completed in the second terminal, the second terminal may also be connected to the communication service.

At operation 1023, the LPA 221 of the second terminal initiates download using the AC token value. At operation 1025, the second terminal 220 or the LPA 221 of the second terminal may establish a TLS connection with the profile server 240 and perform server authentication or mutual authentication. At operation 1027, the LPA of the second terminal may display an initialization event for the download of the profile in a UI, and may receive a confirmation event from the user. At operation 1029, the second terminal may perform the download of the second profile (Profile2) from the profile server 230.

FIG. 11 is a diagram showing a message exchange procedure between the first terminal 210, the second terminal 220, the profile server 230, the service provider server 240 and the service provider web portal server 240 when the second terminal 220 photographs AAC QR code used when a first profile was installed on the first terminal 210 and transmits a request to install a profile corresponding to the first profile on the second terminal 220 through the profile server 230.

Referring to FIG. 11, at operation 1101, the LPA 221 of the second terminal may obtain an AAC value by photographing the AAC QR code used when the first profile was installed. The AAC value may be transmitted to the second terminal after a mutual connection is established using a user input, a short-distance communication method, such as Bluetooth® or NFC from the first terminal, and a communication method, such as a WLAN or a cellular, in addition to the method using QR code. At operation 1101, the AAC value input to the LPA 221 may include a service provider web portal server address and a unique keystring different from another AAC value, and may also include a combination of the two values. Furthermore, the LPA 221 may call a service provider web portal server address and profile server address stored in the LPA 221 using the AAC value or may generate a service provider web portal server address and profile server address. Furthermore, the AAC value may include Activation Code. The Activation Code may include a profile server address and a profile identifier (ICCID1).

At operation 1103, the LPA 221 of the second terminal may obtain an eUICC identifier (EID2) from the eUICC 222 of the second terminal. At operation 1105, the LPA 221 of the second terminal may establish a TLS connection with the profile server 230 of the profile server address and perform server authentication or mutual authentication. At operation 1107, the LPA 221 may transmit an AC token to the profile server 230. Furthermore, the profile server 230 may deliver the received AC token to the service provider server 240 connected to the corresponding ICCID. At operation 1109, the service provider server or the profile server may determine a service provider web portal address to be delivered to the second terminal. At operation 1111, the profile server 230 may deliver the service provider web portal address to the LPA 221 of the second terminal. At operation 1113, the LPA 221 of the second terminal may establish a TLS connection with the service provider web portal server of the service provider web portal address or the service provider server 250 and perform server authentication or mutual authentication. At operation 1115, the LPA 221 of the second terminal may deliver at least one of the AC token, EID2 and LPA information to the service provider web portal server or the service provider server 250.

At operation 1117, the service provider server 240 confirms that the received AC token has been downloaded onto the existing eUICC (i.e., the eUICC 222 of the second terminal) having another EID, and determines whether the AC token has a history of having been used before. That is, the service provider server 240 determines whether the AAC token is to be second used. If the AAC token is to be second used, at operation 1119, the service provider server 240 transmits a telephone number (MSISDN) value connected to the first profile installed on the first terminal based on the input AAC value and a selectable operation for profile download (at least one of the download of a second profile corresponding to the first profile already installed on the first terminal based on the AAC value, the download of the new second profile, and the download of the second profile for data sharing with subscriber information connected to the first profile, for example, an OPMD service) to the LPA 221. The LPA 221 displays the received information in a web page of a web browser. Furthermore, at operation 1119, the LPA 221 may deliver a profile download event, selected by a user, to the service provider server 240. Operations 1121 (1121*a*, 1121*b* and 1121*c*), 1123, 1125, 1127, 1129, 1131 and 1133 are the same as those 1015 (1015*a*, 1015*b* and 1015*c*), 1017, 1019, 1021, 1023, 1025 and 1027 disclosed in FIG. 10, and thus a detailed description thereof is omitted.

In the embodiments of the present disclosure described in FIGS. 3 to 11, the second profile corresponding to the first profile (Profile1) of the first terminal installed on the second terminal may be an eUICC profile (Profile2_1, a new profile) having an ICCID, IMSI and K values different from those of Profile1, an eUICC profile (Profile2_2, ICCID reuse) having the same ICCID value as Profile1 and IMSI and K values different from those of Profile1, or an eUICC profile (Profile2_3, ICCID and IMSI reuse) having the same ICCID and IMSI values as Profile1 or a K value different from that of Profile1. In this case, at operations 413, 515, 713, 815 and 1021, the service provider server 240 may perform backend provisioning that connects subscriber information (e.g., a telephone number, quality information such as network speed, and payment information) connected to the old first profile to the second profile. When a connection with the subscriber information of the old first profile is released and the first profile is disabled in a system, the communication service connection of the first terminal may be disabled. When the connection with the subscriber information of the old first profile is maintained and the second profile is additionally connected (OPMD scenario), the communication service connection of the first terminal may be maintained. When the download and installation of the second profile is completed in the second terminal, the second terminal may also be connected to the communication service. In such a multi-device scenario, part of a profile may be construed as being reused.

In such a multi-device, a profile installed on each terminal may be enabled by each LPA. When a profile is enabled in the eUICC of each terminal, the terminal may perform authentication for the network of a service provider using IMSI and K values within the corresponding profile and use communication service after the authentication.

At the same point of time, if Profile1 (not deleted) is installed on the first terminal and at least one of Profile2_1, Profile2_2 and Profile2_3 is installed on the second terminal, the service provider server may update ICCID, IMSI and K values connected to subscriber information and determine whether each terminal can access communication service. Furthermore, a subscriber may request access to the communication service of each terminal through the LPA of each terminal or the service provider application (service provider APP) of each terminal.

If Profile2_1 and Profile2_2 having an IMSI value different from that of Profile1 is installed on the second terminal, a service provider may perform backend provisioning so that the first terminal and the second terminal are supplied with communication service. Accordingly, the first terminal and the second terminal can perform authentication for the network of the service provider and use the communication service after the authentication. Furthermore, if Profile2_3 having the same IMSI value as Profile1 is installed on the second terminal, the service provider server may connect only one of Profile1 and Profile2_3 with subscriber information when performing backend provisioning. Accordingly, only at one point of time, only one terminal may perform authentication for the network of a service provider and use communication service after the authentication.

A case where the same profile is reused unlike in the case of the reuse of part of a profile is described. In an embodiment of the present disclosure, a second profile corresponding to the first profile (Profile1) of a first terminal installed on a second terminal may be an eUICC profile (i.e., the same profile as Profile2_4 or Profile1) having the same ICCID, IMSI and K values as Profile1. In this case, the second terminal can simplify the backend provisioning process of the service provider server 240, can perform authentication for the network of a service provider, and can use communication service after the authentication. In this case, since the same profile is reused, the profile needs to be enabled only in one terminal at the same point of time.

Figure 12:
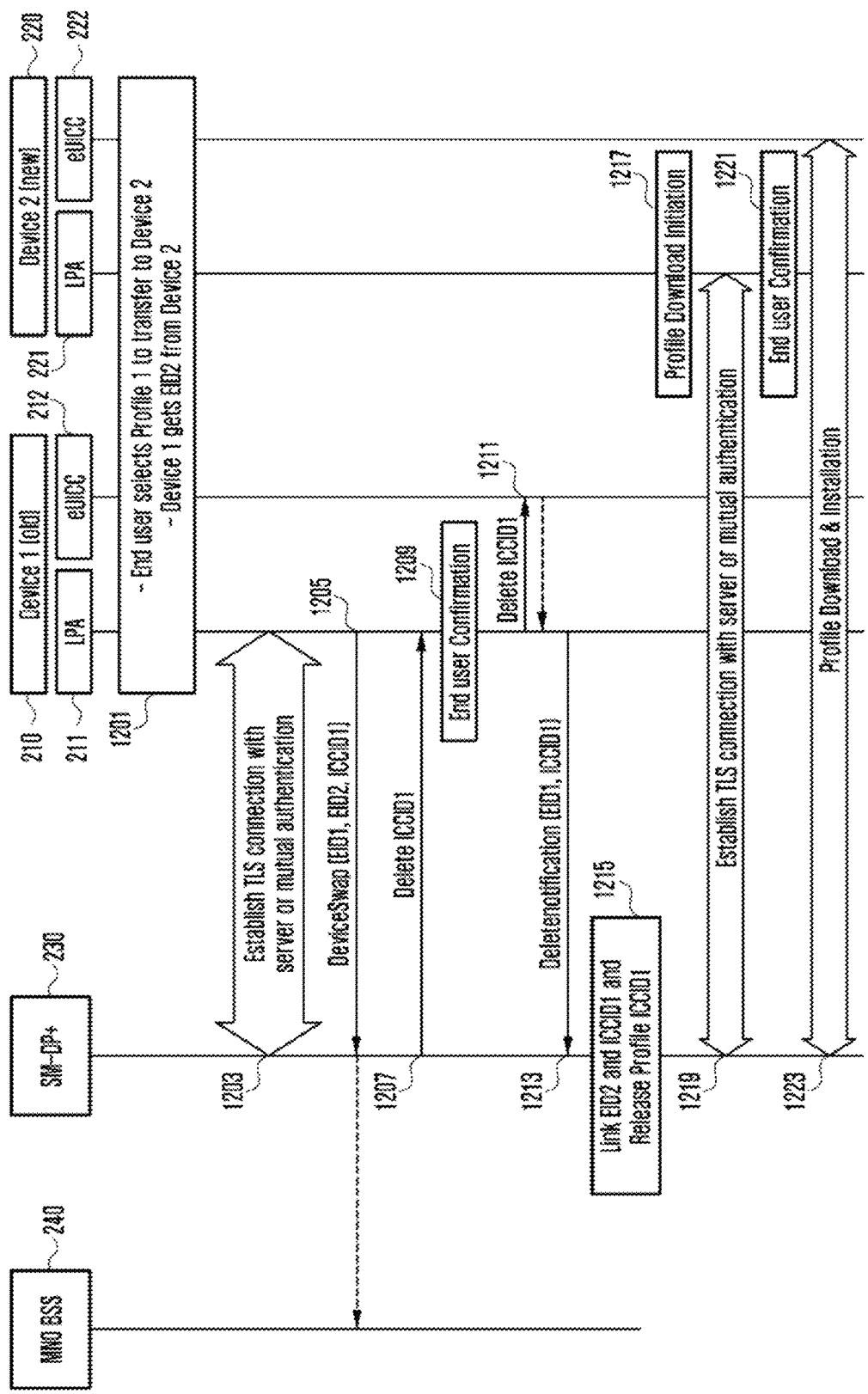
FIG. 12 is a diagram showing a message exchange procedure between terminals, the profile server and the service provider server when a first terminal confirms the deletion of one or more selected profiles within the first terminal and a corresponding profile is downloaded from the profile server to a second terminal.

FIG. 12 is a diagram showing a message exchange procedure between terminals, the profile server and the service provider server when a first terminal confirms the deletion of one or more selected profiles within the first terminal and a corresponding profile is downloaded from the profile server to a second terminal.

Referring to FIG. 12, at operation 1201, a profile to be transferred from the first terminal 210 is identified between the first terminal 210 and the second terminal 220. The eUICC identifier (EID2) of the second terminal is transmitted to the first terminal 210. A detailed description of such a process is omitted because the contents described at operations 500, 501 and 503 of FIG. 5 may be identically applied to the process. At operation 1203, the first terminal 210 or the LPA 211 of the first terminal may establish a TLS connection with the profile server 230 and perform server authentication or mutual authentication. At operation 1205, the LPA 211 of the first terminal may transmit a message to request the download of a profile corresponding to Profile1 onto the second terminal to the profile server 230 (the message may also be transmitted to the service provider server 240). The message at operation 1205 may be a DeviceSwap message and include information about at least one of EID1, EID2 and ICCID1.

At operation 1207, the profile server 230 may deliver a delete request for the profile (Profile1) to be transferred to the LPA 211 of the first terminal. At operation 1209, the LPA 211 may display a delete event for the profile in a UI and receive the confirmation event of a user. At operation 1211, the LPA 211 delivers a delete command for the profile of a profile identifier (ICCID1) to the eUICC 212 of the first terminal. If the deletion is successfully completed, at operation 1213, the LPA 211 of the first terminal transmits a delete result message (Deletenotification) to the profile server 230. The delete result message may include EID1 and ICCID1.

At operation 1215, the profile server 230 may connect the same profile as the old profile (Profile1) to be transferred from the first terminal to EID2, and may perform a configuration so that the same profile is downloaded onto the second terminal (e.g., through a backend provisioning procedure). At operation 1217, the download of the profile may be started when the SM-DS or SM-DP+ notifies the LPA 221 of the second terminal of the download or may be selected when a user manipulates the terminal or the LPA 221 of the second terminal may initiate the download of the profile based on information received by the terminal by first requesting the information from the SM-DS or SM-DP+. In this case, the information received by the terminal by first requesting the information from the SM-DS may include an SM-DP+ address and a delimiter capable of identifying the start of the profile download.

At operation 1219, the second terminal 220 or the LPA 221 of the second terminal may establish a TLS connection with the profile server 230 and perform server authentication or mutual authentication. At operation 1221, the LPA 221 of the second terminal may display an initialization event for the download of the profile in a UI and receive a confirmation event from a user. At operation 1223, the second terminal may perform the download of the second profile (Profile2) from the profile server 230.

Figure 13:
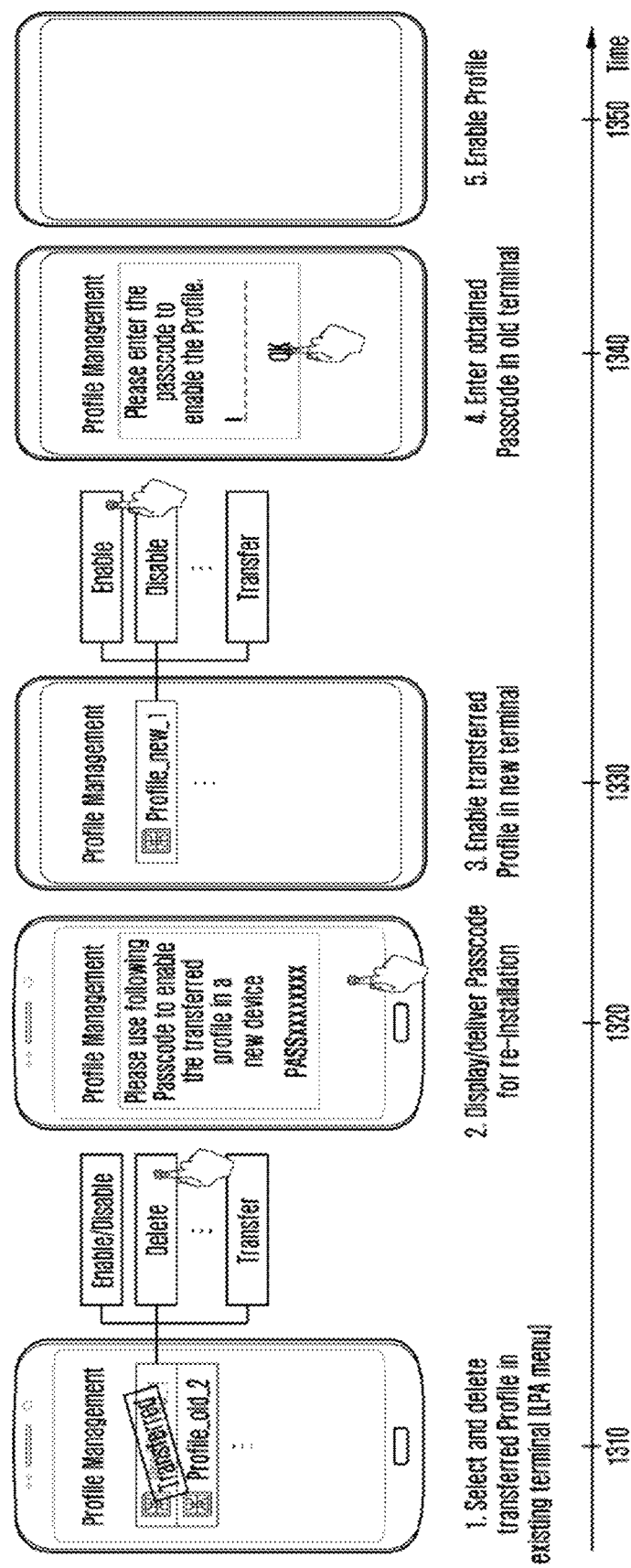
FIG. 13 is a diagram showing a UI operation of a first terminal and a first terminal when a profile of the second terminal is enabled using activation code displayed in a UI when a profile installed on the first terminal is disabled or deleted if profiles having the same IMSI and K values are installed on the first terminal and the second terminal.

FIG. 13 is a diagram showing a UI operation of a first terminal and a first terminal when a profile of the second terminal is enabled using Activation Code displayed in a UI when a profile installed on the first terminal is disabled or deleted if profiles having the same IMSI and K values are installed on the first terminal and the second terminal.

In FIG. 13, a traverse axis indicates a flow of time. Terminals shown in operations 1310 and 1320 of FIG. 13 correspond to the first terminal on which a profile has been previously installed. Terminals shown in operations 1330, 1340 and 1350 of FIG. 13 correspond to the second terminal on which a profile will be newly downloaded. The operational sequence of the first terminal and second terminal shown in FIG. 13 is for convenience of description. Operations and events performed by the two terminals may be performed in a different sequence.

Referring to FIG. 13, at operation 1310, when the first terminal receives an event to select a first profile (Profile1) whose transfer to the second terminal has been requested in a UI of the LPA of the first terminal, the LPA may display (e.g., enable, disable, delete or move) selectable operations related to the first profile in the UI. When an event to request profile deletion (e.g., an input to touch an area for the delete event) is received during the related operations, at operation 1320, the first terminal deletes the first profile and displays Activation Code (or pass code) capable of enabling a second profile (Profile2) that is installed on the second terminal and that corresponds to the first profile (Profile1) in a UI. At operation 1330, when an event to enable the second profile (Profile2) is received through the UI of the LPA, the second terminal displays an event to request the input of Activation Code in a UI at operation 1340. Furthermore, when the input event of Activation Code is received at operation 1340, the second terminal enables the second profile at operation 1350. The second terminal may manually receive the Activation Code from a user or the Activation Code may be delivered through Bluetooth® or NFC.

Figure 14:
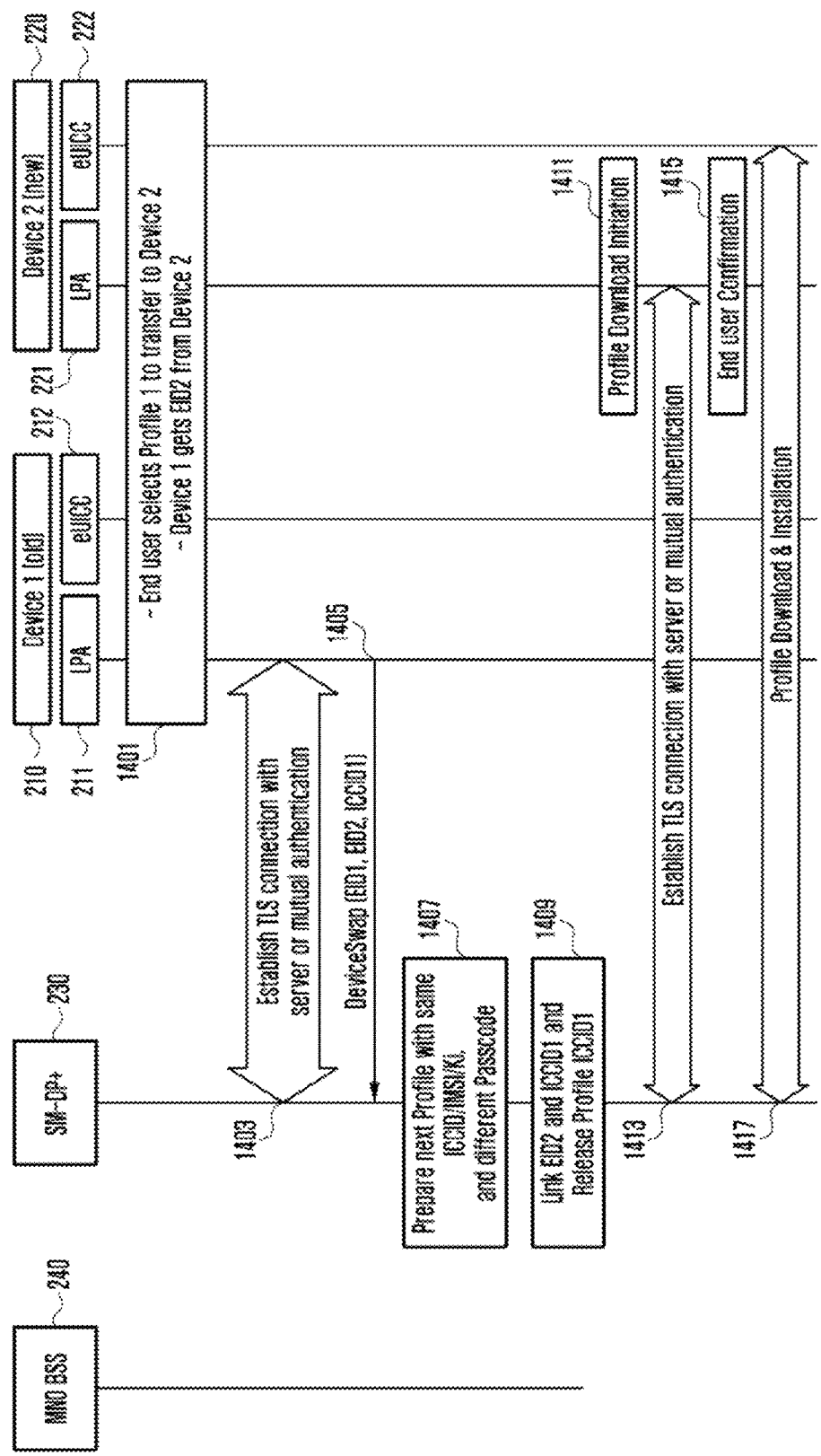
FIG. 14 is a diagram showing a message exchange procedure between terminals, the profile server and the service provider server when a first terminal downloads the same profile as one or more selected profiles from the profile server to a second terminal.

FIG. 14 is a diagram showing a message exchange procedure between terminals, the profile server and the service provider server when a first terminal downloads the same profile as one or more selected profiles from the profile server to a second terminal.

Referring to FIG. 14, at operation 1401, a profile to be transferred from the first terminal 210 is identified between the first terminal 210 and the second terminal 220. The eUICC identifier (EID2) of the second terminal 220 is delivered to the first terminal 210. A detailed description of such a process is omitted because the contents described at operations 500, 501 and 503 of FIG. 5 may be identically applied to the process. At operation 1403, the first terminal 210 or the LPA 211 of the first terminal may establish a TLS connection with the profile server 230 and perform server authentication or mutual authentication. At operation 1405, the LPA 211 of the first terminal may transmit a message (e.g., DeviceSwap message) that requests the download of a profile corresponding to Profile1 onto the second terminal to the profile server 230 (this message may also be delivered to the service provider server 240).

At operation 1407, the profile server 230 may prepare a profile (Profile2_4) having the same ICCID, IMSI and K values as an old profile (Profile1) to be transferred from the first terminal. In this case, when Profile1 is deleted or disabled, Profile2_4 may be enabled only when the Activation Code of Profile2_4 displayed in a UI of the LPA of the first terminal is entered. In other words, Profile2_4 is a profile prepared using the same values as Profile1, but may be enabled only when different Activation Code (or pass code) is entered. At operation 1490, the profile server 230 may connect Profile2_4 with EID2 and perform a configuration so that Profile2_4 is downloaded onto the second terminal (e.g., through backend provisioning).

At operation 1411, the profile download of the LPA 221 of the second terminal may be started when the SM-DS or SM-DP+ notifies the second terminal 221 of the download or may be selected when a user manipulates the terminal or may be initiated based on information received by the terminal by first requesting the information from the SM-DS or SM-DP+. In this case, the information received by the terminal by first requesting the information from the SM-DS may include an SM-DP+ address and a delimiter capable of identifying the start of the profile download. Furthermore, the download may be initiated through RPM received from the SM-DP+.

At operation 1413, the second terminal 220 or the LPA 221 of the second terminal may establish a TLS connection with the profile server 230 and perform server authentication or mutual authentication. At operation 1415, the LPA 221 of the second terminal may display an initialization event for the download of the profile in a UI and receive a confirmation event from a user. At operation 1417, the second terminal may perform the download of the second profile (Profile2) from the profile server 230.

Figure 15:
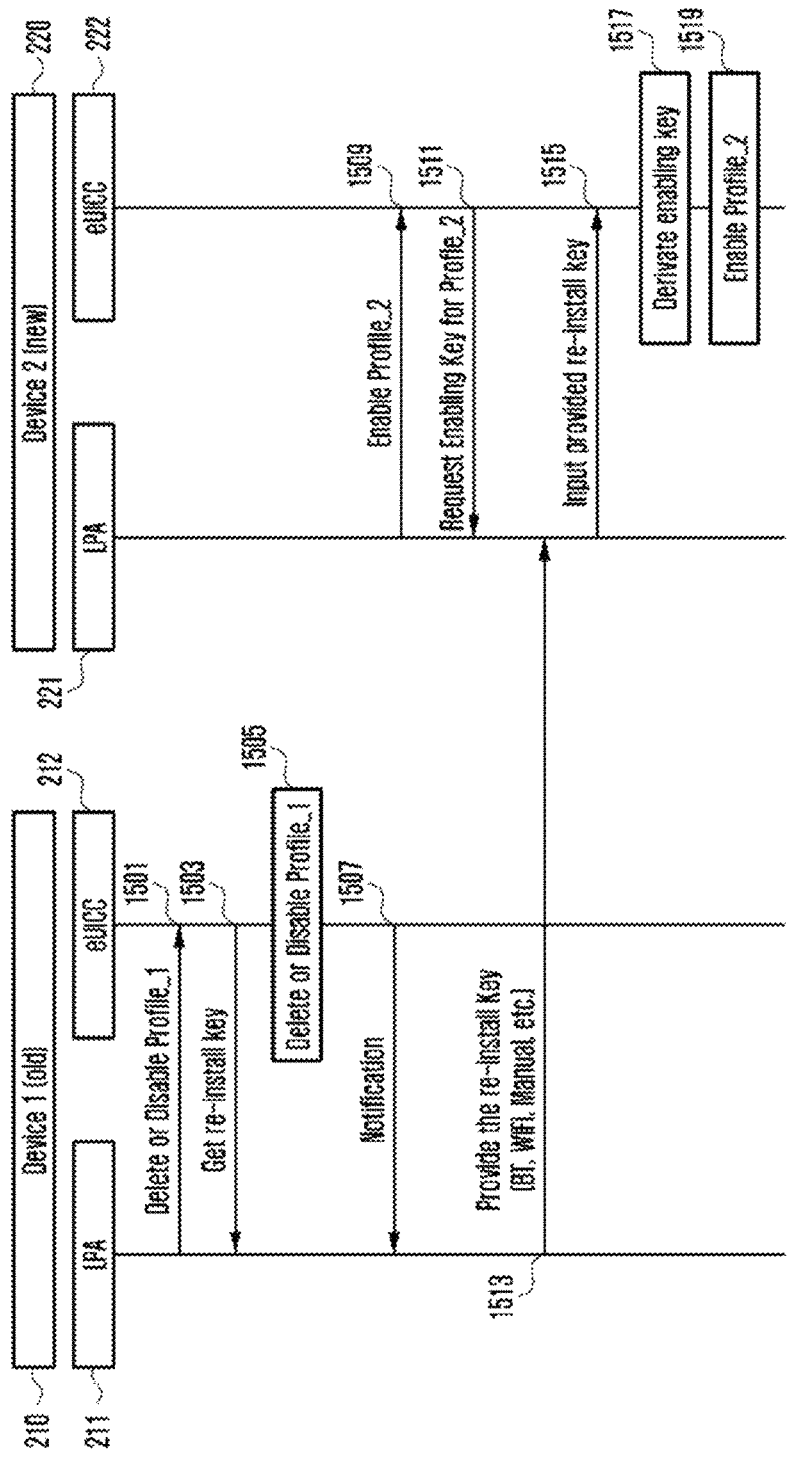
FIG. 15 is a diagram showing an operational procedure between a first terminal and a second terminal when a profile of the second terminal is enabled using activation code displayed when a profile installed on the first terminal is disabled or deleted if profiles having the same IMSI and K values are installed on the first terminal and the second terminal.

FIG. 15 is a diagram showing an operational procedure between a first terminal and a second terminal when a profile of the second terminal is enabled using Activation Code displayed when a profile installed on the first terminal is disabled or deleted if profiles having the same IMSI and K values are installed on the first terminal and the second terminal.

Referring to FIG. 15, at operation 1501, the LPA 211 of the first terminal may deliver a message to delete or disable Profile1 to the eUICC 212 of the first terminal. At operation 1503, the eUICC delivers a re-install key capable of enabling Profile2 that is installed on the second terminal and that has the same ICCID, IMSI and K values to the LPA of the first terminal. A signature may be added to the re-install key at operation 1503 using the certificate of the eUICC 212, and the re-install key may be delivered. At operation 1505, the eUICC 212 deletes or disable Profile1. At operation 1507, the eUICC 212 transmits the deleted or disabled results to the LPA 211. In this case, at operation 1507, the LPA 211 of the first terminal may display the re-install key in a UI in the form of text or QR code.

At operation 1509, the LPA 221 of the second terminal may deliver a message to enable Profile2 to the eUICC 222 of the second terminal. At operation 1511, the eUICC recognizes that an enabling key for enabling is present in the corresponding profile and requests the entry of the enabling key from the LPA 221. At operation 1513, the LPA 221 of the second terminal receives the re-install key, delivered from the LPA 211 of the first terminal at operation 1503, using at least one means of a user input, QR code scanning, a Bluetooth®/WLAN connection, and an Internet connection through a security connection. At operation 1515, the LPA 221 of the second terminal may deliver the entered re-install key to the eUICC 222. At operation 1517, the eUICC may generate an enabling key using the entered re-install key. Furthermore, at operation 1517, if the re-install key and the enabling key are the same, the enabling key is not derived, and the entered re-install key may be used as the enabling key without any change. At operation 1519, Profile 2 may be enabled in the second terminal 220 based on the entered enabling key, and the second terminal 220 may connect to communication service.

FIG. 16 is a diagram showing profiles having the same ICCID, IMSI and K values prepared in the profile server 230. Each profile has enabling code (or enabling key) and re-install code (or re-install key) values. The enabling code (or enabling key) is a code (or key) used when it is enabled after a corresponding profile is installed on an eUICC. The re-install code (or re-install key) is a code (or key) generated when a corresponding profile is deleted and is a code (or key) used to enable a next profile having the same ICCID, IMSI and K values.

For example, in order to enable a profile 1603, re-install code (or re-install key) displayed in a UI of the LPA of a corresponding terminal when a profile 1601 is disabled or deleted needs to be input to a UI of the LPA of a terminal whose profile 1603 is to be enabled. Such a corresponding relation or mapping relation is indicated by arrows in FIG. 16. That is, code (or key) for the enabling of any one profile may become the re-install code (or key) of the other profile. The enabling code of Profile2_4 and re-install code (or key) displayed when Profile1 is deleted or disabled may have the same value of a symmetry key format (in the case of profiles 1601, 1603, 1605 and 1607), and may have different values if an asymmetry key method is used (in the case of profiles 1611, 1613, 1615 and 1617). In this case, if the enabling code (or key) of the profile 1601 is indicated by NONE, this may mean that separate enabling code (or key) is not necessary in the case of the first installed profile. If the re-install code (or key) of the profile 1607 is indicated by NONE, this may mean that the profile 1607 cannot be transferred to another terminal or cannot be reinstalled. The aforementioned enabling/re-install code or key may be called information for enabling/re-install because it can be expressed by one or more bits.

Figure 17A:
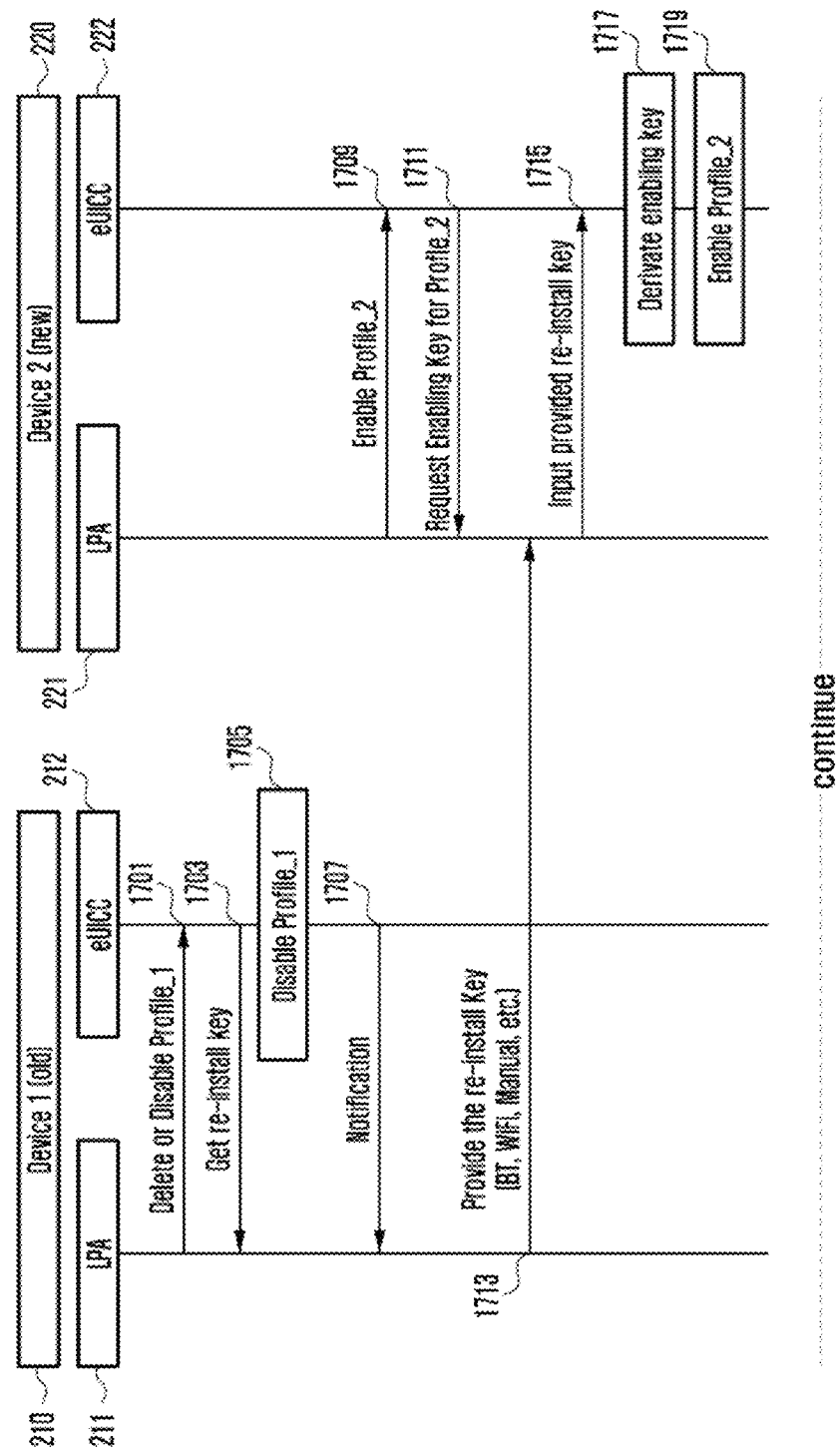
FIGS. 17A and 17B are diagrams showing an operational procedure of a first terminal and a second terminal when the profile of only one of the first terminal and second terminal is alternately enabled using an enabling/re-install key if profiles having the same IMSI and K values are installed on the first terminal and the second terminal.
Figure 17B:
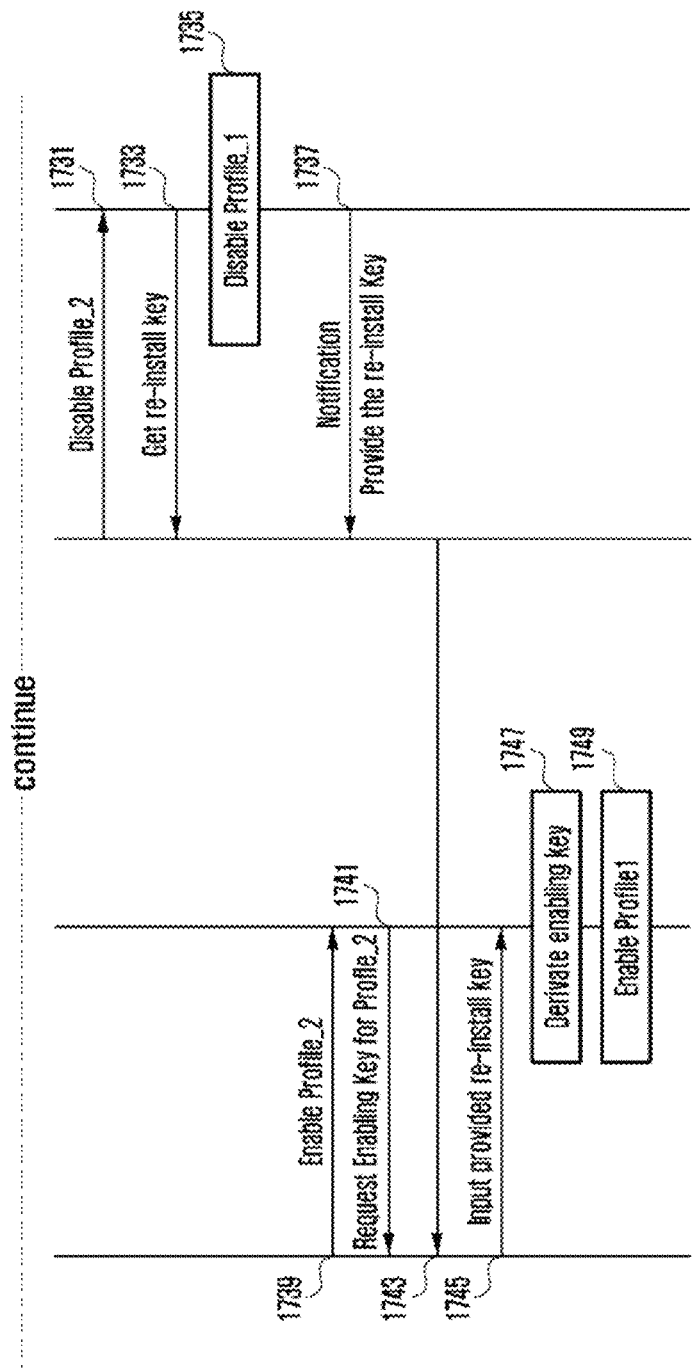

FIGS. 17A and 17B are diagrams showing an operational procedure of a first terminal and a second terminal when the profile of only one of the first terminal and second terminal is alternately enabled using an enabling/re-install key if profiles having the same IMSI and K values are installed on the first terminal and the second terminal.

First, referring to FIG. 17A, at operation 1701, the LPA 211 of the first terminal may deliver a message to disable Profile1 to the eUICC 212 of the first terminal. At operation 1703, the eUICC delivers a re-install key capable of enabling Profile2 that is installed on the second terminal and that has the same ICCID, IMSI and K values to the LPA 211 of the first terminal. A signature may be added to the re-install key at operation 1703 using the certificate of the eUICC 212, and the re-install key may be delivered.

The eUICC 212 disables Profile1 at operation 1705, and delivers the results of the disabling to the LPA 211 at operation 1707. At operation 1707, the LPA 211 may display the re-install key for Profile1 in a UI in the form of text or QR code.

At operation 1709, the LPA 221 of the second terminal may deliver a message to enable Profile2 to the eUICC 222 of the second terminal. At operation 1711, the eUICC recognizes that an enabling key for enabling is present in the corresponding profile and requests the LPA 221 to enter the enabling key. At operation 1713, the LPA 221 of the second terminal may receive the re-install key, transferred from the LPA 211 of the first terminal at operation 1703, using at least one method of a user input, QR code scanning, Bluetooth®/WLAN connection, and an Internet connection through a security connection. At operation 1715, the LPA 221 may deliver the entered re-install key to the eUICC 222.

At operation 1717, the eUICC 222 may generate an enabling key using the entered re-install key. Furthermore, at operation 1717, if the re-install key and the enabling key are the same, the enabling key may not be derived, and the entered re-install key may be used as the enabling key without any change. At operation 1719, Profile 2 may be enabled based on the entered enabling key, and the second terminal 220 may connect to communication service.

Furthermore, FIG. 17B shows a process of enabling Profile1 of the first terminal disabled at operations 1701 to 1709 and disabling Profile2 of the second terminal. To this end, at operation 1731, the LPA 221 of the second terminal may deliver a message to disable Profile2 to the eUICC 222. At operation 1733, the eUICC 222 delivers a re-install key capable of enabling Profile1 that is installed on the first terminal and that has the same ICCID, IMSI and K values to the LPA 221 of the second terminal. A signature may be added to the re-install key at operation 1733 using the certificate of the eUICC 222, and the re-install key may be delivered.

The eUICC 222 disables Profile2 at operation 1735, and delivers the results of the disabling to the LPA 221 at operation 1737. At operation 1737, the LPA 221 may display a re-install key in a UI in the form of text or QR code.

At operation 1739, the LPA 211 of the first terminal may deliver a message to enable Profile1 to the eUICC 212. At operation 1741, the eUICC 212 of the first terminal recognizes that an enabling key for enabling is present in the corresponding profile and requests the LPA 211 to enter the enabling key. At operation 1743, the LPA 211 of the first terminal may receive the re-install key, transferred from the LPA 221 of the second terminal at operation 1733, using at least one method of a user input, QR code scanning, Bluetooth®/WLAN connection, and an Internet connection through a security connection. At operation 1745, the LPA 211 of the first terminal may deliver the entered re-install key to the eUICC 212. At operation 1747, the eUICC 212 may generate an enabling key using the entered re-install key. Furthermore, at operation 1747, if the re-install key and the enabling key are the same, the enabling key may not be derived, and the entered re-install key may be used as the enabling key without any change. At operation 1749, Profile 1 is enabled based on the entered enabling key, and the first terminal 210 may connect to communication service.

The first embodiment of the present disclosure has been described above with reference to FIGS. 1 to 17.

Hereinafter, the second embodiment of the present disclosure is described with reference to FIGS. 18 to 22. FIGS. 18 to 22 show embodiments of operations using communication service by only a simple manipulation even without mounting a separate SIM card after the communication service is conveniently purchased in a terminal in a wireless communication system according to another embodiment of the present disclosure.

Specifically, a series of processes for software (S/W) (e.g., LPA) installed on a terminal to receive a given profile from a profile server based on information received from an external subscription processing server are described with reference to FIGS. 18 to 22. That is, embodiments in which communication service (or communication product) can be used simply through a terminal although a separate SIM card is not mounted by configuring a connection relation between subscription to the communication service and the download of a given profile are described below.

Embodiments in which the aforementioned processes have been implemented in several different sequences and forms are described with reference to FIGS. 18 to 22.

The first detailed embodiment of the proposed second embodiment is described with reference to FIGS. 18A and 18B.

Figure 18A:
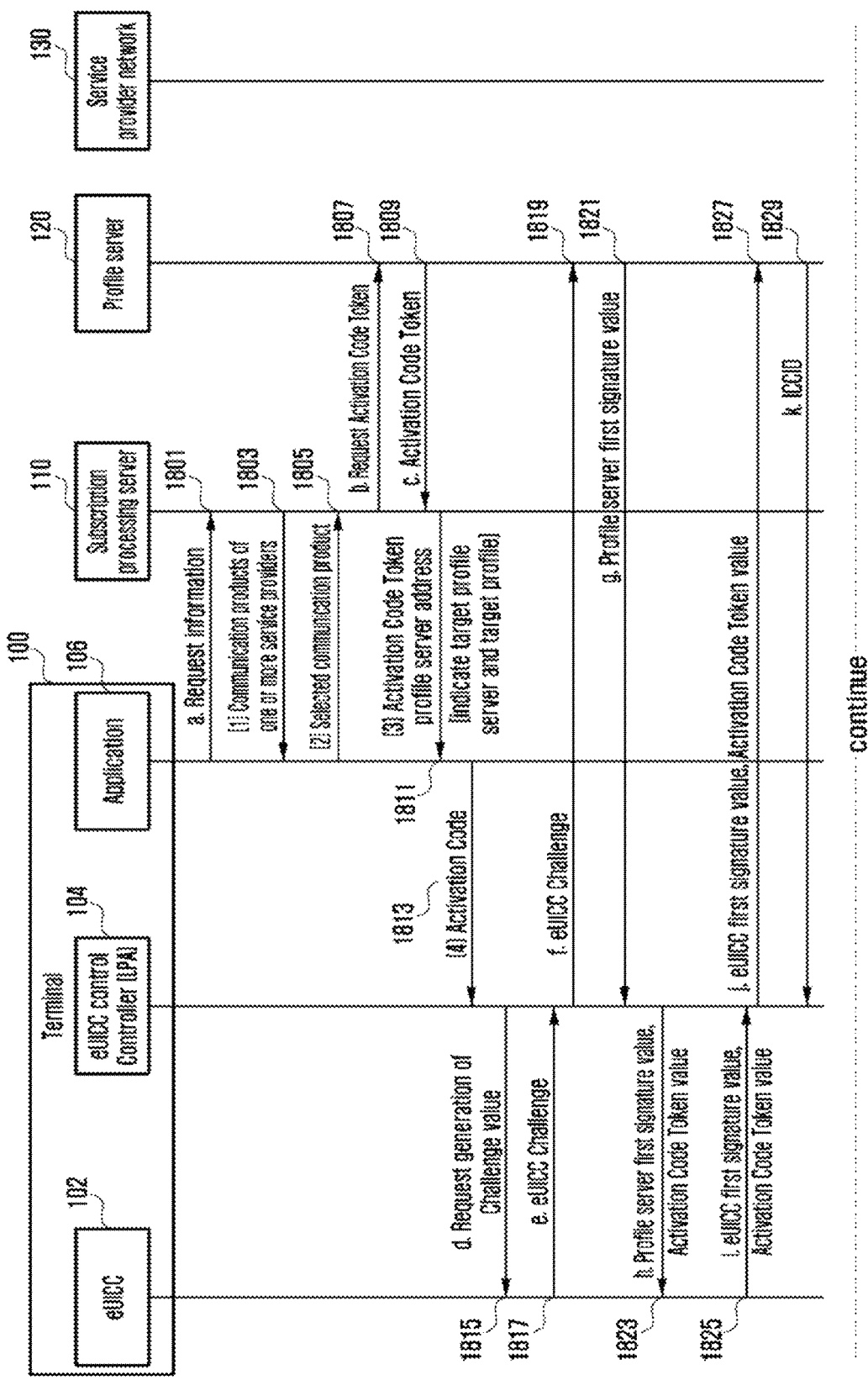
FIGS. 18A and 18B are diagrams showing an embodiment of a method using communication service by only a simple manipulation even without mounting a separate SIM card after the communication service is conveniently purchased through a terminal in a wireless communication system.

First, in FIG. 18A, a terminal 100 may request information from a subscription processing server 110 at operation 1801. The information request may be an information request for a communication product and may be performed through an application (app) 106 installed on the terminal.

In this case, the address of the subscription processing server on which the terminal 100 performs the information request may be known to the terminal 100 by a configuration server (not shown). When the terminal (or the user of the terminal) visits the configuration server and selects a given service provider of a service provider list shown by the configuration server, the configuration server may notify the terminal 100 of the address of the subscription processing server of the given service provider. The terminal 100 may transmit the information request to the subscription processing server based on the address known by the configuration server as described above, so the following procedure may be performed.

Alternatively, the address of the subscription processing server on which the terminal 100 performs the information request may have been previously stored in the terminal. That is, the service provider list may be output (or displayed) to the user of the terminal before the terminal makes the information request. When the user selects a given service provider, the information request may be transmitted to the address of the subscription processing server of the given service provider previously stored in the terminal, so the following procedure may be performed.

The subscription processing server 110 may deliver one or more communication product lists of one or more service providers to the application 106 of the terminal at operation 1803.

When the user selects one of the received communication product lists, the terminal may deliver information about a selected communication product to the subscription processing server at operation 1805.

After or separately from the following procedure, the subscription processing server 110 may receive an Activation Code Token from a profile server 120. At this time, the address of the profile server may be received along with the Activation Code Token. The Activation Code Token may be used to select a target profile that may correspond to the selected communication product. The address of the profile server is a server address that is used for the terminal to access the profile server at operations 1807 and 1809. The token may mean an assembly of information.

The subscription processing server 110 may deliver the Activation Code Token and the profile server address to the application 106 of the terminal at operation 1811. In this case, the Activation Code Token and the profile server address may be delivered in the form of Activation Code. The Activation Code essentially includes the Activation Code Token and the profile server address, and may include other information.

Furthermore, if the profile server address is not delivered from the profile server to the subscription processing server, the subscription processing server 110 may deliver the profile server address to the application 106 using the profile server address configured in the subscription processing server.

Furthermore, in the above operation, the subscription processing server 110 may directly receive the Activation Code Token from the profile server 120 as shown, or may receive the Activation Code Token through a communication company server.

Thereafter, the application 106 operating in conjunction with the subscription processing server 110 may request the initiation of profile download by delivering the Activation Code Token and the profile server address to eUICC control S/W 104 (e.g., LPA) at operation 1813.

The eUICC control S/W 104 may store the Activation Code Token and profile server address received from the application 106. When a profile download initialization request is received, the eUICC control S/W 104 may request the eUICC 102 of the terminal to generate a Challenge value at operation 1815.

The eUICC 102 may generate a Challenge value in response to the request from the eUICC control S/W 104 and deliver the Challenge value to the eUICC control S/W 104 at operation 1817.

The eUICC control S/W 104 accesses the profile server 120 using the stored profile server address information and delivers an eUICC Challenge to the profile server at operation 1819.

The profile server 120 calculates a profile server first signature value with respect to data including the received eUICC Challenge, and may deliver the first signature value to the eUICC control S/W 104 at operation 1821.

When the eUICC control S/W 104 receives the profile server first signature value, it delivers the Activation Code Token, received from the application 106 and stored, and the profile server first signature value to the eUICC at operation 1823.

The eUICC 102 may verify the profile server first signature value using the information including the eUICC Challenge, may generate an eUICC first signature value with respect to data including the Activation Code Token value, and may deliver the Activation Code Token value and the eUICC first signature value to the eUICC control S/W 104 at operation 1825.

The eUICC control S/W 104 may deliver information, including the Activation Code Token and eUICC first signature values received from the eUICC 102, to the same profile server 120 at operation 1827.

The profile server 120 verifies the eUICC first signature value using the information including the Activation Code Token, and identifies whether there is a profile corresponding to the Activation Code Token. Next, the profile server 120 delivers information, including an ICCID corresponding to the profile, to the eUICC control S/W 104 at operation 1829.

Figure 18B:
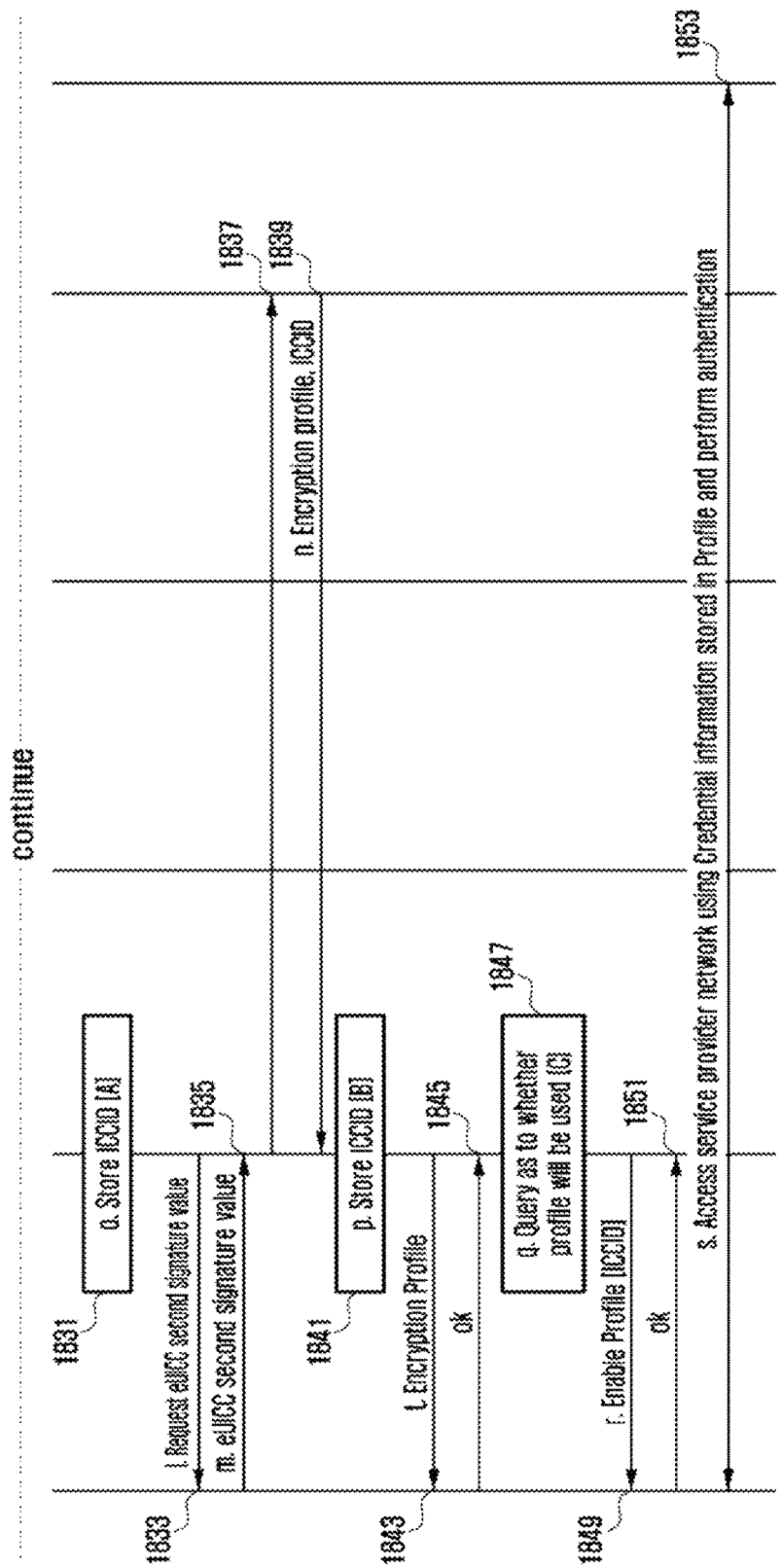

Next, in FIG. 18B, the eUICC control S/W 104 stores the ICCID received from the profile server 120 at operation 1831 at operation 1831. Accordingly, the eUICC control S/W 104 may use the ICCID subsequently stored in operation 1841 and 1847.

The eUICC control S/W 104 requests the eUICC to generate a second signature value at operation 1833. The eUICC 102 returns the second signature value to the eUICC control S/W 104 at operation 1835. The eUICC control S/W 104 requests the profile by providing information, including the eUICC second signature value, to the profile server 120 at operation 1837.

The profile server 120 delivers information, including encrypted profile information and the ICCID, to the eUICC control S/W 104 at operation 1839.

The eUICC control S/W 104 stores the received ICCID at operation 1841, and may identify whether the received ICCID is identical with the ICCID stored at operation 1831 at operation 1841. The operation for the eUICC control S/W 104 to store the ICCID received at operation 1831 and to store the ICCID received at operation 1841 are not essential operations. Operations 1831 and 1841 may be omitted depending on an implementation example.

The eUICC control S/W 104 may deliver the received encrypted profile to the eUICC 102 and install the profile at operation 1843. The eUICC control S/W 104 may divide the encrypted profile into one or a plurality of APDU commands and deliver them. Furthermore, the eUICC 102 may decrypt the encrypted profile and install it. Next, the eUICC 102 installs the encrypted profile normally, and may notify the eUICC control S/W 104 that the encrypted profile has been installed at operation 1845.

The eUICC control S/W 104 may display a query as to whether the profile will be immediately enabled. The query may be performed anterior or posterior to the profile installation at operation 1847.

If the eUICC control S/W 104 has selected to immediately enable the profile with respect to the query, it may deliver a command to enable the profile corresponding to the ICCID using the ICCID stored at operation 1831 or 1841 to the eUICC 102 at operation 1849.

The eUICC 102 enables the profile corresponding to the ICCID and may notify the eUICC control S/W 104 that the enabling of the profile has been performed normally at operation 1851.

Thereafter, the terminal may perform mutual authentication for network access along with the service provider network 130 using Credential information (e.g., IMSI and Ki information) stored in the corresponding profile at operation 1853.

The embodiment is for helping understanding of the disclosure and is not intended to limit the range of the disclosure to a corresponding scenario. For example, when the terminal 100 delivers criteria for selecting a communication product to the subscription processing server 110 instead of the process for the terminal 100 to select one of communication product lists received from the subscription processing server 110 and to deliver the selected communication product list to the server at operation 1803 or 1805, the subscription processing server 100 may select a given communication product. The criteria applied in such embodiments may include one or more of the range of the price, the range of data usage, the range of communication time, the range of data communication speed, and a use country.

Figure 19B:
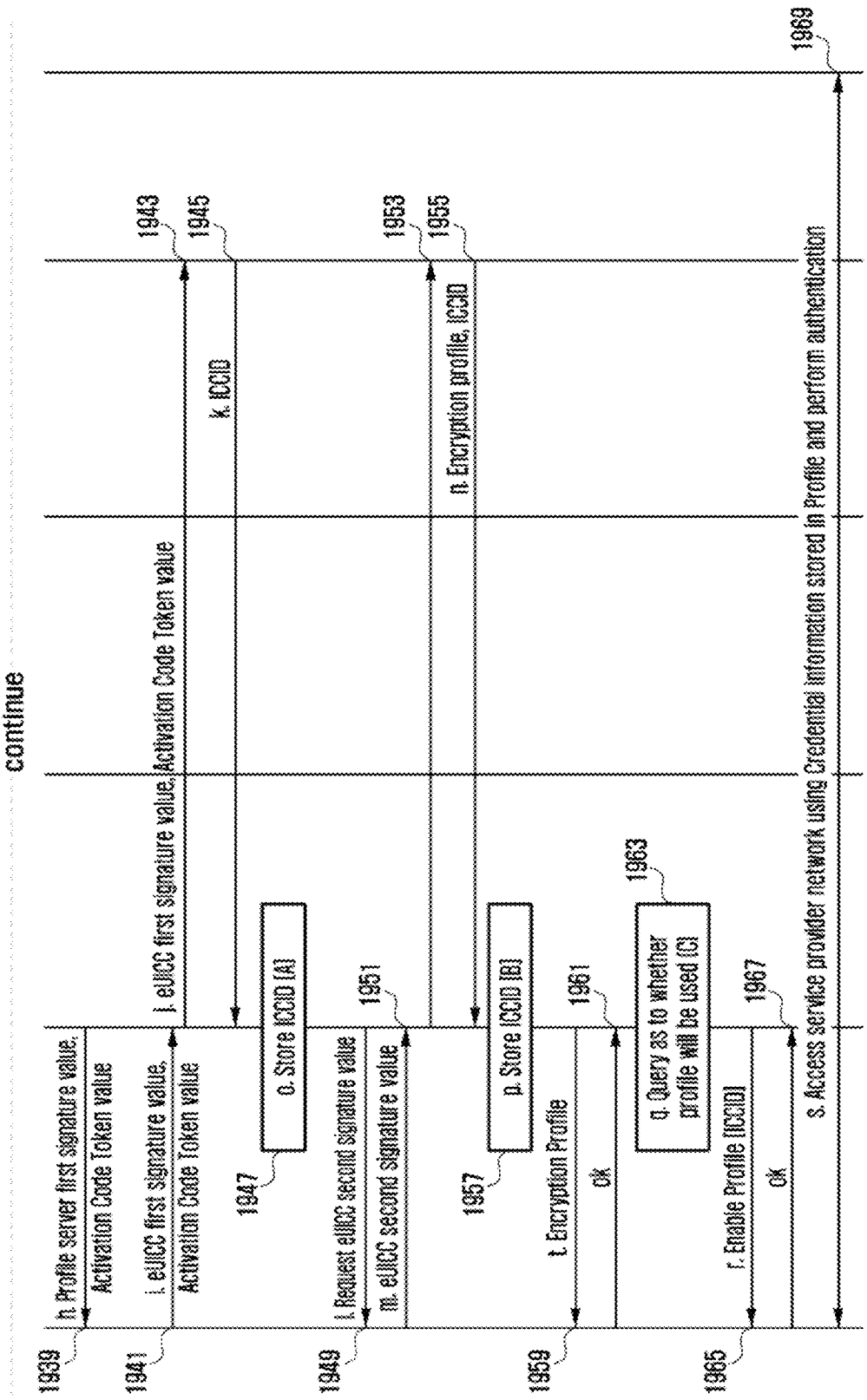

FIGS. 19A and 19B show the second detailed embodiment of the second embodiment of the present disclosure.

First, in FIG. 19A, the terminal 100 may transmit an information request to the subscription processing server 110 at operation 1901. The information request may be an information request about a communication product as described in FIG. 18A, and may be made through the application 106 installed on the terminal 100.

As in the description of FIG. 18, the address of the subscription processing server on which the terminal 100 performs the information request may be known to the terminal 100 by a configuration server (not shown). When the terminal (or the user of the terminal) visits the configuration server and selects a given service provider of a service provider list shown by the configuration server, the configuration server may notify the terminal 100 of the address of the subscription processing server of the given service provider. The terminal 100 may transmit the information request to the subscription processing server based on the address known by the configuration server as described above, so the following procedure may be performed.

Alternatively, the address of the subscription processing server on which the terminal 100 performs the information request may have been previously stored in the terminal. That is, a service provider list may be output (or displayed) to the user of the terminal before the terminal performs the information request. When the user selects a given service provider, the information request is transmitted to the address of the subscription processing server of the given service provider previously stored in the terminal, so the following procedure may be performed.

The subscription processing server 110 may deliver one or more communication product lists of one or more service providers to the application 106 of the terminal at operation 1903.

The terminal 100 may select one of the received communication product lists and deliver the selected communication product list to the subscription processing server 110 at operation 1905. In this case, the subscription processing server 110 may transmit a response to the application 106 of the terminal at operation 1907.

The application 106 of the terminal may request the eUICC control S/W 104 to prepare the delivery of Activation Code at operation 1909.

The eUICC control S/W 104 may request the eUICC 102 to generate a Challenge value at operation 1911.

The eUICC 102 may generate a Challenge value and return it to the eUICC control S/W 104 at operation 1913.

Thereafter, the eUICC control S/W 104 may deliver the received eUICC Challenge to the application 106 at operation 1915. The application 106 may deliver the received eUICC Challenge to the subscription processing server 110 at operation 1917. The subscription processing server 110 may request the profile server 120 to generate a signature value for information including the received eUICC Challenge and an Activation Code Token at operation 1919.

The profile server 120 may deliver a profile server 0-th signature value, calculated from the signature value, to the subscription processing server 110 at operation 1921. In this case, the Activation Code Token may be delivered from the profile server 120 to the terminal 100 through operation 1921 or may be delivered through a separate process.

The subscription processing server 110 may deliver at least one of the Activation Code Token, the profile server address, and the profile server 0-th signature value to the application 106 of the terminal at operation 1923. In this case, the Activation Code Token and the profile server address may be delivered in the form of Activation Code. The Activation Code essentially includes the Activation Code Token and the profile server address, and may include other information.

Furthermore, although the profile server address has not been delivered from the profile server 120 to the subscription processing server 110, the subscription processing server 110 may perform the operation of transmitting the Activation Code Token and the profile server address using a profile server address configured in the subscription processing server 110.

Furthermore, in the above operation, the subscription processing server 110 may directly receive the Activation Code Token from the profile server 120 or may receive the Activation Code Token through a communication company server unlike in the illustrated embodiment at operation 1923.

Thereafter, the application 106 operating in conjunction with the subscription processing server 110 may request the initialization of profile download by delivering the Activation Code Token, the profile server address and the profile server 0-th signature value to the eUICC control S/W 104 at operation 1925.

The eUICC control S/W 104 stores the Activation Code Token and profile server address received from the application 106. Next, the eUICC control S/W 104 may request signature verification by delivering the Activation Code Token, the profile server address and the profile server 0-th signature value to the eUICC 102 at operation 1927, may receive a result of the verification at operation 1929, and may perform a profile download process based on a result of the verification.

The eUICC control S/W 104 stores the Activation Code Token and profile server address received from the application 106. When a profile download initialization request is received, the eUICC control S/W 104 may request the eUICC 102 to generate a Challenge value at operation 1931.

The eUICC 102 may generate a Challenge value and deliver the Challenge value to the eUICC control S/W 104 at operation 1933.

The eUICC control S/W 104 accesses the profile server 120 using the stored profile server address information and delivers the Challenge to the profile server 120 at operation 1935.

The profile server 120 calculates a profile server first signature value with respect to data including the received eUICC Challenge, and may deliver the first signature value to the eUICC control S/W 104 at operation 1937.

Next, in FIG. 19B, when the eUICC control S/W 104 receives the profile server first signature value, it delivers the Activation Code Token, received from the application 108 and stored, and the profile server first signature value to the eUICC 102 at operation 1939.

The eUICC 102 verifies the profile server first signature value using information including the eUICC Challenge and generates an eUICC first signature value with respect to data including the Activation Code Token value. The eUICC 102 may deliver the Activation Code Token value and the eUICC first signature value to the eUICC control S/W 104 at operation 1941.

The eUICC control S/W 104 may deliver information, including the Activation Code Token and the eUICC first signature value, to the same profile server 120 at operation 1943.

The profile server 120 verifies the eUICC first signature value using the information including the Activation Code Token, performs a process of identifying whether there is a profile corresponding to the Activation Code Token, and delivers information including an ICCID corresponding to the profile to the eUICC control S/W 104 at operation 1945.

The eUICC control S/W 104 stores the ICCID received at operation 1947 and may use it for operations 1957 and 1963.

The eUICC control S/W 104 requests the eUICC 102 to generate a second signature value at operation 1949. The eUICC 102 returns the second signature value to the eUICC control S/W 104 at operation 1951. The eUICC control S/W 104 requests the profile by providing information including the eUICC second signature value to the profile server 120 at operation 1953.

The profile server 120 delivers encrypted profile information and information, including the ICCID, to the eUICC control S/W 104 at operation 1955.

The eUICC control S/W 104 may identify whether the ICCID received at operation 1955 is identical with the ICCID stored at operation 1947 at operation 1957. The operation for the eUICC control S/W 104 to store the ICCID received at operation 1947 and to store the ICCID received at operation 1957 is not an essential operation. Operations 1947 and 1957 may be omitted depending on an implementation example.

The eUICC control S/W 104 may deliver the received encrypted profile to the eUICC 102 so that the profile is installed at operation 1959. The encrypted profile may be divided into one or a plurality of APDU commands and delivered. Furthermore, the eUICC 102 may decrypt the encrypted profile, may install the decrypted profile, and may notify the eUICC control S/W 104 that the installation of the encrypted profile has been performed normally at operation 1961.

The eUICC control S/W 104 may display a query as to whether the profile will be immediately enabled. The query may be performed anterior or posterior to the profile installation at operation 1963.

If the eUICC control S/W 104 has selected to immediately enable the profile with respect to the query, it may deliver a command to enable the profile corresponding to the ICCID to the eUICC 102 using the ICCID stored at operation 1947 or 1957 at operation 1965.

The eUICC 102 may enable the profile corresponding to the ICCID and notify the eUICC control S/W 104 of the enabling of a next profile at operation 1967.

Thereafter, the eUICC control S/W 104 may perform mutual authentication for network access along with the service provider network 130 using Credential information (e.g., IMSI and Ki information) stored in the corresponding profile at operation 1969.

The embodiment is for helping understanding of the disclosure and is not intended to limit the range of the disclosure to a corresponding scenario. For example, when the terminal 100 delivers criteria for selecting a communication product and delivers them to the subscription processing server 110 instead of the process for the terminal 100 to select one of the communication product lists received from the subscription processing server 110 and to deliver the selected communication product list to the server at operation 1903 and 1905, the subscription processing server 110 may select a communication product. The criteria may include one or more of the range of the price, the range of data usage, the range of communication time, the range of data communication speed, and a use country.

Figure 20A:
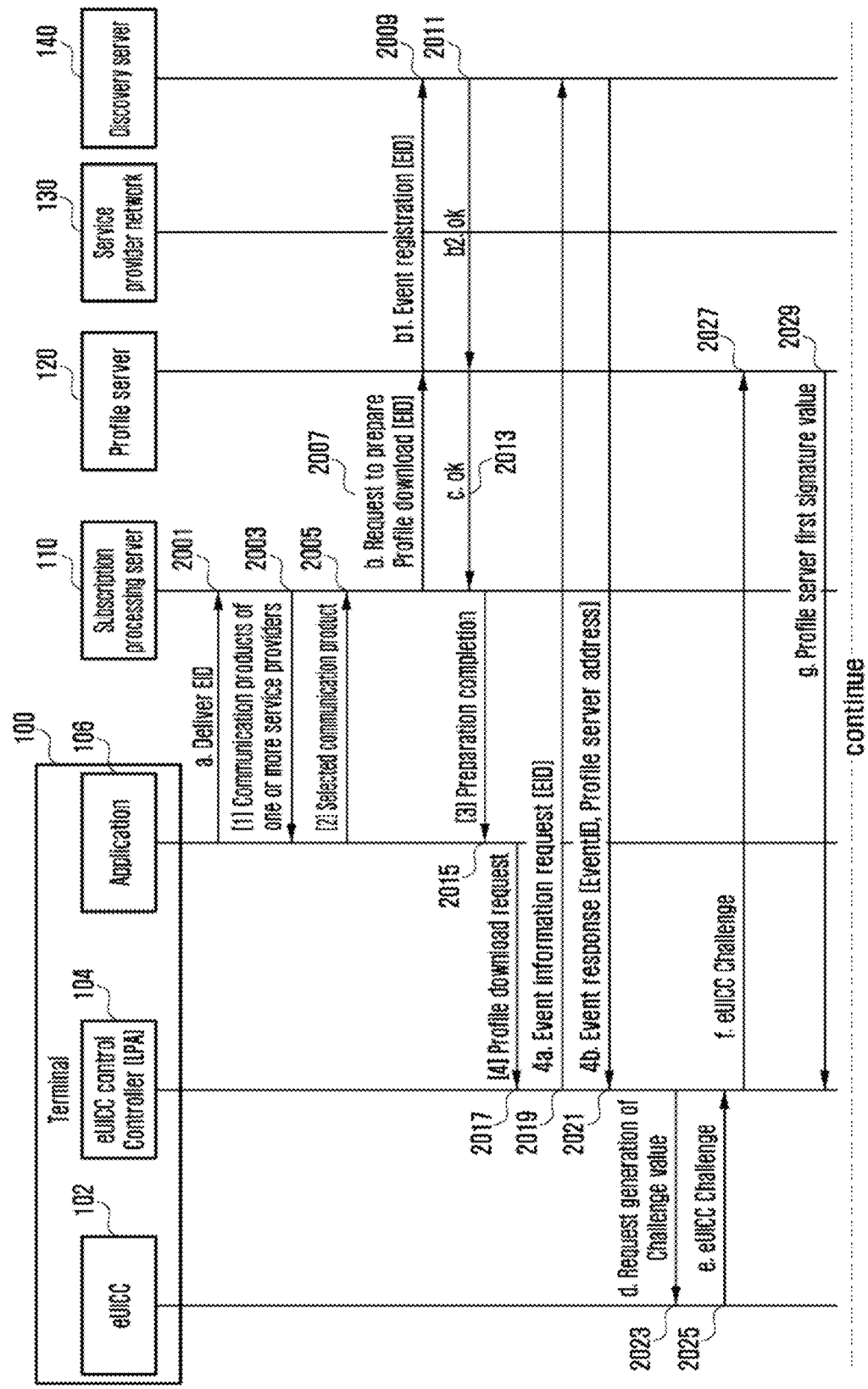
FIGS. 20A and 20B are diagrams showing an embodiment of a method using communication service by only a simple manipulation even without mounting a separate SIM card after the communication service is conveniently purchased through a terminal in a wireless communication system.
Figure 20B:
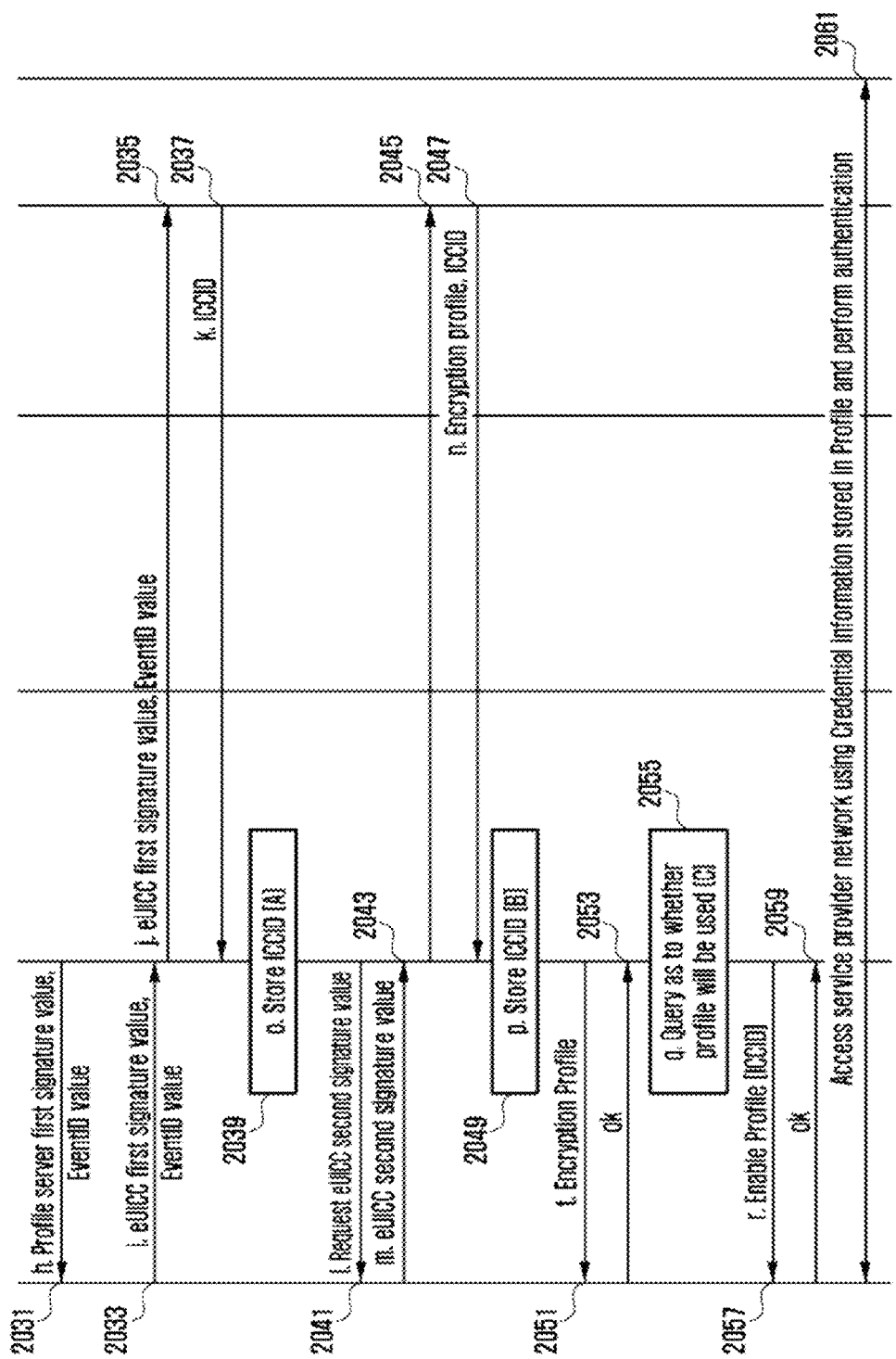

FIGS. 20A and 20B show the third detailed embodiment of the second embodiment of the present disclosure. In FIG. 20A, the terminal 100 may deliver EID to the subscription processing server 110 at 2001. Unlike in the illustrated embodiment, the EID may be delivered in subsequent operation other than operation 2001.

The subscription processing server 110 may deliver one or more communication product lists of one or more service providers to the application 106 of the terminal 100 at operation 2003.

As in the description of FIGS. 18 and 19, the address of the subscription processing server on which the terminal 100 performs an information request may be known to the terminal 100 by a configuration server (not shown). When the terminal (or the user of the terminal) visits the configuration server and selects a given service provider of a service provider list shown by the configuration server, the configuration server may notify the terminal 100 of the address of the subscription processing server of the given service provider. The terminal 100 may transmit the information request to the subscription processing server based on the address known by the configuration server as described above, so the following procedure may be performed.

Alternatively, the address of the subscription processing server on which the terminal 100 performs the information request may have been previously stored in the terminal. That is, a service provider list may be output (or displayed) to the user of the terminal before the terminal performs the information request. When the user selects a given service provider, the information request may be transmitted to the address of the subscription processing server of the given service provider previously stored in the terminal, so the following procedure may be performed.

The terminal 100 may select one of the received communication product lists and deliver the selected communication product list to the subscription processing server at operation 2005. The process of selecting and delivering one of the communication product lists may be performed through the application 106 installed on the terminal 100.

After or separately from the following procedure, the subscription processing server 110 may deliver an EID address to the profile server 120 and request the preparation of profile download at operation 2007.

The profile server 120 may request a discovery server 140 to register event information at operation 2009. In this case, the event information is information including an event ID and a profile server address.

The discovery server 140 returns a result of the registration of the event to the profile server 120 after registering the event at operation 2011.

After receiving a result of the event registration, the profile server 120 returns a result of the preparation of the profile download to the subscription processing server 110 at operation 2013.

Next, the subscription processing server 110 transmits a preparation complete message to the application 106 of the terminal at operation 2015.

Thereafter, the application 106 operating in conjunction with the subscription processing server 110 may request the initiation of the profile download from the eUICC control S/W 104 at operation 2017.

When the eUICC control S/W 104 receives a profile download initialization request, it may first visit the discovery server 140, may provide EID information to the discovery server 140, and may request event information at operation 2019.

If event information corresponding to EID received from the eUICC control S/W 104 is present, the discovery server 140 provides the event information to the terminal at operation 2021. In this case, the provided event information may include at least one of a profile server address and EventID.

If one or more pieces of received valid event information are present, the eUICC control S/W 104 stores corresponding EventID and profile server address information at operation 2021.

The eUICC control S/W 104 may request the eUICC 102 to generate a Challenge value at operation 2023.

The eUICC 102 may generate a Challenge value and deliver the Challenge value to the eUICC control S/W 104 at operation 2025.

The eUICC control S/W 104 accesses the profile server 120 using the stored profile server address information and delvers the Challenge to the profile server at operation 2027.

The profile server 120 calculates a profile server first signature value with respect to data including the received eUICC Challenge, and may deliver the first signature value to the eUICC control S/W 104 at operation 2029.

Next, in FIG. 20B, when the eUICC control S/W 104 receives the profile server first signature value, it delivers the stored EventID and the profile server first signature value to the eUICC 102 at operation 2031.

The eUICC 102 may verify the profile server first signature value using information including the eUICC Challenge, may generate an eUICC first signature value with respect to data including the EventID value, and may deliver the EventID and the eUICC first signature value to the eUICC control S/W 104 at operation 2033.

The eUICC control S/W 104 may deliver information, including the EventID and the eUICC first signature value, to the same profile server 120 at operation 2035.

The profile server 120 verifies the eUICC first signature value using the information including EventID, identifies whether there is a profile corresponding to EventID, and delivers information including an ICCID corresponding to the profile to the eUICC control S/W 104 at operation 2037.

The eUICC control S/W 104 may store the received ICCID at operation 2039, and may use the stored ICCID at operations 2049 and 2055 subsequently. The eUICC control S/W 104 requests an eUICC second signature value from the eUICC 102 at operation 2041. The eUICC 102 returns the second signature value to the eUICC control S/W 104 at operation 2043. The eUICC control S/W 104 requests a profile by providing the profile server 120 with information including the eUICC second signature value at operation 2045.

The profile server 120 delivers information including, encrypted profile information and the ICCID, to the eUICC control S/W 104 at operation 2047.

The eUICC control S/W 104 may store the ICCID, received along with the encrypted profile from the profile server 120, and may identify whether the stored ICCID is identical with the ICCID stored at operation 2039 at operation 2049. The operation for the eUICC control S/W 104 to store the ICCID received at operation 2039 and to store the ICCID received at operation 2049 is not an essential operation. Operations 2039 and 2049 may be omitted depending on an implementation example.

The eUICC control S/W 104 may deliver the received encrypted profile to the eUICC 102 so that the profile is installed on the eUICC 102 at operation 2051. The encrypted profile may be divided into one or a plurality of APDU commands and delivered. Furthermore, the eUICC 102 may decrypt the encrypted profile, may install the decrypted profile, and may transmit a result of the installation to the eUICC control S/W 104 as a response at operation 2053.

The eUICC control S/W 104 may display a query as to whether the installed profile will be immediately enabled. The query may be performed anterior or posterior to the profile installation at operation 2055.

If the eUICC control S/W 104 has selected to immediately enable the profile with respect to the query, it may deliver a command to enable the profile corresponding to the ICCID to the eUICC 102 using the ICCID stored at operation 2039 or 2055 at operation 2057.

The eUICC 102 may enable the profile corresponding to the ICCID, and may notify the eUICC control S/W 104 of the enabling of the profile as a response at operation 2059.

Thereafter, the terminal 100 may perform mutual authentication for network access along with the service provider network 130 using Credential information (e.g., IMSI and Ki information) stored in the corresponding profile at operation 2061.

The embodiment is for helping understanding of the disclosure and is not intended to limit the range of the disclosure to a corresponding scenario. For example, when the terminal 100 selects criteria for selecting a communication product and delivers the criteria to the subscription processing server 110 instead of the process for the terminal 100 to select one of communication product lists received from the subscription processing server 110 and to deliver the selected communication product list to the server at operations 2003 and 2005, the subscription processing server 110 may select a communication product. The criteria may include one or more of the range of the price, the range of data usage, the range of communication time, the range of data communication speed, and a use country.

Furthermore, in the embodiment, procedures related to the discovery server 140 may be omitted (e.g., operations 2009, 2011, 2019 and 2021). The terminal 100 may visit the profile server 120 using information about the profile server 120 stored in the terminal after operation 2017, and may download a profile.

FIGS. 21A and 21B show the fourth detailed embodiment of the second embodiment of the present disclosure. In FIG. 21A, the terminal 100 may make an information request to the subscription processing server 110 at operation 2101. The information request may be information about a communication product and may be made through the application 106 installed on the terminal 100.

The subscription processing server 110 may deliver one or more communication product lists of one or more service providers to the application 106 of the terminal at operation 2103.

The terminal 100 may select one of the received communication product lists and deliver the selected communication product list to the subscription processing server 110 at operation 2105.

The application 106 may request the eUICC control S/W 104 to prepare an interoperation start at operation 2109.

The eUICC control S/W 104 may request the eUICC 102 to generate a Challenge value at operation 2111.

The eUICC 102 may generate a Challenge value in response to the request and return the Challenge value to the eUICC control S/W 104 at operation 2113.

Thereafter, the eUICC control S/W 104 may deliver the received eUICC Challenge to the application 106 of the terminal at operation 2115. The application 106 may deliver the eUICC Challenge to the subscription processing server 110 at operation 2117. The subscription processing server 110 may deliver information, including the eUICC Challenge and SessionID, to the profile server 120, and may request the profile server 120 to generate a signature value at operation 2119.

The profile server 120 may deliver a profile server 0-th signature value, calculated from the signature value, to the subscription processing server 110 at operation 2121. In this case, the profile server 120 may store information including the SessionID information and deliver it together.

The subscription processing server 110 may deliver the SessionID, profile server address, and profile server 0-th signature value to the application 106 of the terminal at operation 2123. The SessionID and the profile server address may be delivered in the form of Activation Code. The Activation Code includes the SessionID and the profile server address, and may include other information.

Furthermore, although the profile server address has not been delivered from the profile server 120 to the subscription processing server 110, the subscription processing server 110 may perform the above operation using a profile server address previously configured in the subscription processing server 110 at operation 2123.

Thereafter, the application 106 operating in conjunction with the subscription processing server 110 may request the initiation of profile download by delivering the SessionID, profile server address and profile server 0-th signature value to the eUICC control S/W 104 at operation 2125.

The eUICC control S/W 104 stores the SessionID and profile server address received from the application 106, and requests signature verification by delivering the SessionID, profile server address and profile server 0-th signature value to the eUICC 102 at operation 2127. Next, the eUICC control S/W 104 may receive a result of the verification from the eUICC 102 at operation 2129, and may perform a subsequent profile download process based on a result of the verification.

The terminal control S/W 104 has stored the SessionID and profile server address received from the application 106. In this state, when a profile download initialization request is received, the terminal control S/W 104 may request the eUICC 102 to generate a Challenge value at operation 2131.

The eUICC 102 may generate a Challenge value and deliver it to the eUICC control S/W 104 at operation 2133.

The eUICC control S/W 104 accesses the profile server 120 using the stored profile server address information and delivers the Challenge to the profile server at operation 2135.

The profile server 120 calculates a profile server first signature value with respect to data including the received eUICC Challenge, and may deliver the first signature value to the eUICC control S/W 104 at operation 2137.

Next, in FIG. 21B, when the eUICC control S/W 104 receives the profile server first signature value, it delivers SessionID, received from the application 106 and stored, and the profile server first signature value to the eUICC 102 at operation 2139.

The eUICC 102 may verify the profile server first signature value using information including the eUICC Challenge, may generate an eUICC first signature value with respect to data including the SessionID value, and may deliver a SessionID value and the eUICC first signature value to the eUICC control S/W 104 at operation 2141.

The eUICC control S/W 104 may deliver information, including the SessionID and eUICC first signature value, to the same profile server 120 at operation 2143.

The profile server 120 may make a download confirmation request to the subscription processing server 110 corresponding to SessionID at operation 2145. The subscription processing server 110 may deliver a download permission message to the profile server 120 at operation 2147.

The subscription processing server 110 may determine whether to permit subscription processing by obtaining additional information from the profile server 120 through operations 2145 and 2147.

The profile server 120 verifies the eUICC first signature value using the information including SessionID. If a profile corresponding to SessionID is found to be present, the profile server 120 delivers information, including an ICCID corresponding to the profile, to the eUICC control S/W 104 at operation 2149.

At operation 2151, the eUICC control S/W 104 may store the ICCID received from the profile server 120 and use the ICCID in operations 2161 and 2167.

The eUICC control S/W 104 requests the eUICC 102 to generate an eUICC second signature value at operation 2153. The eUICC 102 returns the second signature value to the eUICC control S/W 104 at operation 2155. The eUICC control S/W 104 requests a profile by providing the profile server 120 with information including the eUICC second signature value at operation 2157.

The profile server 120 delivers encrypted profile information and information including ICCID to the eUICC control S/W 104 at operation 2159.

The eUICC control S/W 104 stores the ICCID received along with the encrypted profile, and may identify whether the stored ICCID is identical with the ICCID stored at operation 2151 at operation 2161.

The eUICC control S/W 104 may deliver the received encrypted profile to the eUICC 102 so that the profile is installed on the eUICC at operation 2163. The encrypted profile may be divided into one or a plurality of APDU commands and delivered. Furthermore, the eUICC 102 may decrypt the encrypted profile, may install the decrypted profile, and may deliver a result of the installation to the eUICC control S/W 104 as a response at operation 2165.

The eUICC control S/W 104 may display a query as to whether the profile will be immediately enabled. The query may be performed anterior or posterior to the profile installation at operation 2167.

If the eUICC control S/W 104 has selected to immediately enable the profile with respect to the query, it may deliver a command to enable a profile corresponding to the ICCID to the eUICC 102 using the ICCID stored at operation 2151 or 2161 at operation 2169.

The eUICC 102 enables the profile corresponding to the ICCID, and transmits a result of the enabling of the profile to the eUICC control S/W 104 as a response at operation 2171.

Thereafter, the terminal 100 may perform mutual authentication for network access along with the service provider network 130 using Credential information (e.g., IMSI and Ki information) stored in the corresponding profile at operation 2173.

The embodiment is for helping understanding of the disclosure and is not intended to limit the range of the disclosure to a corresponding scenario. For example, instead of the process for the terminal 100 to select one of the communication product lists received from the subscription processing server 110 and to deliver the selected communication product list to the server at operations 2103 and 2105, when the terminal 100 delivers criteria for selecting a communication product to the subscription processing server 110, the subscription processing server 110 may select a communication product. The criteria may include one or more of the range of the price, the range of data usage, the range of communication time, the range of data communication speed, and a use country.

Figure 22A:
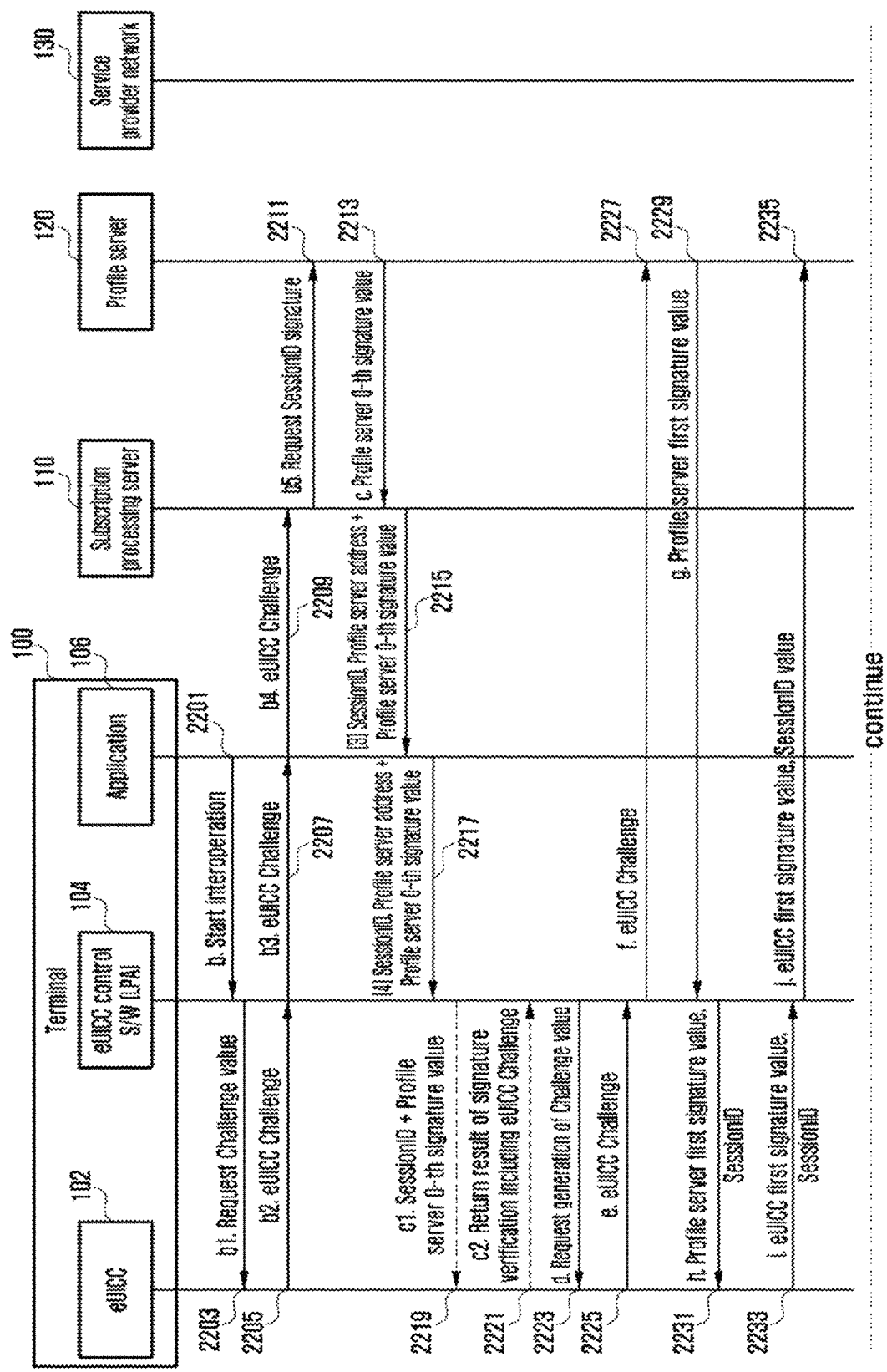
FIGS. 22A and 22B are diagrams showing an embodiment of a method using communication service by only a simple manipulation even without mounting a separate SIM card after the communication service is conveniently purchased through a terminal in a wireless communication system.
Figure 22B:
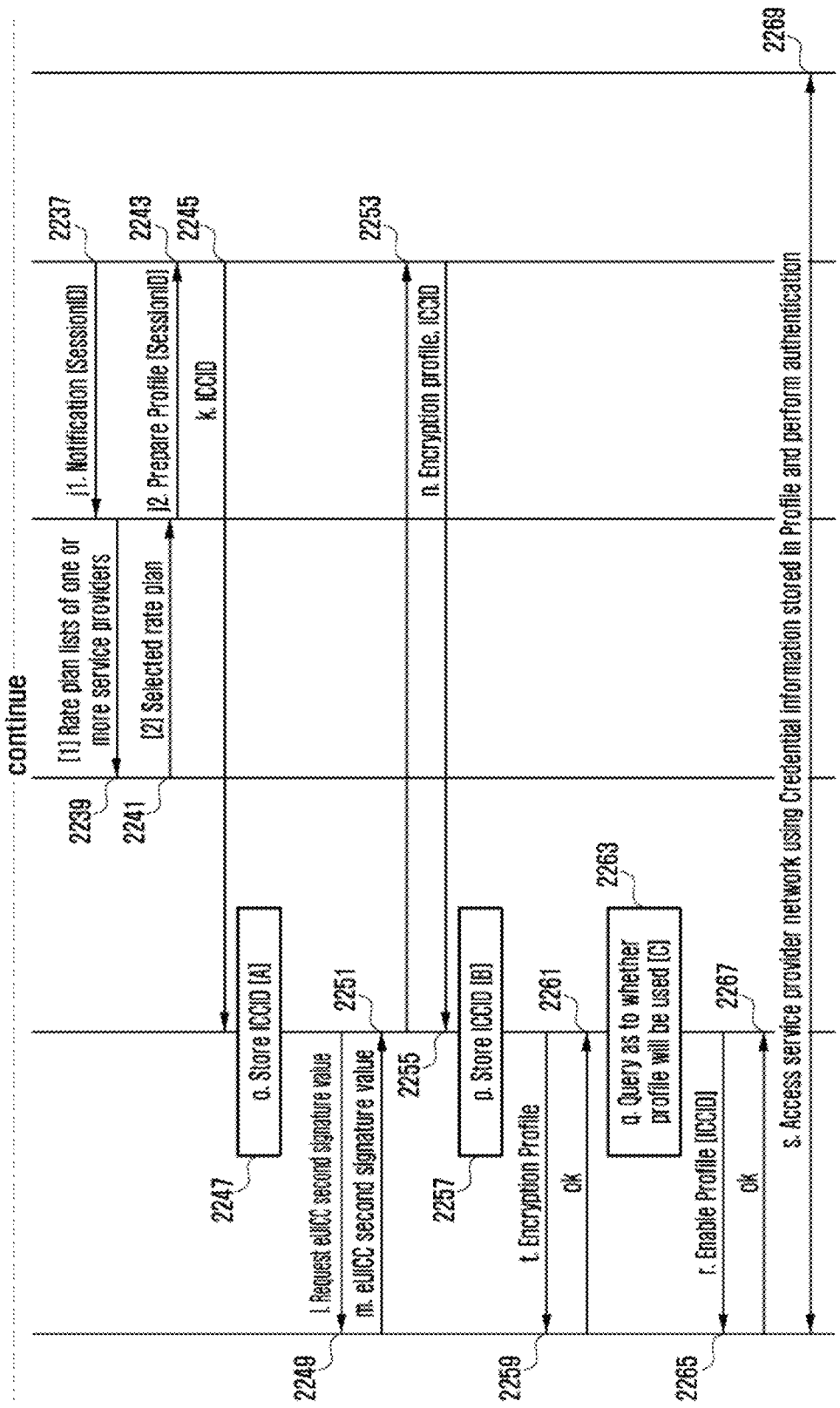

FIGS. 22A and 22B show the fifth detailed embodiment of the second embodiment of the present disclosure.

In FIG. 22A, the application 106 installed on the terminal 100 may request the eUICC control S/W 104 to prepare an interoperation start at operation 2201.

The eUICC control S/W 104 may request the eUICC 102 to generate a Challenge value at operation 2203.

The eUICC 102 may generate a Challenge value and return it to the eUICC control S/W 104 at operation 2205.

Thereafter, the eUICC control S/W 104 may deliver the received eUICC Challenge to the application 106 at operation 2207. The application 106 may deliver the received eUICC Challenge to the subscription processing server 110 at operation 2209. The subscription processing server 110 may deliver information including the eUICC Challenge and SessionID to the profile server 120, and may request the profile server 120 to generate a signature value at operation 2211.

The profile server 120 may deliver a profile server 0-th signature value calculated from the signature value to the subscription processing server 110 at operation 2213. At this time, the profile server 120 may have stored information including SessionID information, and may deliver the information to the subscription processing server 110 along with the profile server 0-th signature value.

The subscription processing server 110 may deliver the SessionID, profile server address and profile server 0-th signature value to the application 106 of the terminal at operation 2215. The SessionID and the profile server address may be delivered in the form of Activation Code. The Activation Code includes the SessionID and the profile server address, and may include other information.

Furthermore, although the profile server address has not been delivered from the profile server 120 to the subscription processing server 110, the subscription processing server 110 may perform the operation using a profile server address configured in the subscription processing server 110.

Thereafter, the application 106 operating in conjunction with the subscription processing server 110 may request the initiation of profile download by delivering the SessionID, profile server address and profile server 0-th signature value to the eUICC control S/W 104 at operation 2217.

The eUICC control S/W 104 stores the SessionID and profile server address received from the application 106, and requests signature verification by delivering the SessionID, profile server address and profile server 0-th signature value to the eUICC 102 at operation 2219. Next, the eUICC control S/W 104 receives a result of the verification from the eUICC 102 at operation 2221, and may perform a subsequent profile download process based on a result of the verification.

The terminal control S/W 104 has stored the SessionID and profile server address received from the application 106. In this state, when a profile download initialization request is received, the terminal control S/W 104 may request the eUICC to generate a Challenge value at operation 2223.

The eUICC 102 may generate a Challenge value and deliver it to the eUICC control S/W 104 at operation 2225.

The eUICC control S/W 104 accesses the profile server 120 using the stored profile server address information and delivers the Challenge to the profile server at operation 2227.

The profile server 120 calculates a profile server first signature value with respect to data including the received eUICC Challenge, and may deliver the first signature value to the eUICC control S/W 104 at operation 2229.

When a profile server first signature value is received, the eUICC control S/W 104 delivers the SessionID, received from the application 106 and stored, and the profile server first signature value to the eUICC 102 at operation 2231.

The eUICC 102 verifies the profile server first signature value using information including the eUICC Challenge, and generates an eUICC first signature value with respect to data including the SessionID value. Next, the eUICC 102 may deliver the SessionID value and the eUICC first signature value to the eUICC control S/W 104 at operation 2233.

The eUICC control S/W 104 may deliver information, including the SessionID and eUICC first signature value, to the same profile server 120 at operation 2235.

Next, in FIG. 22B, the profile server 120 may make a download confirmation request to the subscription processing server 110 corresponding to SessionID at operation 2237. In this case, the request may include information about the terminal (e.g., information of the eUICC or the model name of the terminal, a supportable access network type of the terminal, and applet-related information supportable in the terminal).

The subscription processing server 110 may provide an available communication product list to the application 106 of the terminal at operation 2239. In this case, the corresponding communication product list may be a communication product list selected by the subscription processing server 110 based on the information of the terminal received at operation 2237.

The application 106 may deliver the selected communication product to the subscription processing server at operation 2241.

The subscription processing server 110 may request the download of a profile corresponding to the selected communication product at operation 2243.

The profile server 120 verifies the eUICC first signature value using the information including SessionID, identifies whether there is a profile corresponding to SessionID, and delivers information including an ICCID corresponding to the profile to the eUICC control S/W 104 at operation 2245.

The eUICC control S/W 104 may store the ICCID received at operation 2247 and use the ICCID at operations 2257 and 2263 subsequently.

The eUICC control S/W 104 requests the eUICC 102 to generate an eUICC second signature value at operation 2249. The eUICC 102 returns the second signature value to the terminal at operation 2251. The eUICC control S/W 104 requests a profile by providing the profile server 120 with information including the eUICC second signature value at operation 2253.

The profile server 120 delivers encrypted profile information and the information including the ICCID to the eUICC control S/W 104 at operation 2255.

The eUICC control S/W 104 stores the ICCID received along with the encrypted profile, and may identify whether the stored ICCID is identical with the ICCID stored at operation 2247 at operation 2257.

The eUICC control S/W 104 may deliver the received encrypted profile to the eUICC 102 so that the profile is installed on the eUICC at operation 2259. The encrypted profile may be divided into one or a plurality of APDU commands and delivered. Furthermore, the eUICC 102 may decrypt the encrypted profile, may install the decrypted profile, and may notify the eUICC control S/W 104 of a result of the installation of the profile as a response at operation 2261.

The eUICC control S/W 104 may display a query as to whether the profile will be immediately enabled. The query may be performed anterior or posterior to the profile installation at operation 2263.

If the eUICC control S/W 104 has selected to immediately enable the profile with respect to the query, it may deliver a command to enable the profile corresponding to the ICCID to the eUICC 102 using the ICCID stored at operation 2247 or 2257 at operation 2265.

The eUICC 102 may enable the profile corresponding to the ICCID, and may notify the eUICC control S/W 104 of a result of the enabling of the profile as a response at operation 2267.

Thereafter, the terminal 100 may perform mutual authentication for network access along with the service provider network 130 using Credential information (e.g., IMSI and Ki information) stored in the corresponding profile at operation 2269.

The embodiment is for helping understanding of the disclosure and is not intended to limit the range of the disclosure to a corresponding scenario. For example, instead of the process for the terminal 100 to select one of the communication product lists received from the subscription processing server 110 and to deliver the selected communication product list to the server at operations 2239 and 2241, when the terminal 100 delivers criteria for selecting a communication product to the subscription processing server 110, the subscription processing server 110 may select the communication product. The criteria may include one or more of the range of the price, the range of data usage, the range of communication time, the range of data communication speed, and a use country.

In accordance with the embodiments of FIGS. 18 to 22, the terminal may receive information about communication products of one or more communication service providers, may deliver one selected communication product to a server, may receive Activation Code corresponding to the selected communication product, may deliver the Activation Code to the server and another server, may receive a profile corresponding to the selected communication product, may access the service network of a service provider or cooperation service provider corresponding to the communication product using the received profile, and may use the communication product. In such an embodiment, after communication service is purchased even without mounting a separate SIM card on a terminal, the communication service can be immediately used.

The configurations of the terminal, service provider server and profile server operating according to the embodiments of FIGS. 1 to 22 are described with reference to FIGS. 23 to 25.

Figure 23:
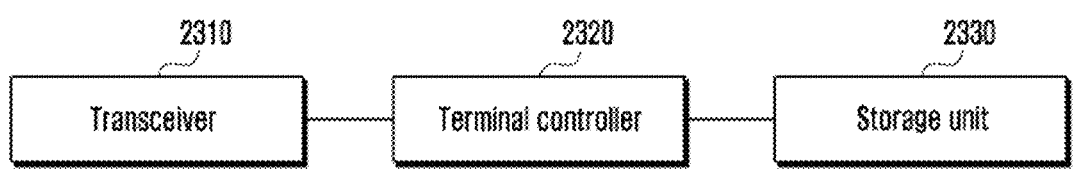
FIG. 23 is a block diagram showing the configuration of the terminal according to an embodiment of the present disclosure.

FIG. 23 is a block diagram showing the configuration of the terminal according to an embodiment of the present disclosure.

Referring to FIG. 23, the terminal may include a transceiver 2310, a terminal controller 2320 and a storage unit 2330. In one embodiment of the present disclosure, the terminal controller 2320 may be defined as a circuit, an application-specific integrated circuit or at least one processor. Although not explicitly shown in FIG. 23, the terminal may further include at least one of a user input unit (or user interface) configured to receive a user input, a display unit configured to output information to a user, and a photographing unit (or camera) configured to generate an image by photographing the outside.

The transceiver 2310 may transmit and receive signals to and from a different terminal, a base station, and a network entity, such as a server. The transceiver 2310 may perform communication by exchanging data with the service provider server and/or the profile server, for example.

The terminal controller 2320 may control an overall operation of the terminal according to the proposed embodiments of the present disclosure. For example, the terminal controller 2320 may control signal flows between the blocks so that the operations according to the aforementioned drawings and flowcharts are performed. Specifically, the terminal controller 2320 may exchange signaling for moving a profile to another terminal according to the first embodiment, and may exchange signaling with the profile server and/or the service provider server. Furthermore, the terminal controller 2320 may exchange signaling with at least one of the profile server, subscription processing server, service provider network and discovery server according to the second embodiment.

The storage unit 2330 may store at least one of information transmitted and received through the transceiver 2310 and information generated through the terminal controller 2320.

The configuration of the terminal is described more specifically. The terminal may further include a user input unit configured to display the type of event (e.g., the display of a profile list, profile download, profile transfer according to the substitution of a terminal, the acquisition of eUICC information of another terminal, profile delete and profile enabling) to be performed by the terminal and to receive the type from a user.

Furthermore, the terminal may transmit one or more of the identifier (EID) of an eUICC within the terminal, an EID within another terminal, the identifier (ICCID) of a profile to be transferred, and state information of the profile to the profile management server (SM-DP+) or the service provider server (mobile network operator business support system (MNO BSS)) through the transceiver 2310. The terminal may receive one or more events (e.g., profile download and a profile delete request) that need to be performed by the terminal from the profile management server (SM-DP+) or the service provider server through the transceiver 2310.

Furthermore, the terminal may further include a display unit configured to display information about one or more events to be performed for a user. The terminal may receive a user's consent to the execution of corresponding events through the user interface unit, or may determine whether to perform or stop one or more received events based on a consent received through the terminal controller 2320. Furthermore, if the execution of an event is determined to be performed (i.e., if there is a user consent) through the terminal controller 2320 and the transceiver 2310, the terminal may perform the event and transmit a result of the execution of the event to the profile management server (SM-DP+) and the service provider server.

Figure 24:
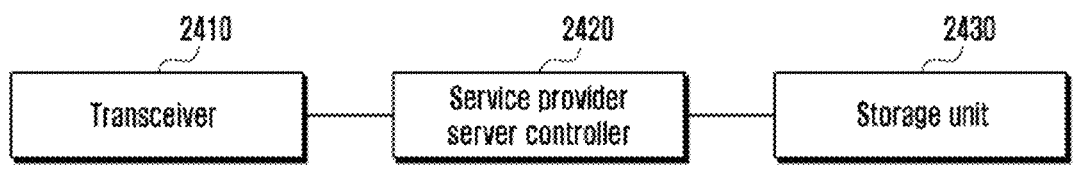
FIG. 24 is a block diagram showing the configuration of the service provider server according to an embodiment of the present disclosure.

FIG. 24 is a block diagram showing the configuration of the service provider server according to an embodiment of the present disclosure.

Referring to FIG. 24, the service provider server may include a transceiver 2410, a service provider server controller 2420 and a storage unit 2430. In the present disclosure, the service provider server controller 2420 may be defined as a circuit, an application-specific integrated circuit or at least one processor. Although not explicitly shown in FIG. 24, the service provider server may further include at least one of a user input unit (or user interface) configured to receive a user input and a display unit configured to output information to a user.

The transceiver 2410 may transmit and receive signals to and from a terminal, a base station, and a network entity, such as a server. The transceiver 2410 may perform communication by exchanging data with the terminal and/or the profile server, for example.

The service provider server controller 2420 may control an overall operation of the service provider server according to the proposed embodiments of the present disclosure. For example, the service provider server controller 2420 may control signal flows between the blocks so that the operations according to the aforementioned drawings and flowcharts are performed. Specifically, the service provider server controller 2420 may exchange signaling for moving a profile from any one terminal to the other terminal according to the first embodiment, and may exchange signaling with the profile server and/or the service provider server. Furthermore, the service provider server controller 2420 may exchange signaling with at least one of the profile server, subscription processing server, service provider network and discovery server according to the second embodiment.

The storage unit 2430 may store at least one of information transmitted and received through the transceiver 2410 and information generated through the service provider server controller 2420.

The configuration of the service provider server is described more specifically. The service provider server may map subscriber information and profile information to the storage unit 2430, may store the subscriber information and the profile information, and may store information about an available profile. Furthermore, the service provider server may receive one or more of the identifier (EID) of an eUICC within a terminal that requests profile transfer, an EID within another terminal, and the identifier (ICCID) of a profile to be transferred from the terminal or the profile server through the transceiver 2410. Furthermore, the service provider server may transmit a profile preparation event and a preparation confirmation event to the profile server through the transceiver 2410, and may update subscriber information and profile information through the service provider server controller 2420.

Figure 25:
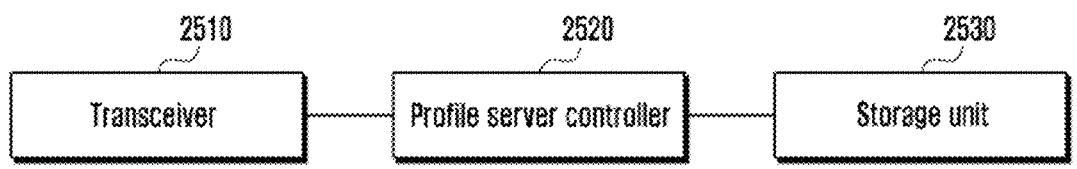
FIG. 25 is a block diagram showing the configuration of the profile server according to an embodiment of the present disclosure.

FIG. 25 is a block diagram showing the configuration of the profile server according to an embodiment of the present disclosure. The profile server of FIG. 25 may mean both the profile management server and the profile server or may mean a server in which the two types of servers have been integrated.

Referring to FIG. 25, the profile server may include a transceiver 2510, a profile server controller 2520 and a storage unit 2530. In one embodiment of the present disclosure, the profile server controller 2520 may be defined as a circuit, an application-specific integrated circuit or at least one processor. Although not explicitly shown in FIG. 25, the profile server may further include at least one of a user input unit (or user interface) configured to receive a user input and a display unit configured to output information to a user.

The transceiver 2510 may transmit and receive signals to and from a terminal, a base station, and a network entity, such as the service provider server. The transceiver 2510 may perform communication by exchanging data with a terminal and/or the service provider server, for example.

The profile server controller 2520 may control an overall operation of the profile server according to the proposed embodiments of the present disclosure. For example, the profile server controller 2520 may control signal flows between the blocks so that the operations according to the aforementioned drawings and flowcharts are performed. Specifically, the profile server controller 2520 may exchange signaling that support a process of transferring a profile from any one terminal to the other terminal according to the first embodiment. Furthermore, the profile server controller 2520 may exchange signaling with at least one of the service provider server, subscription processing server, terminal and discovery server according to the second embodiment.

The storage unit 2530 may store at least one of information transmitted and received through the transceiver 2510 and information generated through the profile server controller 2520.

The configuration of the profile server is described more specifically. The profile server may store a profile to be downloaded onto a terminal using the storage unit 2530. Furthermore, the profile server may receive an event for profile download from the service provider server through the transceiver 2510, and may deliver an event (e.g., profile download or profile remote management) to be performed by the eUICC of a terminal to the terminal or deliver a profile transfer event or a profile preparation completion event to the service provider server. Furthermore, the profile server may receive eUICC authentication information including a signature and a profile download request through the transceiver 2510.

Moreover, the profile server may select a profile that belongs to profiles stored in a message of a terminal and the profile management server (SM-DP+) and that is matched with received eUICC information through the profile server controller 2520, and may transmit the profile to the terminal through the transceiver 2510 or receive a download execution result event and a profile state event from the terminal.

Furthermore, the terminal controller 2320, service provider server controller 2420 and profile server controller 2520 may be controlled by a program including instructions that execute the methods described in the embodiments of the specification. Furthermore, the program may be stored in a storage medium. The storage medium may include volatile or non-volatile memory. The memory may be a medium capable of storing data, and is not limited to a given form if it can store the instructions.

In accordance with the embodiments of the present disclosure, in a communication system, when a terminal is replaced with another one, an old or new terminal may request profile transfer from a mobile communication service provider server (mobile network operator business support systems (MNO BSS)) or a profile management server (subscription manager data preparation plus (SM-DP+)). An eUICC profile corresponding to the eUICC profile of an old terminal may be remotely downloaded from a profile management server to the eUICC of a new terminal. Accordingly, application service can be used by connecting to the network of a mobile communication service provider used in the existing terminal.

Furthermore, in accordance with another embodiment of the present disclosure, in a wireless communication system, communication service can be used by only a simple manipulation without mounting a separate SIM card on a terminal after the communication service is conveniently purchased in a screen of the terminal.

In the aforementioned detailed embodiments of the present disclosure, the elements included in the disclosure may be expressed in the singular or plural form depending on the proposed detailed embodiments. However, the singular or plural expression has been selected suitably for a situation proposed for convenience of description, and the present disclosure is not limited to the singular or plural elements. Although an element has been expressed in the plural form, it may be configured in the singular form. Although an element has been expressed in the singular form, it may be configured in the plural form.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first terminal for a device change in a wireless communication system, the method comprising:
   identifying a profile to be installed in a second terminal by receiving an input from a user;
   obtaining a configuration associated with the device change for the profile;
   receiving, from the second terminal, an embedded universal integrated circuit card (UICC) identifier (EID) of the second terminal indicated by the configuration, wherein the EID is scanned in a quick response (QR) code format or human-readable text format outputted in the second terminal; and
   transmitting, to a network entity, a first message including an integrated circuit card identifier (ICCID) for the profile and the EID of the second terminal,
   wherein a second message, including the ICCID and the EID, is transmitted from the network entity to a service provider, and
   wherein a third message, including the EID and one of a type of the profile or the ICCID of a requested profile corresponding to the profile, is transmitted from the service provider to the network entity.

2. The method of claim 1, further comprising:
   presenting, to the user, information on the device change, and
   wherein the profile is downloaded from the network entity to the second terminal based on the information.

3. A method performed by a second terminal for a device change in a wireless communication system, the method comprising:
   obtaining an embedded universal integrated circuit card identifier (EID) of the second terminal, wherein the EID of the second terminal indicated by a configuration associated with the device change for a profile; and
   outputting, to a first terminal, the EID in a quick response (QR) code format or human-readable text format,
   wherein the profile to be installed in the second terminal by receiving an input from a user is identified,
   wherein a first message including an integrated circuit card identifier (ICCID) for the profile and the EID, is transmitted from the first terminal to a network entity,
   wherein a second message, including the ICCID and the EID, is transmitted from the network entity to a service provider, and
   wherein a third message, including the EID and one of a type of the profile or the ICCID of a requested profile corresponding to the profile, is transmitted from the service provider to the network entity.

4. The method of claim 3, further comprising:
   downloading, from the network entity, the profile based on information on the device change, and
   wherein the information on the device change is presented from the user.

5. A first terminal for a device change in a wireless communication system, the first terminal comprising:
   a transceiver configured to transmit and receive signals; and
   a controller configured to:
      identify a profile to be installed in a second terminal by receiving an input from a user,
      obtain a configuration associated with the device change for the profile, receive, from the second terminal, an embedded universal integrated circuit card identifier (EID) of the second terminal indicated by the configuration, wherein the EID is scanned in a quick response (QR) code format or human-readable text format outputted in the second terminal, and transmit, to a network entity, a first message including an integrated circuit card identifier (ICCID) for the profile and the EID of the second terminal, wherein a second message, including the ICCID and the EID, is transmitted from the network entity to a service provider, and wherein a third message, including the EID and one of a type of the profile or the ICCID of a requested profile corresponding to the profile, is transmitted from a service provider to the network entity.

6. The first terminal of claim 5, wherein the controller is further configured to present, to the user, information on the device change, and wherein the profile is downloaded from the network entity to the second terminal based on the information.

7. A second terminal for a device change in a wireless communication system, the second terminal comprising:

a transceiver configured to transmit and receive signals; and a controller configured to:

obtain an embedded universal integrated circuit card identifier (EID) of the second terminal, wherein the EID of the second terminal indicated by a configuration associated with the device change for a profile, and output, to a first terminal, the EID in a quick response (QR) code format or human-readable text format, wherein the profile to be installed in the second terminal by receiving an input from a user is identified, wherein a first message including an integrated circuit card identifier (ICCID) for the profile and the EID, is transmitted from the first terminal to a network entity, wherein a second message, including the ICCID and the EID, is transmitted from the network entity to a service provider, and wherein a third message, including the EID and one of a type of the profile or the ICCID of a requested profile corresponding to the profile, is transmitted from a service provider to the network entity.

8. The second terminal of claim 7, wherein the controller is further configured to download from the network entity the profile based on information on the device change, and wherein the information on the device change is presented from the user.

* * * * *

UNITED STATES PATENT AND TRADEMARK OFFICE
CERTIFICATE OF CORRECTION

| | | |
|---|---|---|
| PATENT NO. | : 12,022,571 B2 | Page 1 of 1 |
| APPLICATION NO. | : 17/543576 | |
| DATED | : June 25, 2024 | |
| INVENTOR(S) | : Kangjin Yoon et al. | |

It is certified that error appears in the above-identified patent and that said Letters Patent is hereby corrected as shown below:

On the Title Page

Item [54] and in the Specification Column 1, Lines 1-2, "PROFILE BETWEEN DEVICES IN WIRELESS COMMUNICATION SYSTEM" should read --METHOD AND APPARATUS FOR SUPPORTING TRANSFER OF PROFILE BETWEEN DEVICES IN WIRELESS COMMUNICATION SYSTEM--.

Signed and Sealed this
Sixth Day of August, 2024

Katherine Kelly Vidal
*Director of the United States Patent and Trademark Office*